US006215563B1

United States Patent
Onishi et al.

(10) Patent No.: US 6,215,563 B1
(45) Date of Patent: Apr. 10, 2001

(54) IMAGE READING APPARATUS FOR READING IMAGES FROM DIFFERENT KINDS OF FILM IN ACCORDANCE WITH THE SIZE AND CHARACTERISTICS OF THE FILM

(75) Inventors: Takashi Onishi, Toyohashi; Shoji Imaizumi, Shinshiro; Kenichi Muroki, Yamaguchi-ken; Keiji Kusumoto, Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/552,249

(22) Filed: Nov. 2, 1995

Related U.S. Application Data

(63) Continuation of application No. 08/345,544, filed on Nov. 28, 1994, which is a continuation of application No. 08/057,311, filed on May 5, 1993, now abandoned.

(30) Foreign Application Priority Data

| | | |
|---|---|---|
| May 8, 1992 | (JP) | 4-116384 |
| May 10, 1992 | (JP) | 4-143236 |
| May 9, 1992 | (JP) | 4-143564 |

(51) Int. Cl.[7] ................................................ G02B 5/30
(52) U.S. Cl. .......................................... 358/487; 358/488
(58) Field of Search ................................. 358/449, 451, 358/487–488; 348/96–112

(56) References Cited

U.S. PATENT DOCUMENTS

| 4,568,973 | * | 2/1986 | Ishida et al. ........................ 358/449 |
| 4,650,316 | * | 3/1987 | Matsumoto ........................... 355/55 |
| 4,870,294 | | 9/1989 | Hasegawa et al. ................. 250/578 |
| 5,073,794 | | 12/1991 | Kitagawa et al. .................. 355/208 |
| 5,148,295 | * | 9/1992 | Matsubara ........................ 358/449 |
| 5,150,224 | * | 9/1992 | Mizude et al. ..................... 358/449 |
| 5,223,954 | * | 6/1993 | Miyakawa et al. ................. 358/449 |

FOREIGN PATENT DOCUMENTS 60-96068    5/1985   (JP) .

* cited by examiner

Primary Examiner—Thomas D. Lee
Assistant Examiner—Stephen Brinich
(74) Attorney, Agent, or Firm—Sidley & Austin

(57) ABSTRACT

Film carrier detecting mechanism is provided to detect a film carrier positioned at an image reading position to find to what size of film the film carrier is applied. Optical system driving mechanism is controlled according to the size of a film detected by the film carrier detecting mechanism, and varies magnification of image forming optical system so that the width of a film image formed on the surface of photo-electric conversion element is kept constant irrespective of the difference in size of film. Image processing circuit processes and regularize an image reading data corresponding to the size of a film detected by the film carrier detecting mechanism based on a corresponding reading condition.

17 Claims, 64 Drawing Sheets

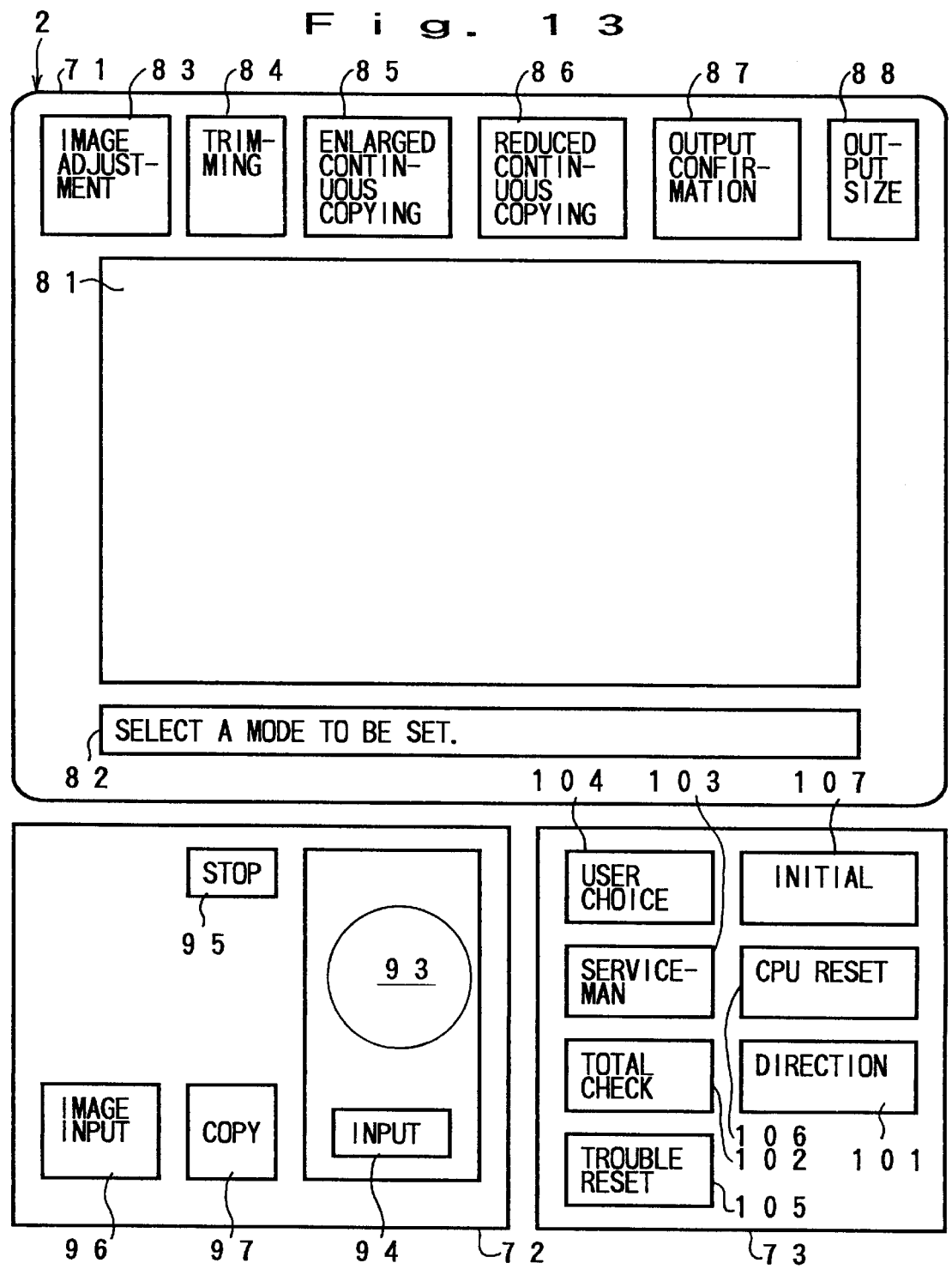

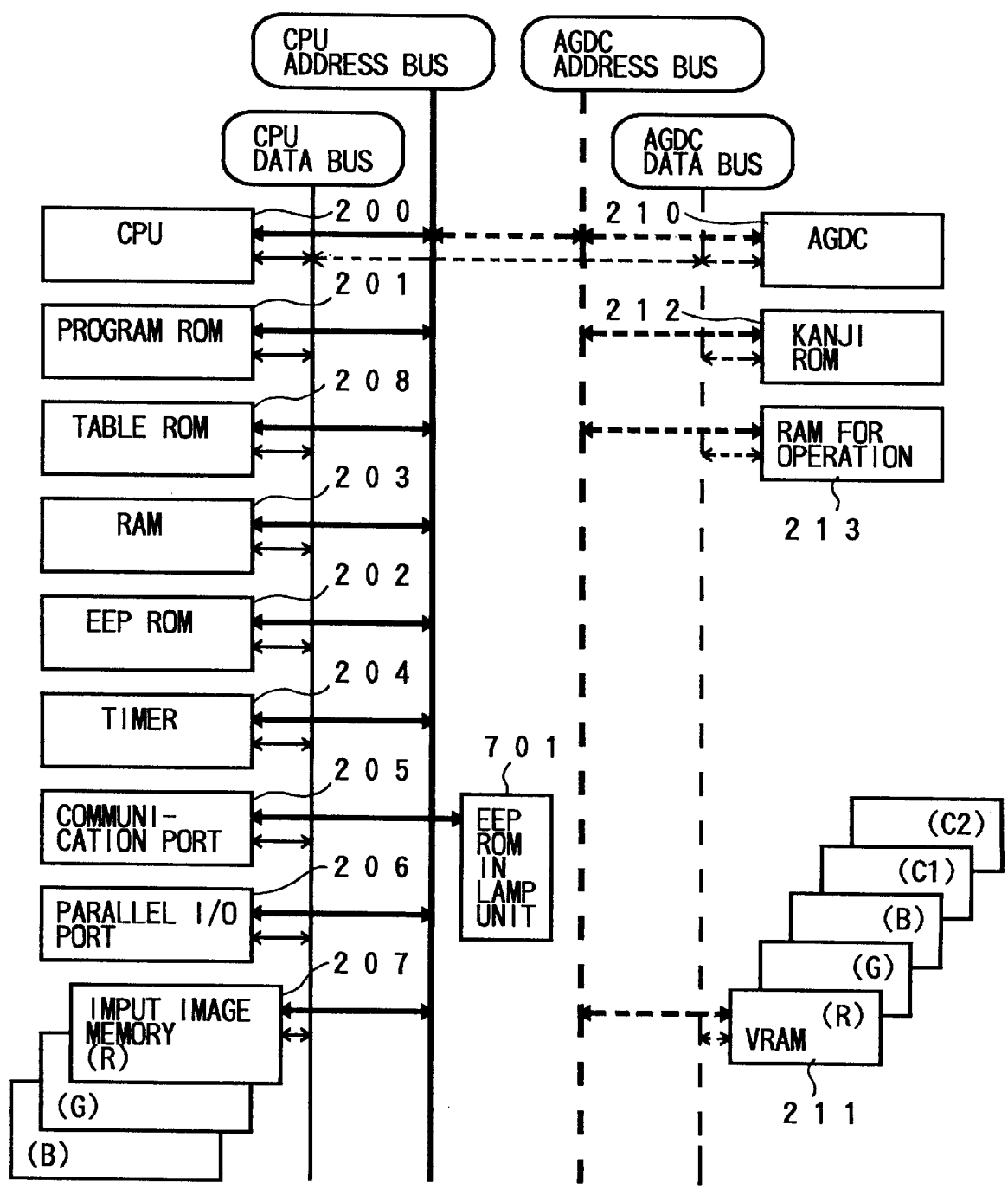

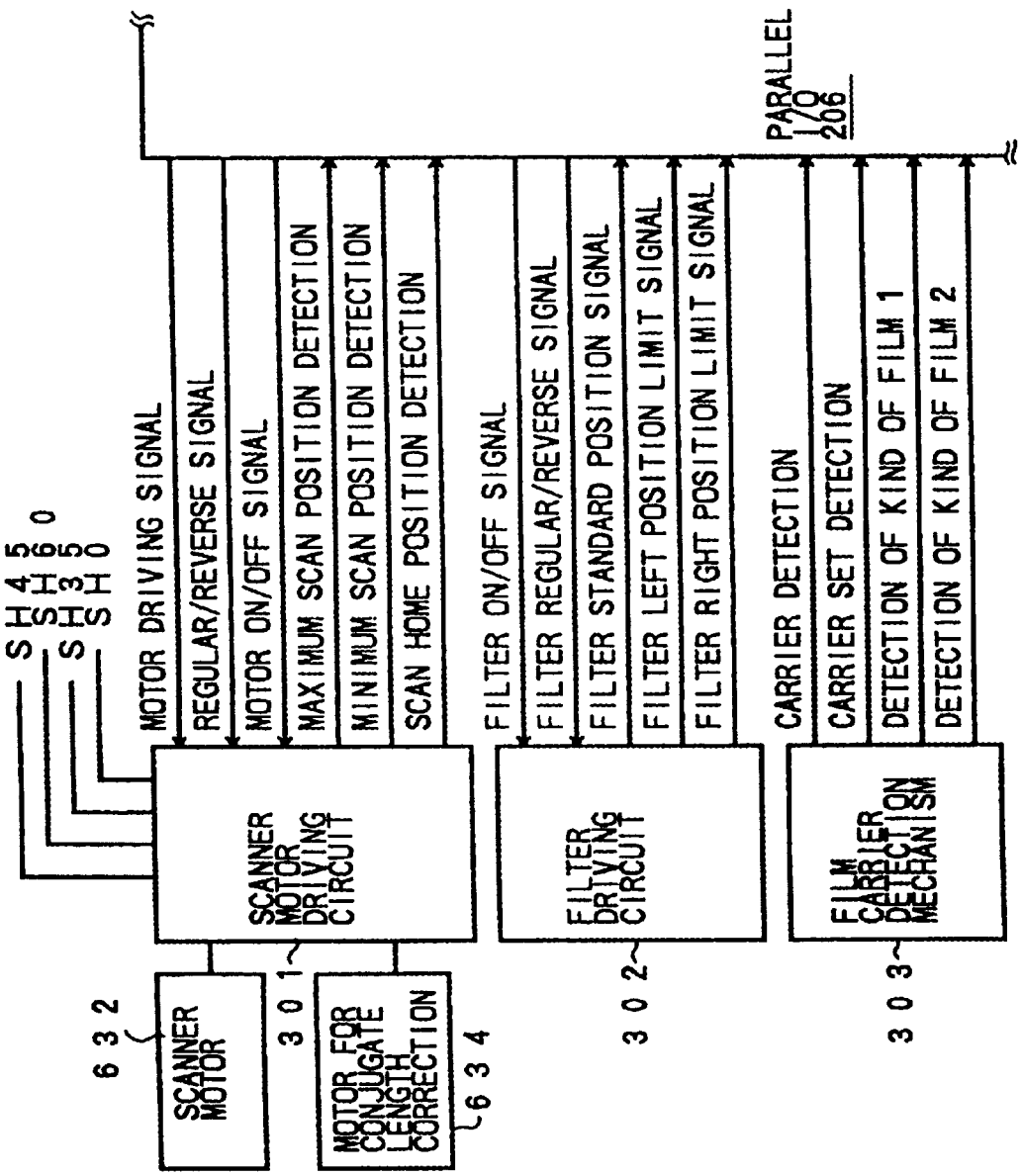

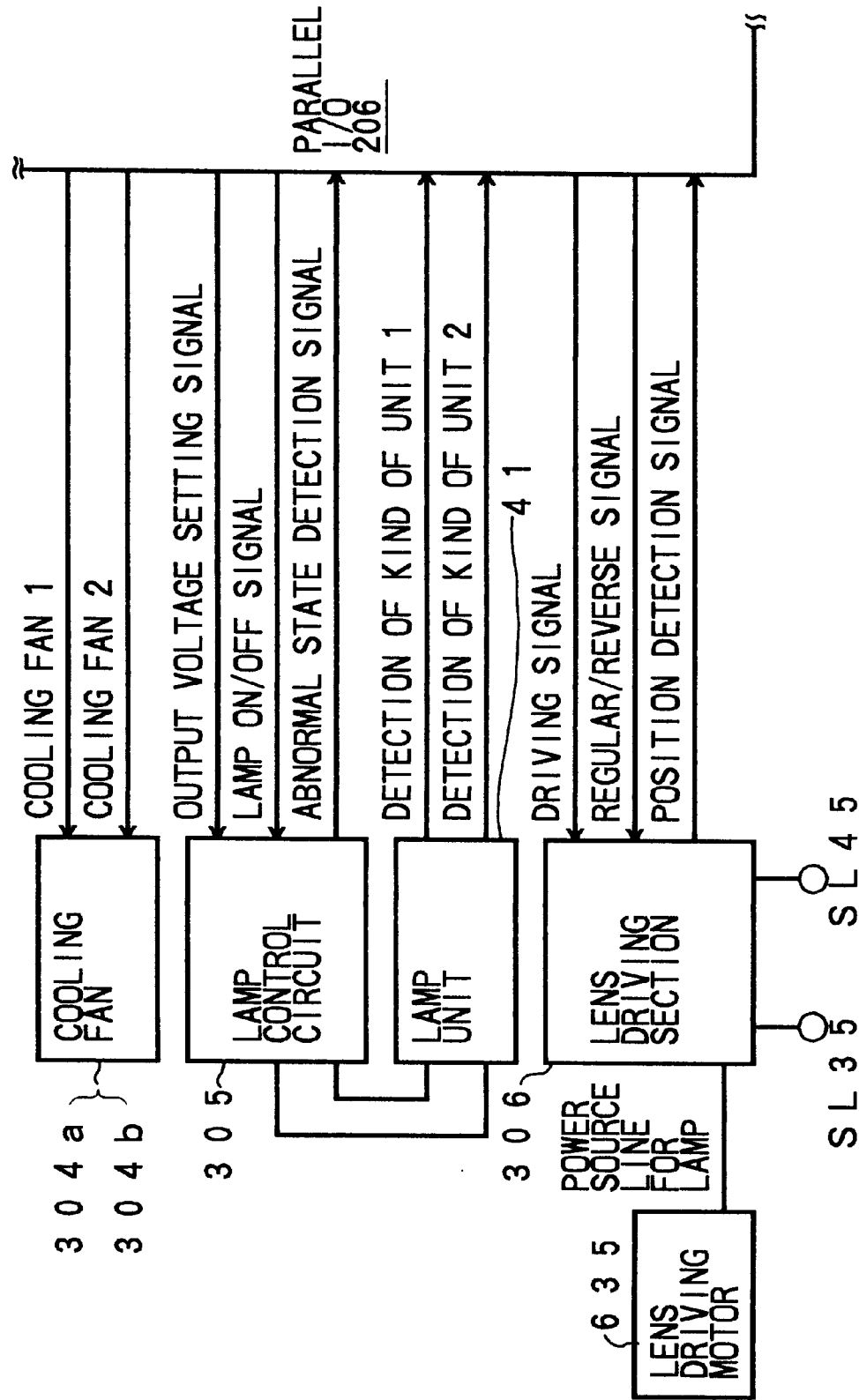

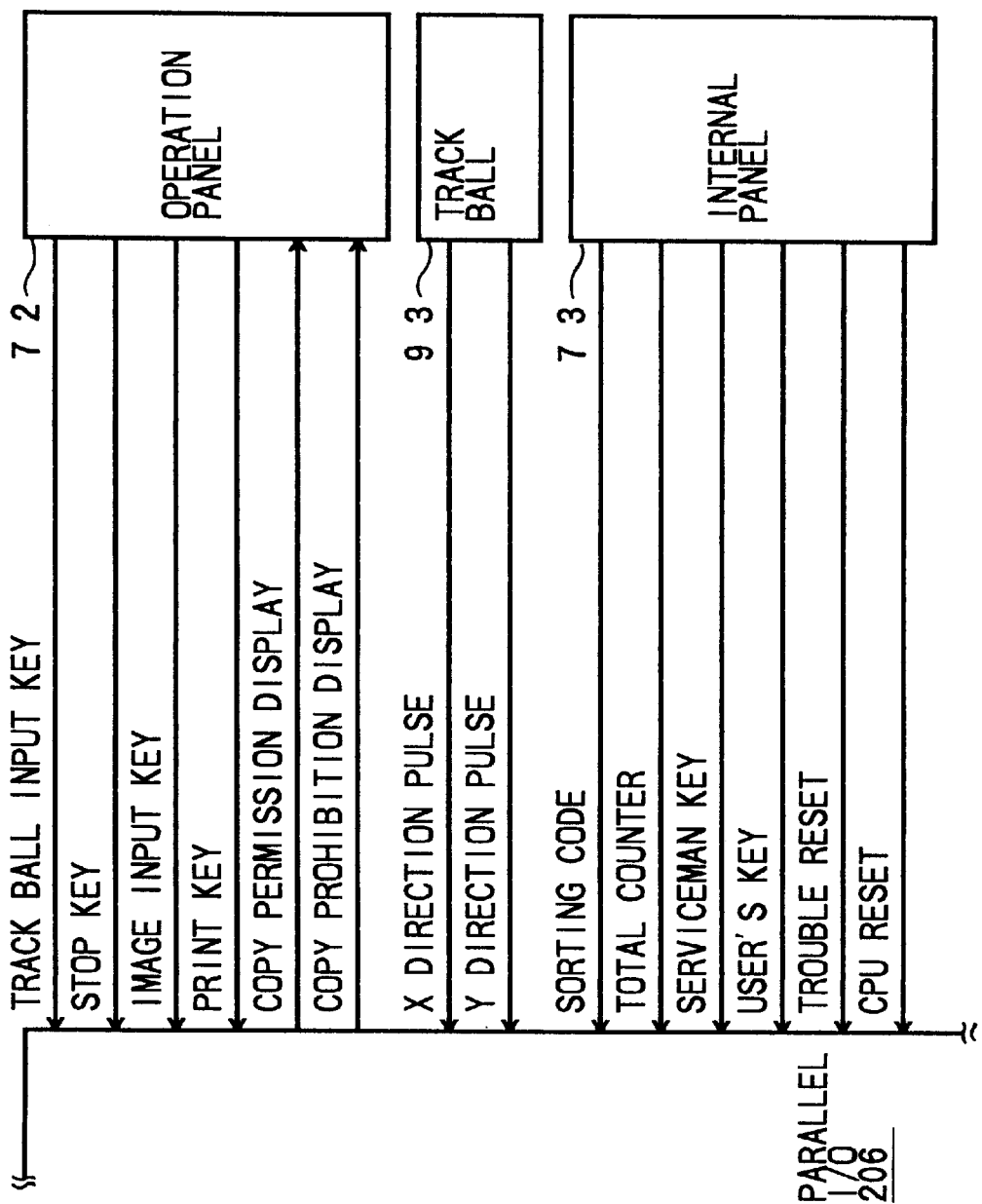

USER SETTING MODE

| U1 PRIORITY MODE SELECTION |
| U2 COPY MODE MEMORY |
| U3 IMAGE DISPLAY SETTING |
| U4 RESET MODE |
| U5 TRACK BALL TRANSFER SPEED |
| U6 OPERATION WHEN FILM CARRIER IS RESET |
| U0 FINISH |

SELECT A MODE TO BE SET.

STOP

IMAGE INPUT | COPY | INPUT

| USER CHOICE | INITIAL |
| SERVICE-MAN | CPU RESET |
| TOTAL CHECK | DIRECTION |
| TROUBLE RESET | |

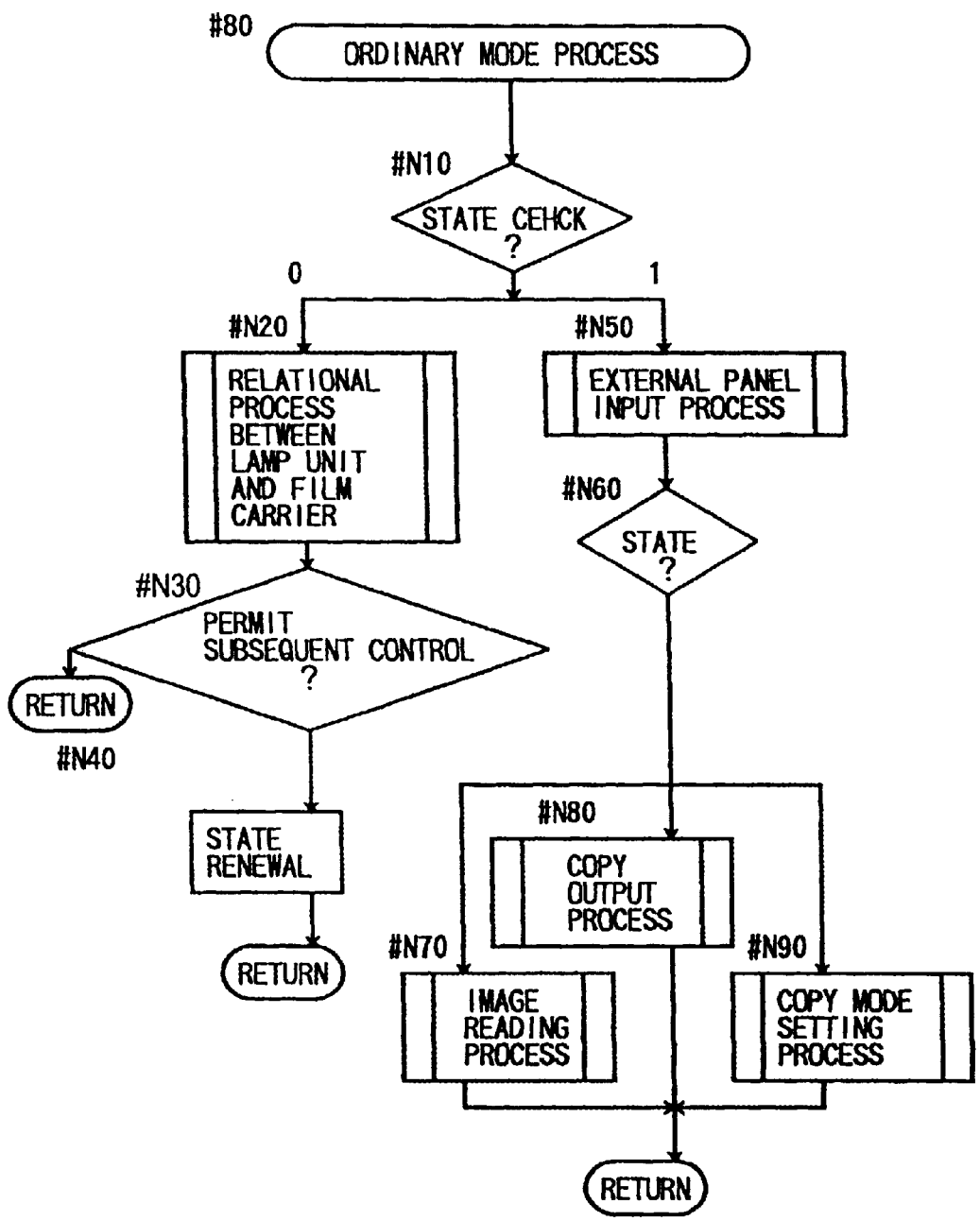

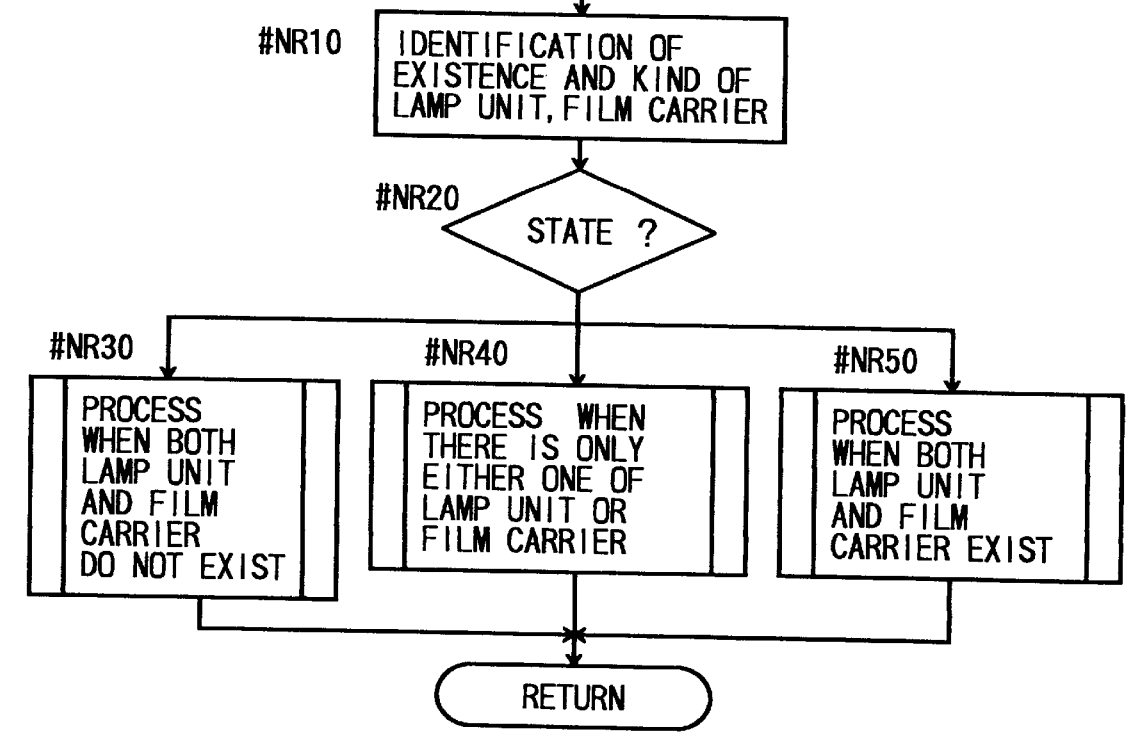

F i g. 3 2
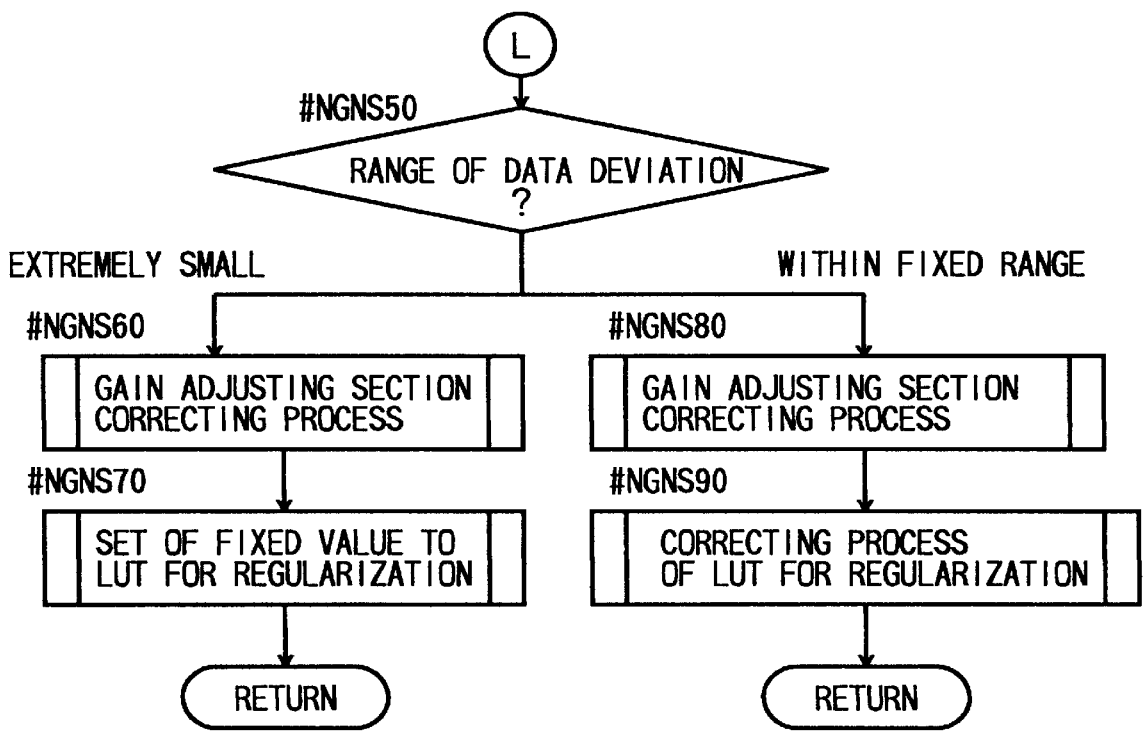
F i g. 3 3
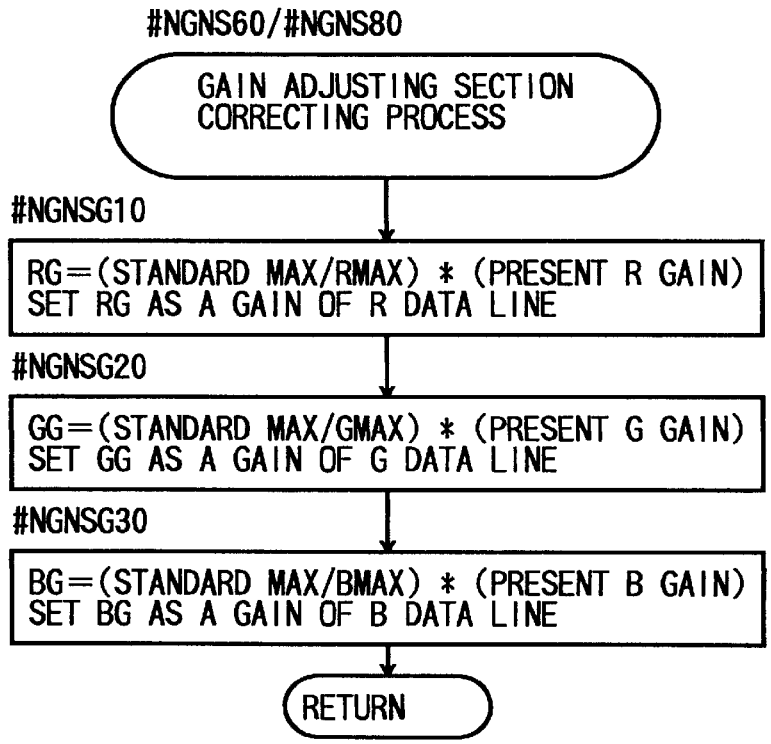

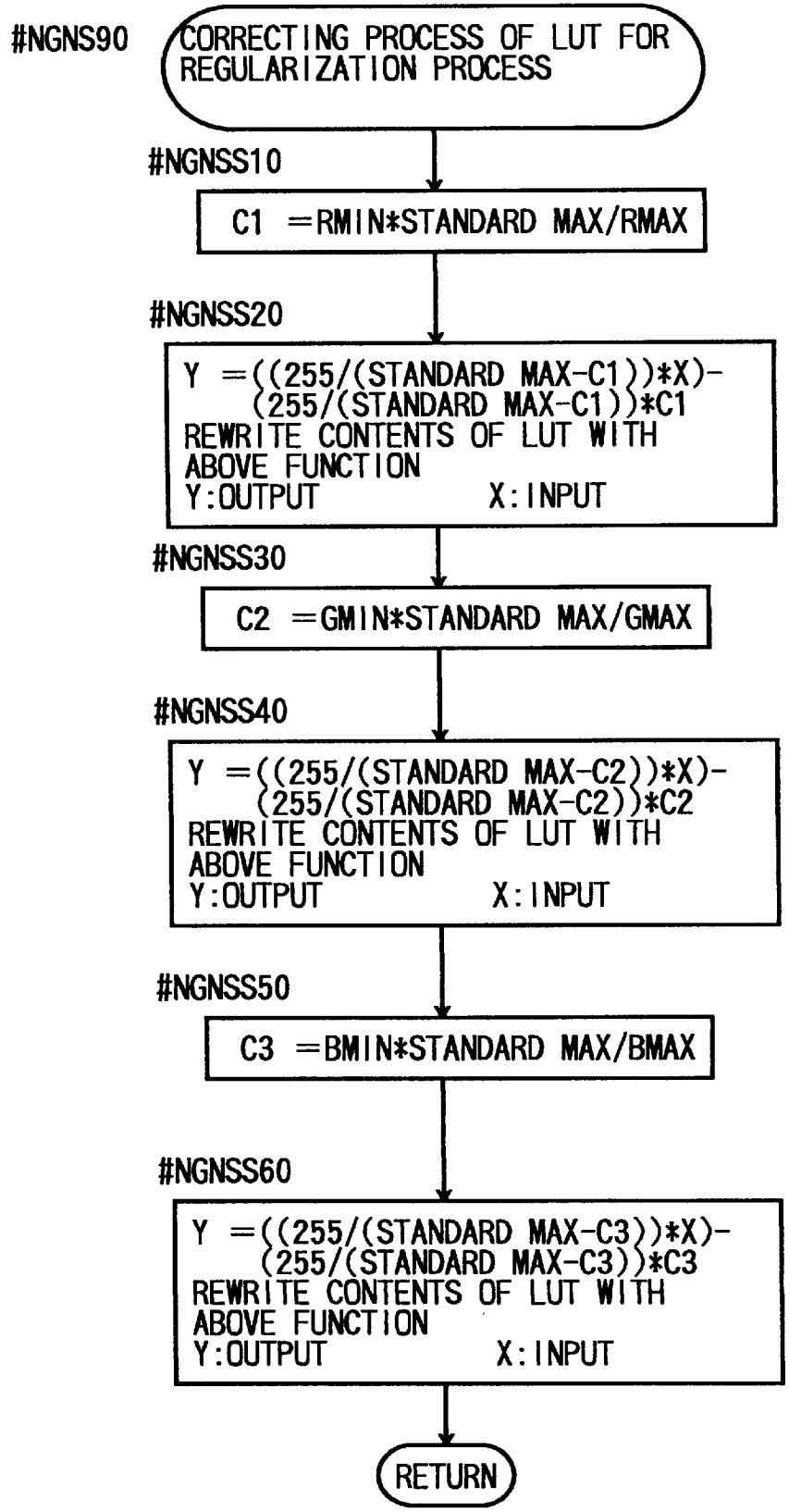

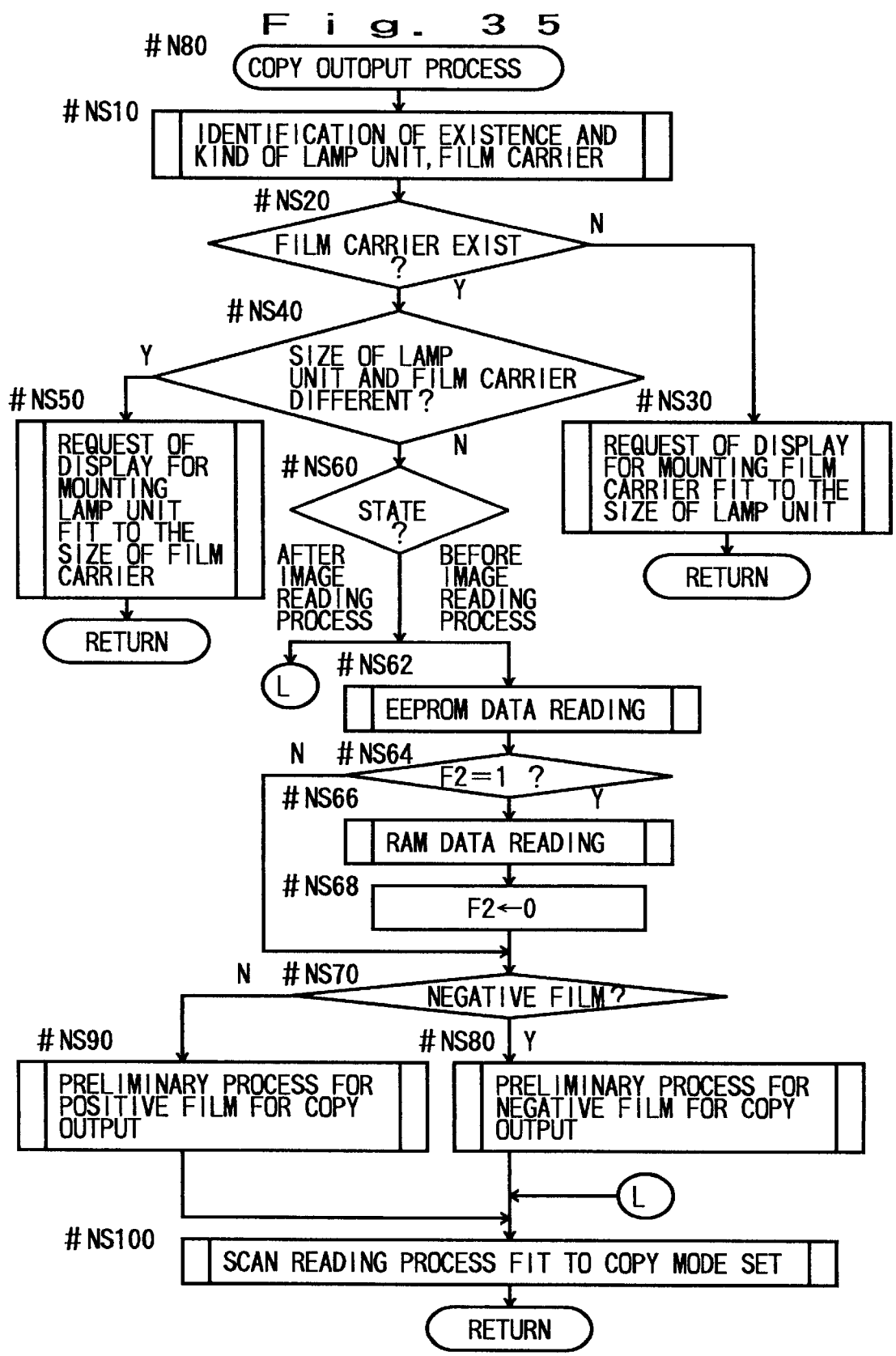

Fig. 40

SET A LAMP UNIT.

Fig. 41

OPTICAL SYSTEM BEING CHANGED OVER.

Fig. 42

SET A LAMP UNIT FOR 35mm FILM.

EXTRACT A FILM CARRIER.

Fig. 43

35mm FILM USABLE.

EXTRACT A FILM CARRIER.

Fig. 44

SET A LAMP UNIT FOR 6cm FILM.

Fig. 45

SHADING DATA BEING TAKEN IN.

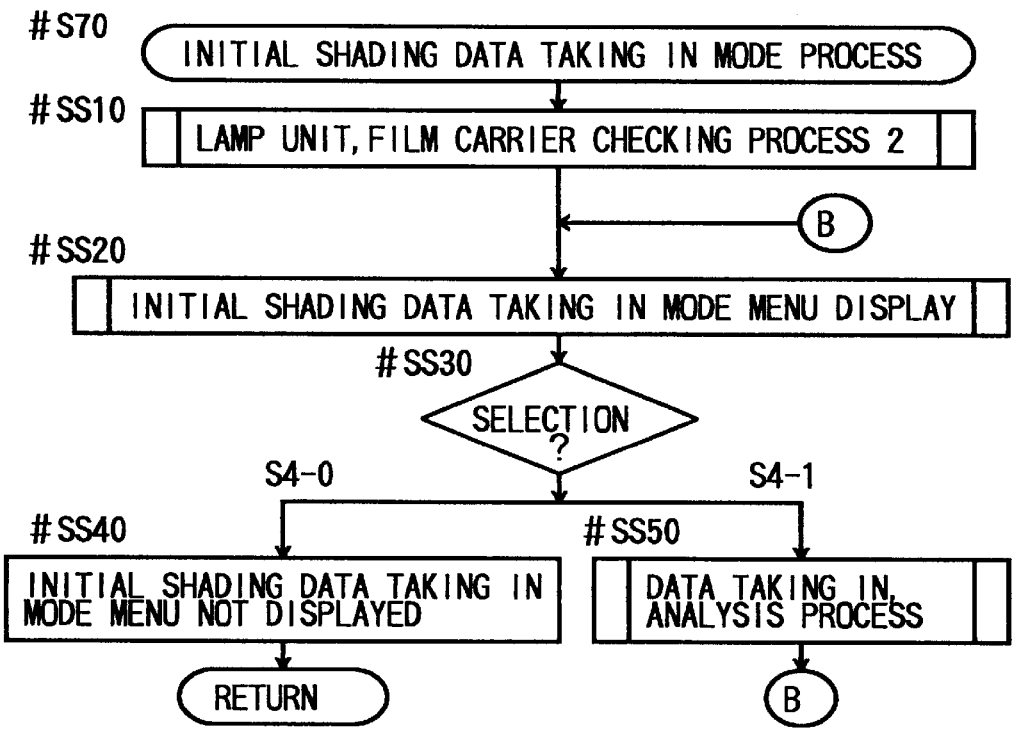
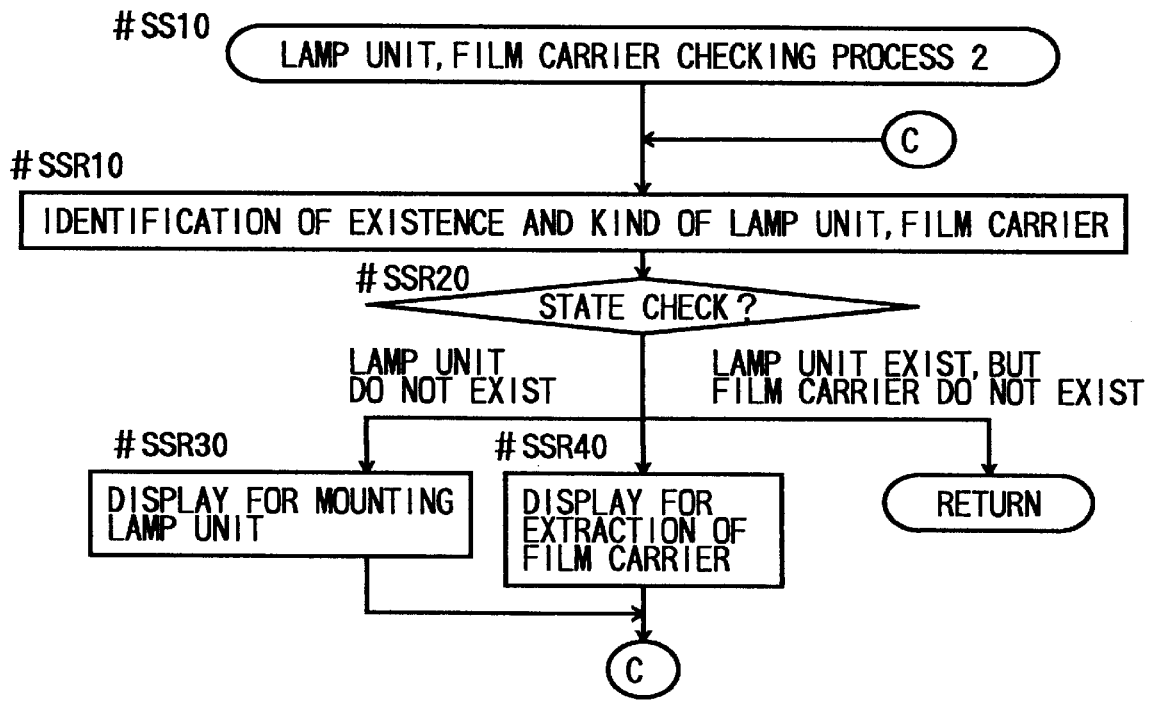

Fig. 64

```
SERVICEMAN MODE

S1 COUNTER MODE
S2 OPERATION TEST MODE
S3 COLOR MATCHING EVALUATION TEST MODE
S4 MODE FOR INITIAL SHADING DATA ANALYSIS
S5 IMAGE PROCESSING CIRCUIT ADJUSTMENT ANALYSIS MODE
S0 FINISH

SET LAMP UNIT AND FILM CARRIER.
```

Fig. 65

```
SERVICEMAN MODE

S1 COUNTER MODE
S2 OPERATION TEST MODE
S3 COLOR MATCHING EVALUATION TEST MODE
S4 MODE FOR INITIAL SHADING DATA ANALYSIS
S5 IMAGE PROCESSING CIRCUIT ADJUSTMENT ANALYSIS MODE
S0 FINISH

NOT THE SAME KIND.
```

Fig. 66

SERVICEMAN MODE

IMAGE PROCESSING CIRCUIT ADJUSTMENT, ANALYSIS MODE

| |
|---|
| S5-1  MAXIMUM OUTPUT ADJUSTMENT MODE |
| S5-2  RGB BALANCE ADJUSTMENT MODE |
| |
| S5-0  FINISH |
| |

SET A MODE TO BE SELECTED.

Fig. 67

SERVICEMAN MODE

IMAGE PROCESSING CIRCUIT ADJUSTMENT, ANALYSIS MODE

S5-1  MAXIMUM OUTPUT ADJUSTMENT MODE

[ ERASE ]     [ CANCELL ]

DATA STORED WILL BE ERASED.

Fig. 68

SERVICEMAN MODE

IMAGE PROCESSING CIRCUIT ADJUSTMENT, ANALYSIS MODE

S5-1 MAXIMUM OUTPUT ADJUSTMENT MODE

ERASE    CANCEL

ADJUSTMENT, ANALYSIS BEING EXECUTED.

Fig. 69

SERVICEMAN MODE

IMAGE PROCESSING CIRCUIT ADJUSTMENT, ANALYSIS MODE

S5-2 RGB BALANCE ADJUSTMENT MODE

ERASE    CANCEL

DATA STORED WILL BE ERASED.

Fig. 70

SERVICEMAN MODE

IMAGE PROCESSING CIRCUIT ADJUSTMENT, ANALYSIS MODE

S5-2 RGB BALANCE ADJUSTMENT MODE

ERASE   CANCEL

ADJUSTMENT, ANALYSIS BEING EXECUTED.

Fig. 71

SERVICEMAN MODE

| S1 COUNTER MODE |
| S2 OPERATION TEST MODE |
| S3 COLOR MATCHING EVALUATION TEST MODE |
| S4 MODE FOR INITIAL SHADING DATA ANALYSIS |
| S5 IMAGE PROCESSING CIRCUIT ADJUSTMENT, ANALYSIS MODE |
| S0 FINISH |

SET A LAMP UNIT.

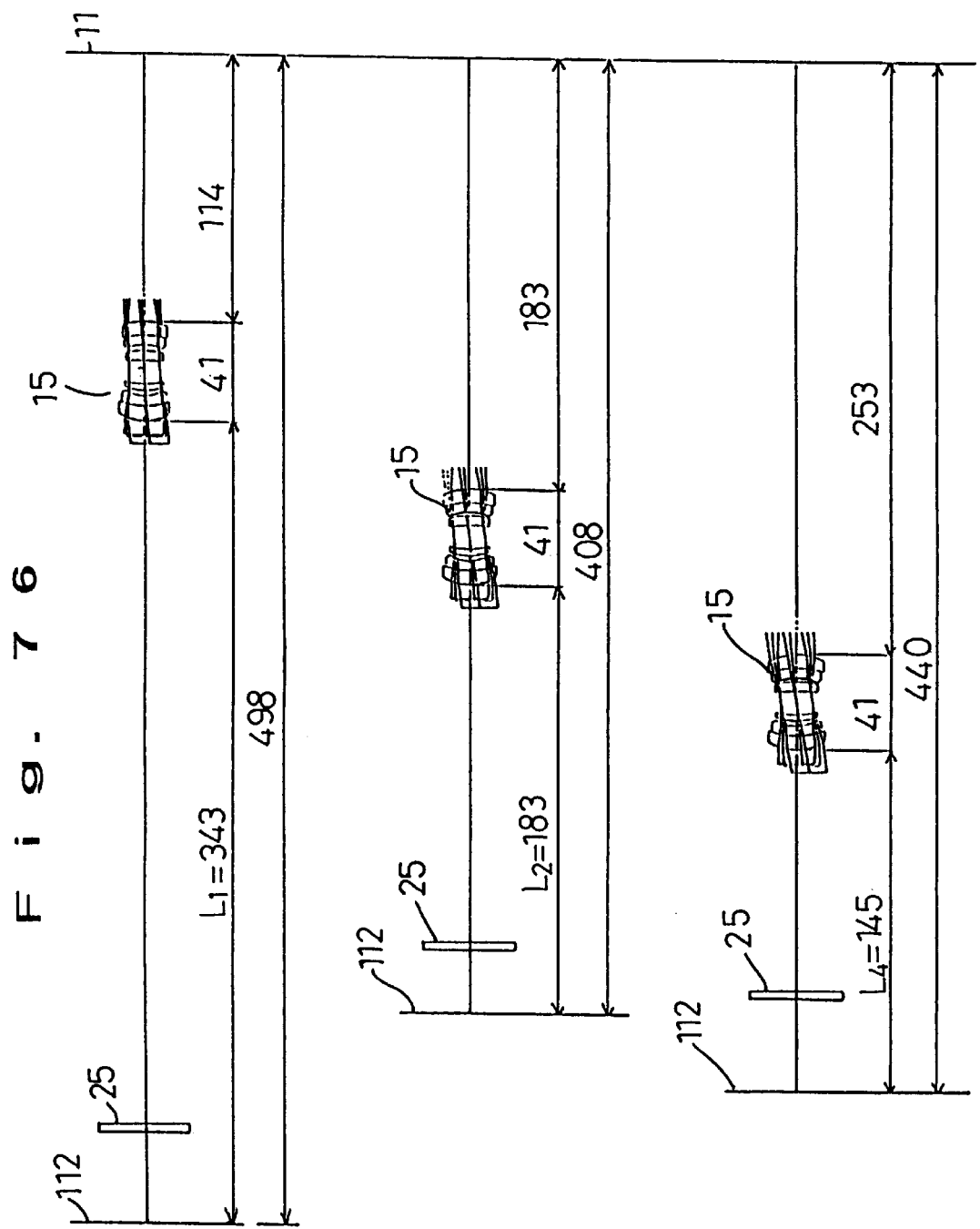

IMAGE READING APPARATUS FOR READING IMAGES FROM DIFFERENT KINDS OF FILM IN ACCORDANCE WITH THE SIZE AND CHARACTERISTICS OF THE FILM

This application is a continuation of application Ser. No. 08/345,544, filed Nov. 28, 1994, which, in turn, is a continuation of application Ser. No. 08/057,311, filed May 5, 1993, now abandoned.

BACKGROUND OF THE INVENTION

1. Technical Field of the Invention

The present invention relates to a film image reading apparatus, and more particularly, to an image reading apparatus which is adapted to read an image from different kinds of films.

2. Description of Related Art

Various kinds of films have heretofore been used in sizes of 35 mm, 6 cm and 4×5 inches. In the film of size 35 mm, for example, there are two kinds of films, that is, a continuous film and the one mounted one by one. Those films different in sizes are properly used to suit to each objective. Even in the same size of film, there are a wide variety of films to be used. For instance, a color positive film is used for appreciation, a color negative film for printing, and a monochrome film for an artistic purpose. The sizes and characteristics in a variety of films are shown in Table 1 shown below.

TABLE 1

| 35 mm Continuous | Col Pos. | Col Neg. | Mono Neg. | Mono Pos. |
| 35 mm Mount | Col Pos. | Col Neg. | Mono Neg. | Mono Pos. |
| 6 cm | Col Pos. | Col Neg. | Mono Neg. | Mono Pos. |
| 4 × 5 inch | Col Pos. | Col Neg. | Mono Neg. | Mono Pos. |

SUMMARY OF THE INVENTION

A primary object of the present invention is to provide a film image reading apparatus which is capable of reading an image of films in a plurality of different sizes.

Another object of the present invention is to provide a film image reading apparatus which is capable of setting various reading conditions corresponding to characteristics of each film with a simple structure when an image of films in a plurality of different sizes is read.

A further object of the present invention is to provide a film image reading apparatus which is capable of automatically setting a predetermined condition corresponding to a kind of film wherein various conditions corresponding to each kind of film are preliminarily set.

These and other objects and features of the present invention will become more apparent from the following description taken in conjunction with the accompanying drawings which illustrate specific embodiments of the invention.

BRIEF DESCRIPTION OF THE DRAWINGS

FIG. 13 is a front view showing a color CRT, and an operation panel and internal panel.

FIG. 14 is a block diagram showing CPU and peripheral devices.

FIG. 15A is a block diagram showing an upper half part of parallel I/O and circuits connected.

FIG. 15B is a block diagram showing a lower half part of parallel I/O and circuits connected.

FIG. 15C is a block diagram showing another upper half part of parallel I/O and circuits connected.

FIG. 21 is a flowchart showing a subroutine of an ordinary mode process.

FIG. 22 is a flowchart showing a subroutine of relational process between lamp unit and film carrier.

FIG. 23 is a flowchart showing a subroutine for a process when both lamp unit and film carrier do not exist.

FIG. 32 is a latter part of the flowchart showing a subroutine for a process of taking in data for regularization, and analysis process.

FIG. 33 is a flowchart showing a subroutine for a gain adjusting section correcting process.

FIG. 34 is a flowchart showing a subroutine for a process of correcting LUT for regularization.

FIG. 35 is a flowchart showing a subroutine for a copy output process.

FIG. 40 is a drawing of a monitor display section showing a concrete example of indication prior to an image reading process.

FIG. 41 is a drawing of a monitor display section showing a concrete example of indication prior to an image reading process.

FIG. 42 is a drawing of a monitor display section showing a concrete example of indication prior to an image reading process.

FIG. 43 is a drawing of a monitor display section showing a concrete example of indication prior to an image reading process.

FIG. 44 is a drawing of a monitor display section showing a concrete example of indication prior to an image reading process.

FIG. 45 is a drawing of a monitor display section showing a concrete example of indication prior to an image reading process.

FIG. 59 is a flowchart showing a subroutine for an initial shading data taking in mode process.

FIG. 60 is a flowchart showing a subroutine for a checking process 2 for checking a state of a lamp unit and film carrier.

FIG. 64 is an another example of indication on a monitor display section under a serviceman mode.

FIG. 65 is an another example of indication on a monitor display section under a serviceman mode.

FIG. 66 is an another example of indication on a monitor display section under a serviceman mode.

FIG. 67 is an another example of indication on a monitor display section under a serviceman mode.

FIG. 68 is an another example of indication on a monitor display section under a serviceman mode.

FIG. 69 is an another example of indication on a monitor display section under a serviceman mode.

FIG. 70 is an another example of indication on a monitor display section under a serviceman mode.

FIG. 71 is an another example of indication on a monitor display section under a serviceman mode.

FIG. 76 is a drawing exemplifying a state of each variable magnification when a film image in different sizes is read.

DESCRIPTION OF THE PREFERRED EMBODIMENT

An embodiment of the present invention will be described hereinafter referring to the accompanying drawings.

The embodiment shows a color image reading apparatus which is arranged to read an image of colored film wherein image data are variously processed and inputted to an external apparatus, for example, a digital copying machine, to obtain a variety of copying images based on the aforementioned processing.

Figure 1:
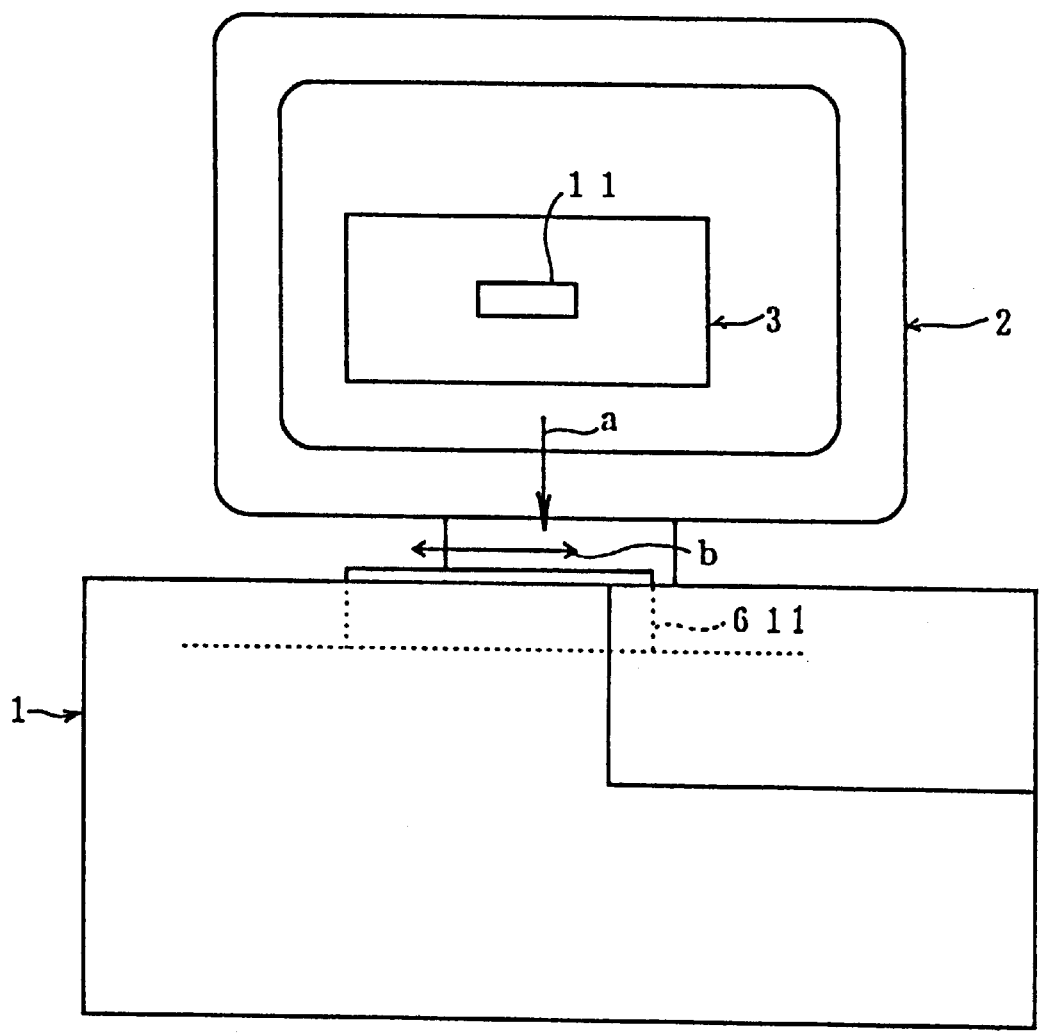
FIG. 1 is a front view showing a schematic construction of a color image reading apparatus in an embodiment of the present invention.

FIG. 1 is a front view showing a schematic construction of an apparatus in the present embodiment. As shown in FIG. 1, on the main body of the apparatus 1 where an image reading and signal processing are performed, a color CRT 2 is provided for displaying an image which has been read and performing various processing.

A film 11 to be used for image reading is held by a film carrier 3 and loaded on a film carrier holder 611 in a direction of arrow a shown in the FIG. 1. After the film is loaded, the film carrier holder 611 is moved in a direction of arrow b with the film carrier 3 so as to position a predetermined frame of the film 11 on the optical path of projection for an image reading operation.

Figure 2:
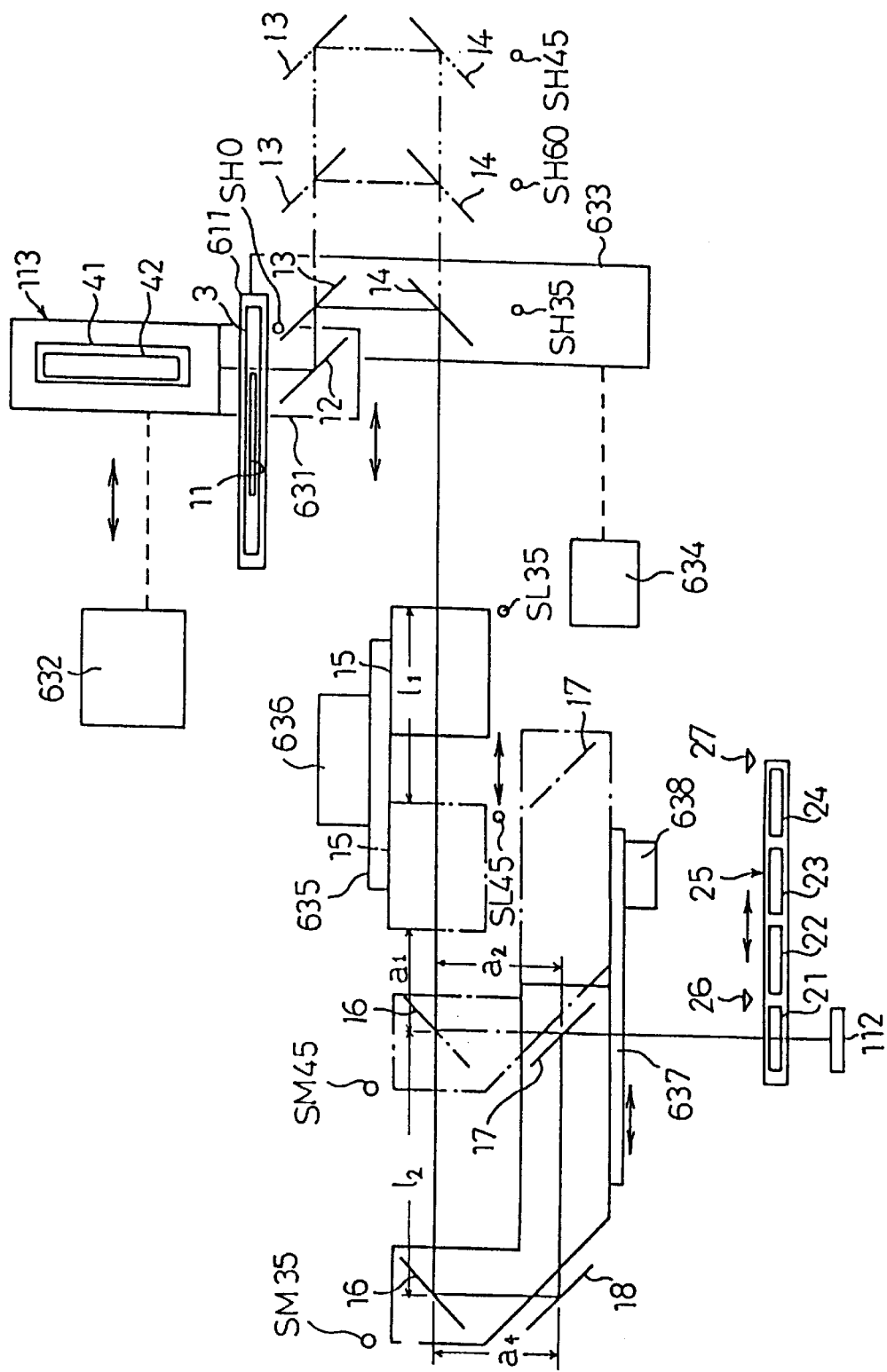
FIG. 2 is a schematic construction of the main body of the apparatus viewed from above.

FIG. 2 shows a schematic construction of an image reading apparatus viewed from the upper side of the main body of the apparatus. In the image reading apparatus of the present embodiment, a unidimensional line lighting system is adopted wherein a color CCD sensor 112 is fixed for reading a film 11 and film image. It is, therefore, arranged to move a lighting section 113 and each of first mirror, second mirror and third mirror, 12, 13, 14, reciprocatingly for reading a data in a sub-scanning direction. In FIG. 2, the lighting section 113 and each of the first, second and third mirrors 12, 13, 14, are shown by solid lines at scan starting position.

The color image reading apparatus in the present embodiment is also arranged to illuminate films in different sizes and project transmitted light to a predetermined section of each size in the CCD sensor 112 to change an image forming magnification of the color CCD sensor 112 in the optical system based on the size of film for reading images by making use of the resolution of the color CCD sensor 112 so that an image of any size can be formed over the entire area of the color CCD sensor 112.

More particularly, the magnification for a 35 mm film is 2.5050, for a 6 cm film 0.9474, and for a 4×5 inch film 0.5734, respectively, in the case when the direction of a short side of the film 11 is made the main scanning direction of the color CCD sensor 112.

In changing a projection magnification, a method of changing a conjugate length is adopted wherein the positions of the second and third mirrors 13, 14, image forming lens 15 and mirrors 16, 17 behind the lens are changed.

In a variable magnification process for a data, a sub-scanning direction is changed by variably changing a scanning speed, and a main scanning direction is changed by electrical data processing.

With regard to a relation between a film 11 and positions of various structures, the lighting section 113 and the first mirror 12 are arranged to be moved together by a scanning slider 631 and are driven in a reciprocating motion by a scanner motor 632, which is a stepping motor wherein an image of the film 11 is scanned to successively project on the color CCD sensor 112. SHO is a photosensor which is arranged to detect home positions of the lighting section 113 and the first mirror 12.

Figure 3:
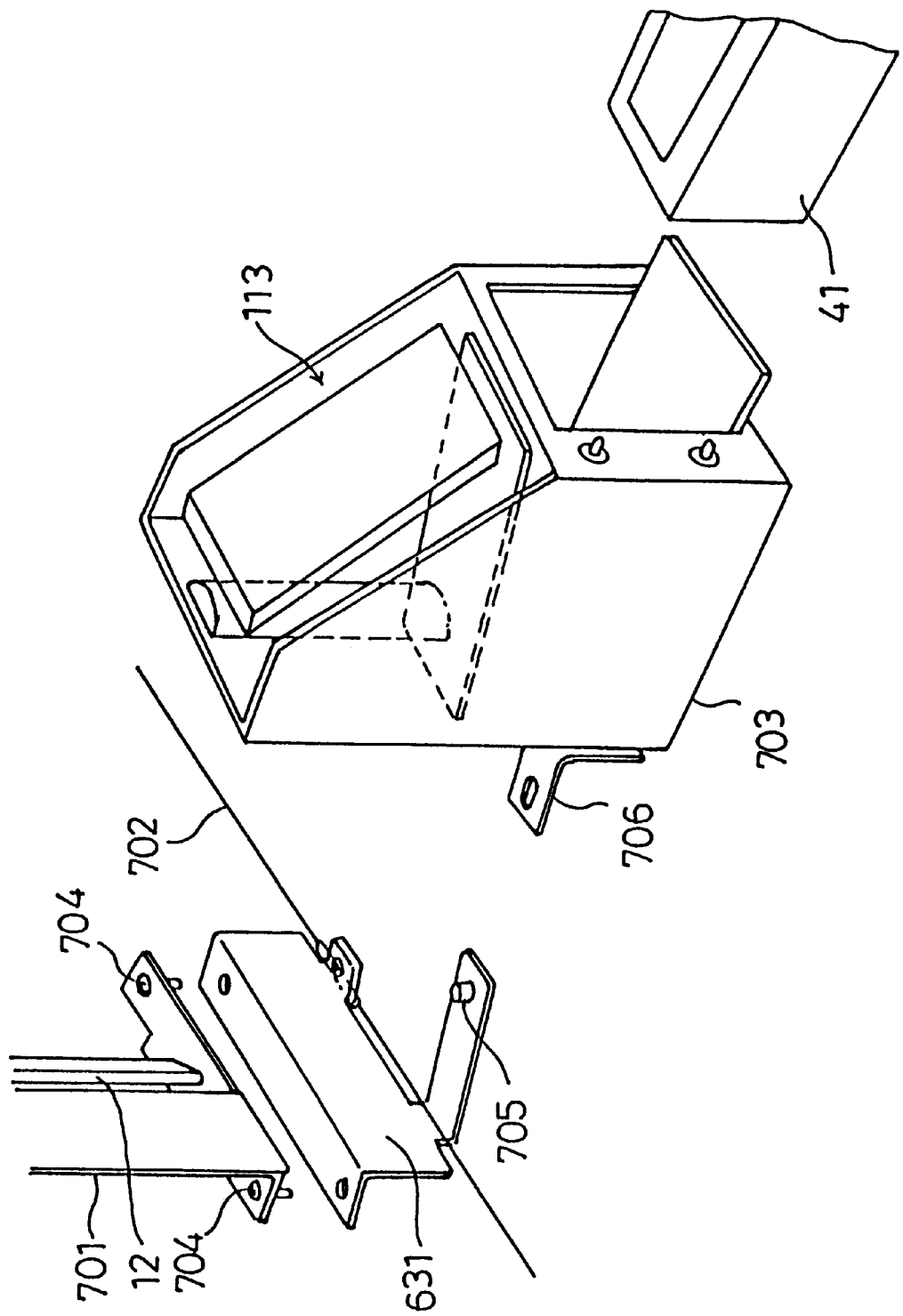
FIG. 3 is a perspective view showing a state how a first mirror is connected within a driving wire in light section.

As shown in FIG. 3, the first mirror 12 is supported by a first mirror unit 701 which is fixed with screws 704 to the scanning slider 631 attached to a wire 702 which is driven by the scanner motor 632 in order to enable the aforementioned scanning operation. The scanning slider 631 is provided with a pin 705 which is fitted into a hole of a receiving piece 706 of a lighting unit 703 in the lighting section 113 to support the first mirror 12 together, and the lighting section 113 is arranged to be moved along with a scanning operation of the first mirror 12. Said supporting mechanism may, however, be variably arranged. For instance, the first mirror 12 and the lighting unit 703 may be connected directly to the slider 631.

Figure 4:
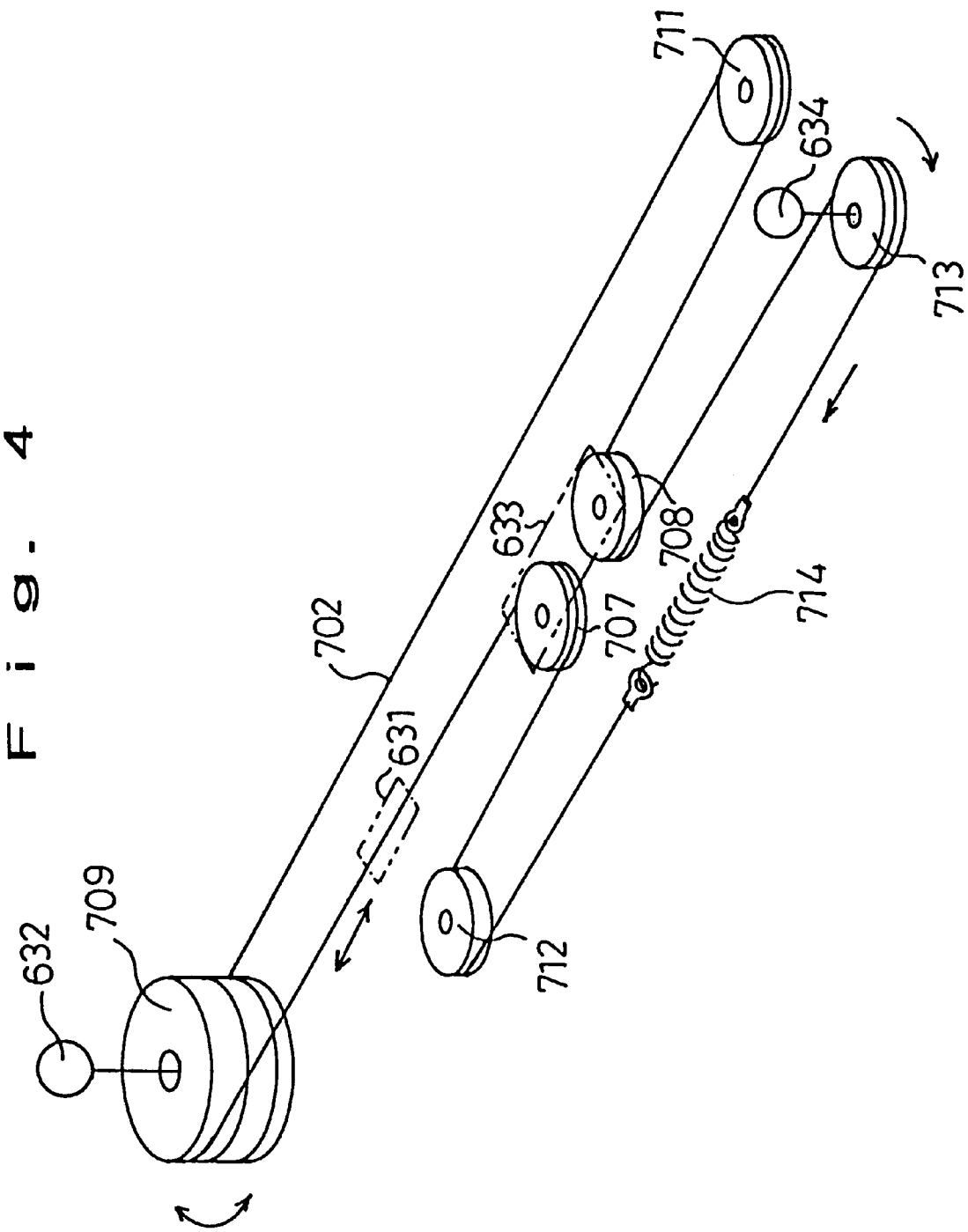
FIG. 4 is a perspective view showing a driving mechanism and how a first mirror, lighting section, a second and third mirrors are driven by a driving wire.

As illustrated in FIG. 4, each of the second and third mirrors 13, 14, are held together by a mirror slider 633 which is attached to movable pulleys 707, 708 around which the wire 702 is wound. In synchronization with the scanning operation by the first mirror 12, they are moved at a speed of V/2 relative to a scanning speed of V so as to prevent an optical path from being changed at a scanning operation.

The wire 702 is an endless wire and winds around a portion of a driving pulley 709 directly connected to the scanner motor 632 as illustrated in FIG. 4. Said wire 702 further winds around the movable pulleys 707, 708 and a conjugate length correction pulley 713 connected with driven pulleys 711, 712 and a conjugate length correction motor 634. When the wire 702 is driven by the driving pulley 709, the wire 702 is moved at a velocity of V, and, with movement of the scanning slider 631, the first mirror 12 and lighting section 113 are moved at a velocity of V to perform said scanning operation. The movable pulleys 707, 708 are moved at a velocity of V/2 with the mirror slider 633, and during a scanning operation by the first mirror 12, each of the second mirror and third mirror 13, 14 are moved at a velocity of V/2 as mentioned above.

When the wire 702 is driven by the conjugate length correction pulley 713, the wire 702 is partly moved with the movement of the movable pulleys 707, 708 to correct a conjugate length by moving only the second and third mirrors 13, 14 since the driving pulley 709 is not rotated. Both ends of the wire 702 are connected with a spring 714.

Figure 5:
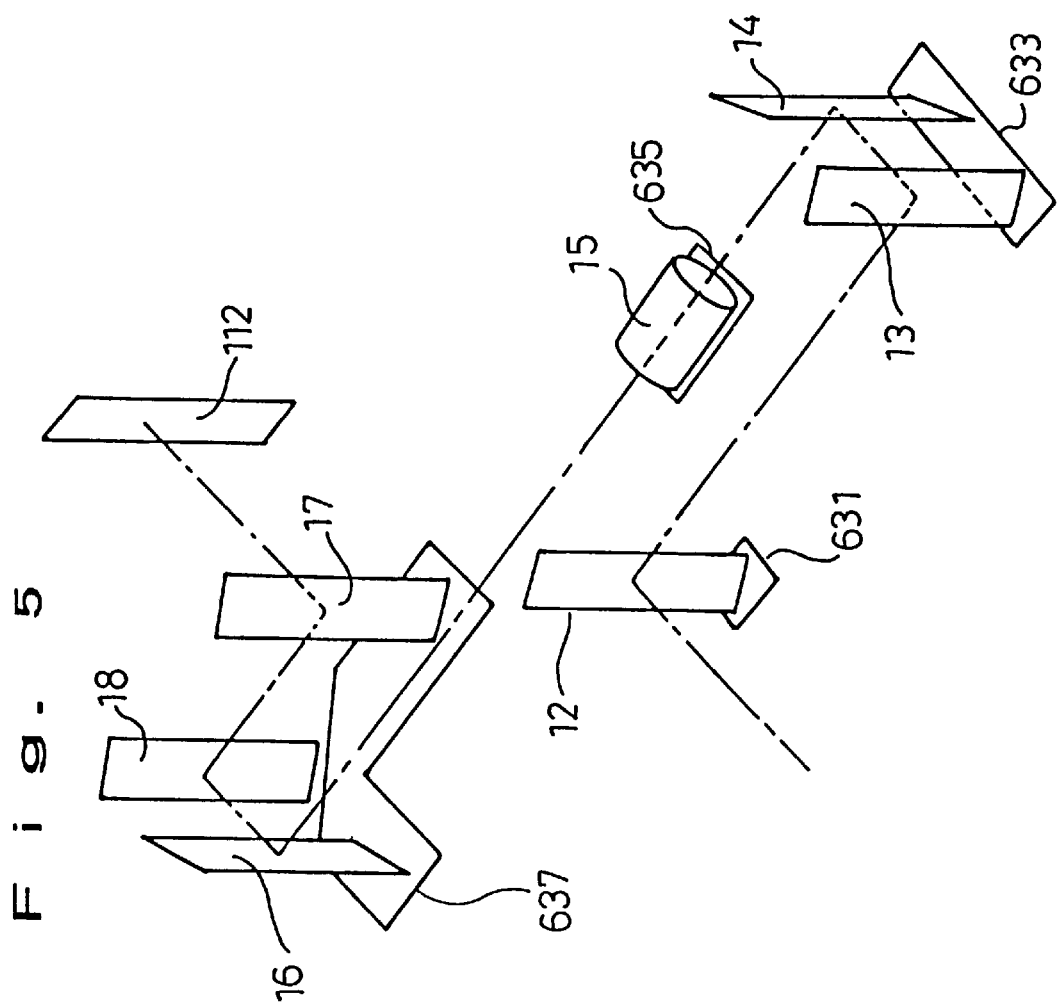
FIG. 5 is a perspective view showing a state of projection when 35 mm film is used in an optical system shown in FIG. 2.
Figure 6:
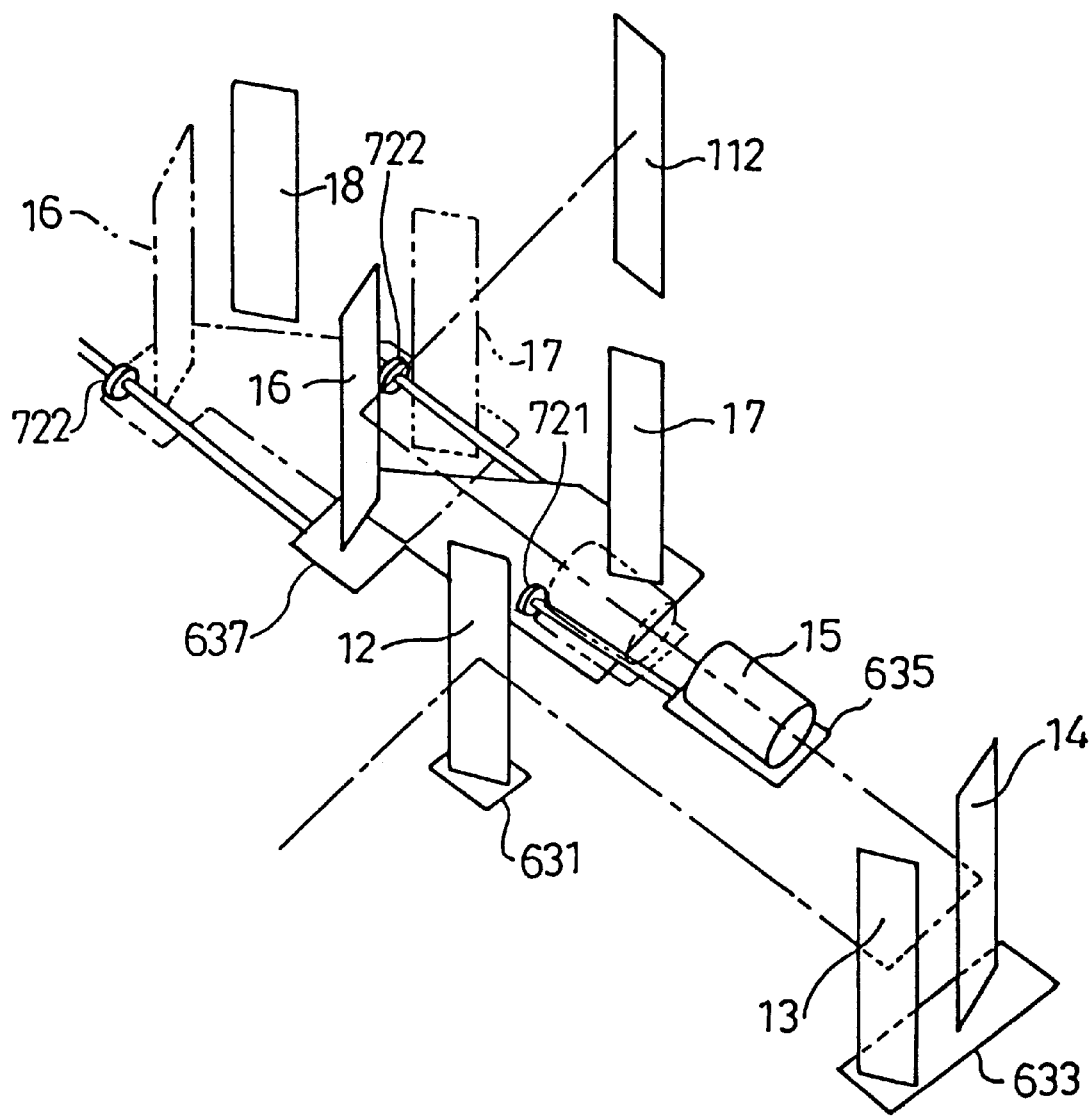
FIG. 6 is a perspective view showing a state of projection when 6 cm film and 4×5 inch film are used in an optical system shown in FIG. 2.

As illustrated in FIG. 2, positions of the second and third mirrors 13, 14 for each size of films at a scan starting time are shown by a solid line for 35 mm film, by one-dot chain line for 6 cm film, and by two-dots chain line for 4×5 inch film respectively. A state of the optical system in the case of 35 mm film is shown in FIG. 5. In FIG. 6, the states of the optical system are shown by solid line in the case of 6 cm film, and by phantom line in the case of 4×5 inch film respectively. Each of the positions is detected by photosensors SH35, SH60 and SH45 shown in the FIG. 2.

The image forming lens 15 is supported by a lens slider 635, and is driven by a lens motor 636, which is a stepping motor, in reciprocating motion to perform said magnification variation. For positional control of the image forming lens 15, the same position as shown by solid line in FIG. 2 can be applied to 35 mm film, and 6 cm film, and the position for 4×5 inch film is shown by one-dot chain line. Each of said positions of the image forming lens 15 is detected by the photosensor SL35 and SL45.

Mirrors 16, 17 are supported together by a mirror slider 637 and driven in reciprocating motion by a mirror motor 638 which is a stepping motor. The positions of the mirrors 16, 17 for 35 mm film are shown by solid line in FIG. 2 to cooperate with a fixed mirror 18. For 6 cm film and 4×5 inch film, the positions of the mirrors 16, 17 are shown by one-dot chain line to be operated independent of the fixed mirror 18.

The mirror 18 at the back of lens to be used for reading an image of 35 mm film is, therefore, fixed at the position shown by solid line in the FIG. 2, and is positioned within the optical path relative to the mirrors 16, 17, which have reached the position of the solid line for reading an image of the 35 mm film, however, relative to the mirrors 16, 17, which have reached the position of the one-dot chain line for reading images of 6 cm film and 4×5 inch film, it comes off the optical path. The controlled positions of the mirrors 16, 17 are detected by photosensors SM35 and SM45.

With the above-described optical system, a variable magnification process corresponding with the size of an original can be performed for a wider range of variable magnification without moving the light receiving surface to facilitate simplification of the construction of an image reading apparatus, and a compact and small sized apparatus can be manufactured.

With two positions of the projection lens 15, and said two positions of each fourth and sixth mirrors 16, 17, three kinds of projection magnification can be obtained whereby the efficiency in changing over optical system for variable magnification is improved. The mirrors 16, 17 are provided on the movable mirror slider 637. If, therefore, it is arranged to lead a light from the fourth mirror which is the mirror 16 directly onto light receiving surface of the color CCD sensor 112 with the movement of the mirror slider 637, the movement of the mirror 16 to a predetermined position and the retraction of the mirror 17 from a projection optical path can be performed together.

In FIG. 2, when the projection lens 15 and the mirror slider 637 provided with mirrors 16, 17 are positioned at two locations, and the amount of movement of the projection lens 15 is set at $l_1$ and the amount of movement of the mirror slider 637 is set at $l_2$, the following four kinds of optical path lengths can be selected for an optical path length L behind the projection lens 15.

$$L_1 = l_1 + 2l_2 + A$$

$$L_2 = l_1 + A$$

$$L_3 = 2l_2 + A$$

$$L_4 = A$$

where: A:constant, $A = a_1 + a_2 + a_4$

If, however, $L_2 - L_4$ is chosen, $L_1$ is automatically set as:

$$L_1 = l_1 + 2l_2 + A = (L_2 - L_4) + (L_3 - L_4) + L_4 = L_2 + L_3 - L_4$$

Thus, the magnifications which can be practically designed are three kinds.

When an optical path length behind the projection lens 15 is determined from a variable magnification and a focal length of the projection lens 15, three kinds of magnifications can be freely designed by considering a setting of the above-mentioned $l_1$, $l_2$ and A.

By setting only two positions of the projection lens 15 and the lens slider 637 as illustrated in FIG. 6, position control can be easily performed by only moving them to a position where they come in contact with stoppers 721 and 722.

With regard to an optical path length in front of the projection lens 15, it may be freely set by an arrangement adopted in the present embodiment. The position (optical path length) of each of the second and third mirrors 13, 14, is detected and controled by the photosensors SH35, SH60 and SH45.

For more than three kinds of magnifications, it may be arranged to provide more than three positions of the projection lens 15. In this case, a well-known zooming mechanism can be applied for determining positions. An example is shown in FIG. 76, wherein a focal length of the projection lens 15 is f=102 mm.

$L_1 = l_1 + 2l_2 + A = 343$ mm      (for 35 mm film)

$L_2 = l_1 + A = 183$ mm      (for 6 cm film)

$L_4 = A = 145$ mm      (for 4×5 inch film)

Accordingly, A=145 mm, $l_1$=38 mm, and $l_2$=80 mm.

The projection lens 15 is moved by said three kinds of variable magnifications. When, however, variable magnification is performed for two kinds, it can be satisfactorily performed by a movement of mirror and changing over the number of sheets of mirrors behind the projection lens 15.

In front of the color CCD sensor 112, there is provided a filter section 25 wherein four kinds of filters 21, 22, 23, 24 are loaded. The filter section 25 is provided with a function to match a light amount to the color CCD sensor 112 and the balance of R, G, B with a standard condition corresponding to negative and positive films. The filter 21 is inserted when an image of negative film is practically read. For example, an LB100 is utilized. The filter 22 is inserted when an image of positive film is practically read. An ND filter is used for example. The filter 23 is inserted when a data for shading correction of negative film is taken in. The filter 24 is inserted when the data for shading correction of positive film is taken in.

The filters are independently used when a practical operation is performed and when a shading correction data is taken in. Since there is not any film loaded when a shading correction data is taken in, while there is a film loaded when a practical operation is performed, there causes difference in the amount of light and balance, and therefore, the difference has to be corrected. The change of a filter in the filter section 25 is conducted by an unillustrated stepping motor like the mirrors described above. As auxiliary mechanisms, there are provided a sensor 26 for detecting the limit of right position and a sensor 27 for detecting the limit of left position in a range of movement of the filter section. By providing the filter section 25 just in front of the color CCD sensor 112, the filters 21, 22, 23, 24 can be manufactured small in size substantially the same as that of the color CCD sensor 112, and eventually, the filter section 25 can also be arranged extremely small in size with only a necessary margin added to it.

Figure 7:
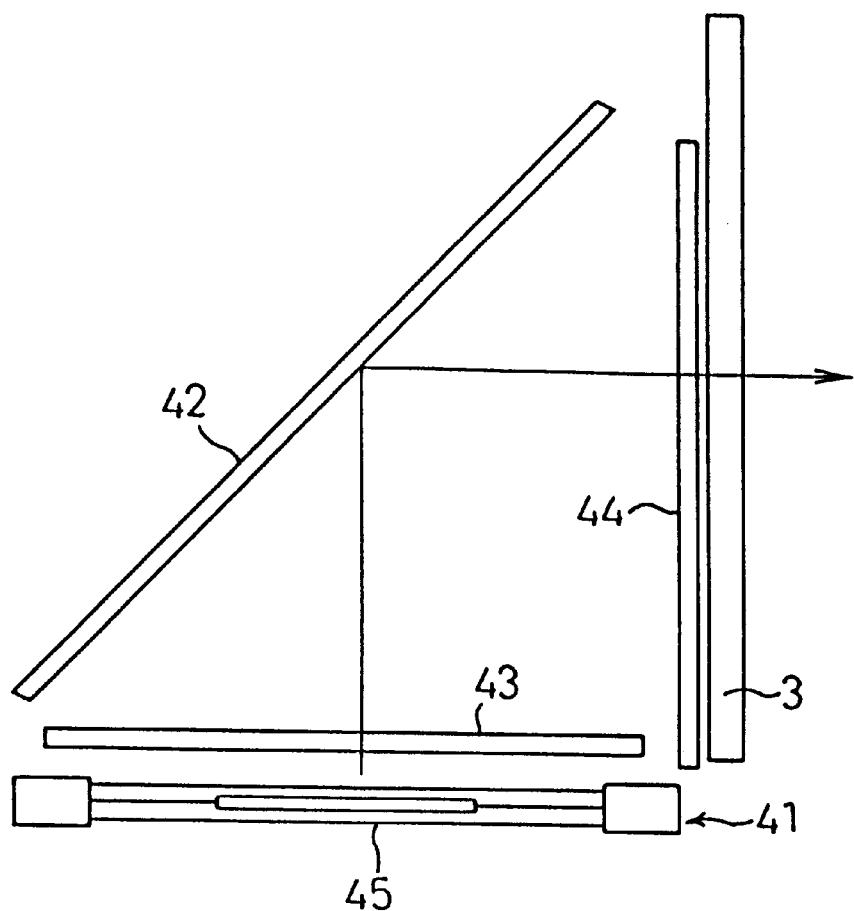
FIG. 7 is a side view showing a schematic construction of a lighting section.

A scanning for reading a film in a sub-scanning direction is conducted by an unillustrated stepping motor provided for a scanning operation by driving the lighting section 113 and each of the first, second, third mirrors 12, 13 and 14. The lighting section 113 comprises an exchangeable lamp unit 41, a light-path folding mirror 42, a heat protection filter 43 shown in FIG. 7, and a semicylindrical lens 44 having light collecting face and light diffusing face on both faces and illuminates a film 11 held by the film carrier 3 loaded on the film carrier holder 611 positioned between the lighting section 113 and the moving area of each first, second and third mirrors, 12, 13 and 14, thereby forming an image of the film 11 on the color CCD sensor 112 by the image forming lens 15.

The folding mirror 42 is provided for guiding an illuminated light emitted from a halogen lamp 45 horizontally set in the lamp unit 41 to a film vertically disposed at a position higher than the position where the lamp is disposed. The semicylindrical lens 44 is provided for improving convergence of light, and the light diffusing face of the lens is arranged to prevent adhered dust from springing out on an image projected.

Figure 8:
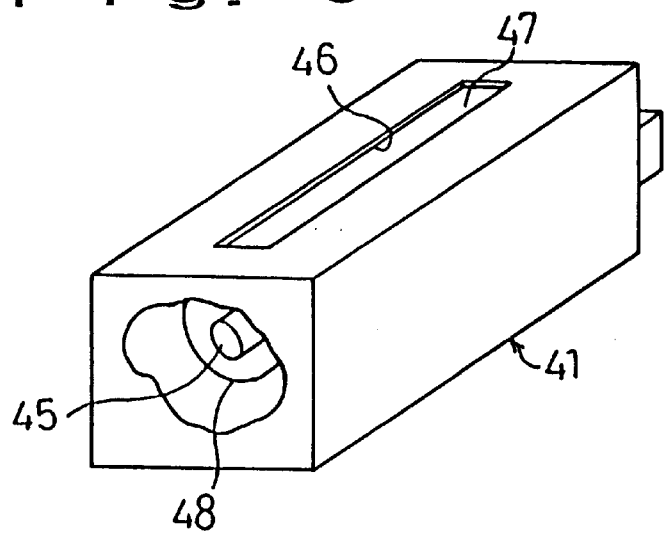
FIG. 8 is a perspective view showing a lamp unit.
Figure 9:
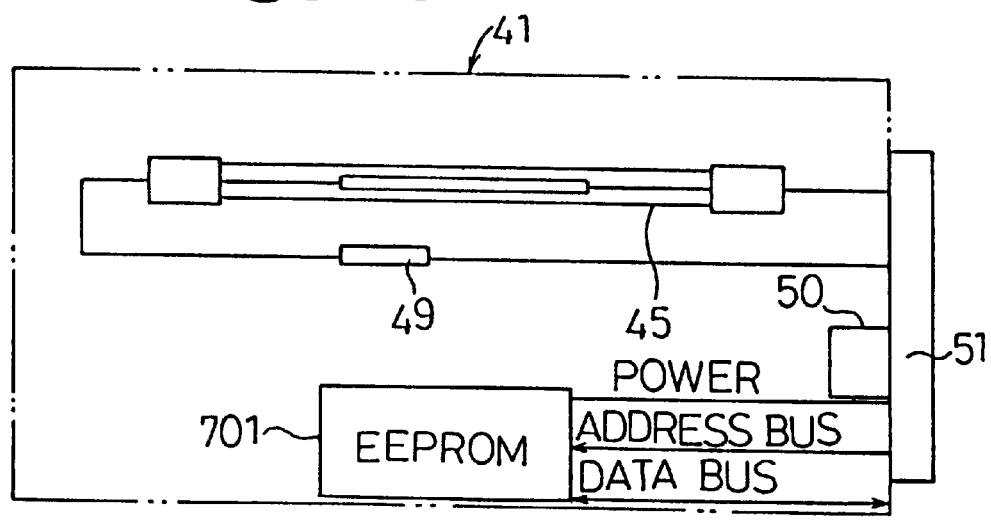
FIG. 9 is a conceptional view showing the internal construction of a lamp unit.
Figure 11A:
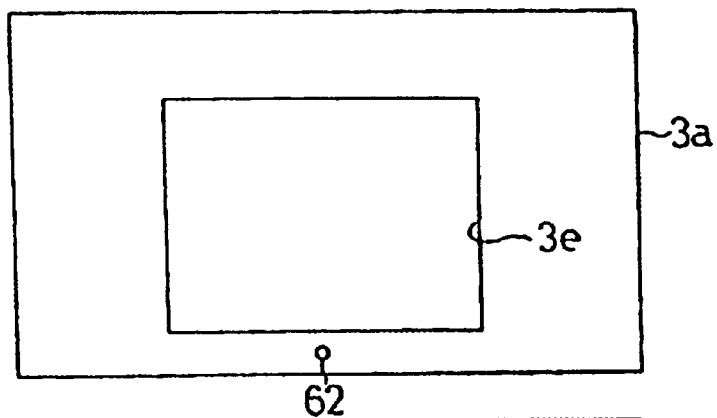
FIG. 11 is a front view showing film carriers.
Figure 11B:
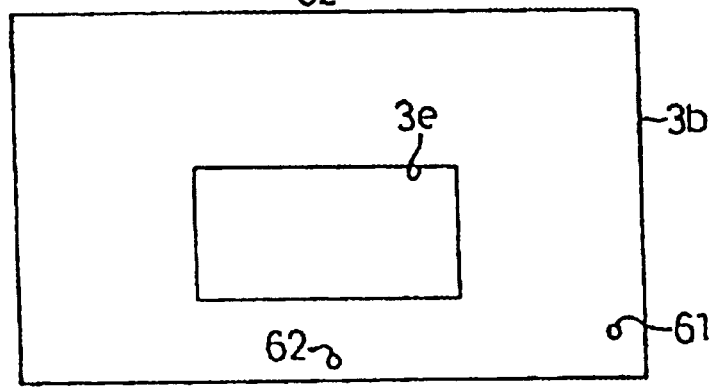
Figure 11C:
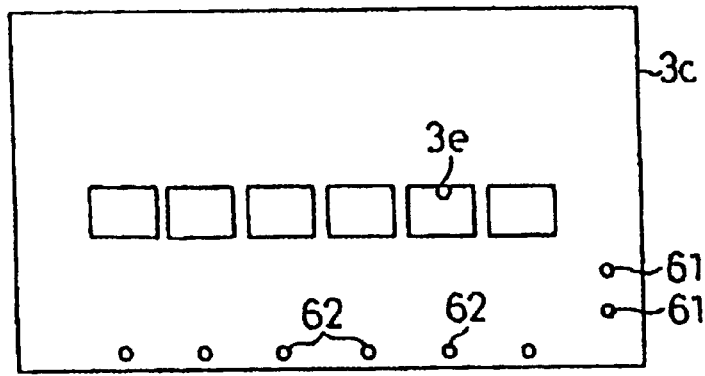
Figure 11D:
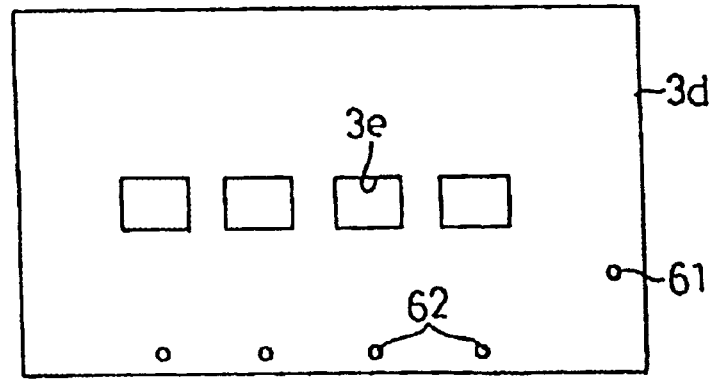
Figure 12A:
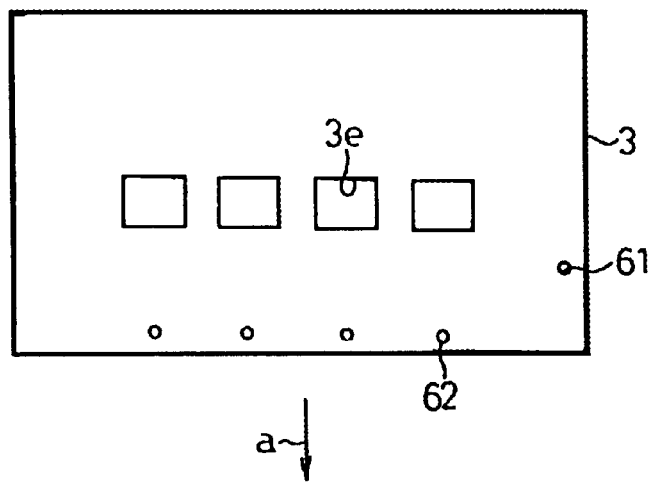
FIG. 12 is a front view showing a section for detecting a kind of film carrier.
Figure 12B:
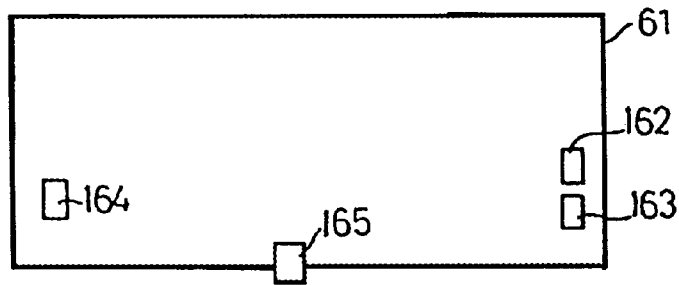

As shown in FIG. 8, the lamp unit 41 is formed in a box shape, and a light throwing window 46 is provided at the top of the unit. In the unit, there is provided a shutter 47 which is arranged to either open the light throwing window 46 when a lamp 45 is loaded or close the window 46 when a lamp 45 is not loaded. As illustrated in FIGS. 8 and 9, the lamp unit 41 includes a reflecting shade 48 for directing the light emitted from the lamp 45 toward the light throwing window 46, a short wire 50 for distinguishing a kind of lamp unit 41, and a connector 51 for electrically connecting the lamp unit 41 with the main body of the apparatus 1 when the lamp unit 41 is mounted on the main body of the apparatus 1. In the short wire 50, a two-bit code is preliminarily set, and a connecting state of two short wires 50 is identified by taking in a data from a parallel I/O port 206 by CPU 200 shown in FIG. 14.

Figure 10:
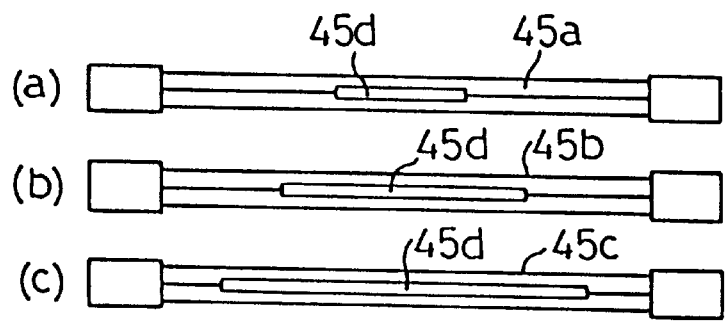
FIG. 10 is a drawing showing kinds of lamps.

Three kinds of lamp units 41 are provided as illustrated in FIG. 10, wherein (a) shows a lamp unit provided with a lamp 45*a* for 35 mm film, (b) a lamp unit provided with a lamp 45b for 6 cm film, and (c) a lamp unit provided with a lamp 45c for 4×5 inch film respectively, and they are exchanged according to a requirement. It is arranged that accompanying an enlargement of the size of a film 11, the length of an effective light emitting section 45d of the lamp units 45a–45c becomes larger.

If the lamp 45 is commonly used, a lamp 45 of enormous wattage is required whereby an unnecessary large amount of electricity is consumed even when a smaller size film 11 is projected. There is also a problem when a film 11 which possesses smaller tolerance against temperature is used. Such a problem can, however, be solved by changing the kind of lamp 45 corresponding to the size of a film 11 though each of the lamps 45a–45c should be properly selected and used corresponding to the size of a film 11. In order to ensure the selection, the kind of lamp unit 41 mounted on the main body of the apparatus 1 is automatically detected.

In the lamp unit 41, there is disposed a data storage memory 701 (EEPROM: nonvolatile) as shown in FIG. 9. A power source, address bus, data bus and control line (not shown) are therefore required. Information peculiar to the lamp unit 41 (shading operation coefficient, lamp voltage, gain value, etc.) are stored in the memory 701. It is, therefore, not necessary to specially provide a memory area in the main body of the apparatus.

There are four kinds of film carriers 3 as illustrated in FIG. 11, wherein (a) shows a film carrier 3a for 4×5 inch film, (b) a film carrier 3b for 6 cm film, (c) a film carrier 3c for 35 mm continuous film, and (d) a film carrier 3d for 35 mm mounted film, The film carrier 3b for 6 cm film is provided with a projection window 3e of 6×9 mm to cope with various sizes of 6 cm film which covers the sizes of 6×4.5, 6×6, 6×7 and 6×9.

In each of the film carriers 3a–3d, two supporting plates on both sides are opened and closed with an upper hinge connection section as a supporting point to insert and draw out a film 11. The external dimension of each one of the film carriers 3a–3d is made the same to unify the condition to be received by the main body of the apparatus 1 so that the construction of the main body 1 and a detachable operation can be simplified.

Each one of the film carriers 3a–3d differs by the position of a hole 61 provided for detecting a kind of film, by the number of holes, and by the condition whether there is a hole or not. A kind of film held by each one of the film carriers is thus optically detected.

In each one of the film carriers 3a–3d, there is also provided a hole 62 for detecting a proper setting position of each film carrier 3 relative to each film projection window 3e whereby the films held by each of the film carriers 3a–3d are optically detected as to whether they are properly set on the light path of projection.

In a film carrier holder 611 which holds and moves the film carrier 3, there are stored in a way of inserting a film carrier 3a–3d transmission photosensors 162, 163 for detecting a kind of film carriers 3a–3d, and a transmission photosensor 164 for detecting whether a film carrier 3a–3d is mounted or not. At the location adjacent to the film carrier holder 611 of the main body of the apparatus 1, there is provided a transmission photosensor 165 for detecting a state how each of the film carriers 3a–3d is set in a way of inserting the film carrier holder 611.

As illustrated in FIG. 13, a color CRT 2 comprises a monitor display section 71 for indicating an image read from a film 11, for setting a copy mode and trimming area, an operation panel 72 for indicating a print operation, and an internal panel 73.

The monitor display section 71 includes the following display section and control section:

(1) Image display area 81 for indicating a film image which has been read.

(2) Message display section 82 for indicating a kind of lamp unit 41 and a kind of film carrier 3 required. It also indicates that a shading correction data is being taken in, and a message for taking out a film carrier as well as a kind of film and the an output of a sheet of paper.

(3) Image adjusting button 83: When an image is adjusted, a submenu is indicated by selecting the button 83 by cursor to enable a setting of an image adjustment such as color balance.

(4) Trimming button 84 for setting a trimming mode.

(5) Enlarged continuous copying button 85 for setting an enlarged continuous copying mode. By selecting this button, a submenu is indicated to enable a setting of an output size.

(6) Reduced continuous copying button 86 for setting a reduced continuous copying mode.

(7) Output confirmation button 87 for confirming an output of indicating a relation between an image to be printed out and the size of a sheet.

(8) Output size button 88 for designating the size of a sheet for a printer. By selecting this button, a submenu is indicated to enable a setting of the size of a sheet.

The operation panel 72 is provided with the following operation members:

(1) Track ball 93: A required process is selected by moving a cursor on the monitor display section 71 to a position of various process buttons indicated. The movement of a cursor is conducted by indicating an amount of movement in a direction of X with an X direction pulse which corresponds to a direction and amount of rotation of the track ball 93, and an amount of movement in a direction of Y with a Y direction pulse.

(2) Track ball input key 94: An instruction signal which corresponds to a process at a position of cursor operated by the track ball 93 is inputted into CPU200.

(3) Stop key 95 for indicating an interruption of a copying and image inputting operations.

(4) Image input key 96 for instructing the apparatus to read a film image and indicate it on the color CRT 2.

(5) Print key 97 for instructing the start of a copying operation.

The internal panel 73 is provided with the following control section and display section:

(1) Direction code display section 101 for indicating a direction.

(2) Total counter 102 for indicating a total number of copy sheet.

(3) Serviceman key 103 for instructing a setting of an operation mode by a serviceman.

(4) User key 104 for indicating a setting of user's choice mode.

(5) Trouble reset key 105 for releasing a state of internal trouble.

(6) CPU reset key 106 for mechanically resetting CPU200.

(7) Initial key 107 for instructing an initial setting.

A circuit diagram surrounding the CPU200 is shown in FIG. 14. The CPU200 controls the entire apparatus based on the contents of a program stored in a program ROM201. At the periphery of the CPU200, the following devices are connected by CPU address bus and CPU data bus:

(1) EEPROM202 which stores parameter for adjusting dispersion between each device. It is able to read and write electrically.

(2) RAM 203 for storing a variable required for executing a program.

(3) Timer 204 for making up a predetermined timer value from a clock signal set by the CPU 200.

(4) Communication port 205 for communicating information with external devices and a memory 701 in the lamp unit 41.

(5) Parallel I/O port 206 for outputting control signals for controlling peripheral devices and inputting a signal of the state of peripheral devices.

(6) Input image memory 207 for storing an image data read by the color CCD sensor 112.

(7) Table ROM 208 for storing a required table information.

(8) AGDC 210 for controlling a display of the color CRT2 by controlling the contents of VRAM 211.

At the periphery of AGDC 210, the following devices are connected by AGDC bus and AGDC data bus:

(1) VRAM 211 which stores data related to display control of the color CRT 2.

(2) KANJI (Chinese character) ROM 212 which generates graphic data of Chinese character from Chinese character code.

(3) RAM 213 provided for an operation which is used as operation area when the contents of VRAM 211 is controlled.

The CPU address bus and AGDC address bus, and CPU data bus and AGDC data bus are connected through AGDC 210 respectively.

In FIG. 15, there is shown a signal input/output section centering around parallel I/O port 206 to which are connected scanner motor driving circuit 301, filter driving circuit 302, film carrier detection mechanism 303, cooling fans 304a, 304b, lamp control circuit 305, lamp unit 41, lens driving circuit 306, operation panel 72, internal panel 73, track ball 93, image processing circuit 307 and mirror driving section 308.

The scanner motor driving circuit 301 is provided for moving each of the first, second, third mirrors 12, 13, 14 and the lighting section 113 at a predetermined speed by instructions received from the CPU200 to drive the lamp slider 631 and mirror slider 633 by controlling the scanner motor 632 and the conjugate length correction motor 634. The photosensors SHO, SH35, SH60 AND SH45 are connected to obtain positional information for position control. As a safety measure, the maximum and minimum scanning positions are detected to prevent a crash caused by over scanning under abnormal condition.

The scanner is controlled by the following signals. However, since they are well known known, well description will be omitted:

(1) Motor driving signal which instructs a speed of rotation of motor.

(2) Regular/reverse rotation signal which instructs the rotating direction of a motor.

(3) Maximum scan position detecting signal which indicates that the scanner is at the maximum scan position.

(4) Minimum scan position detecting signal which indicates that the scanner is at the minimum scan position.

(5) Scan home position detecting signal which indicates that the scanner is at home position.

The filter driving circuit 302 drives filter section 25 to changeover four kinds of filters 21–24 by an operation mode.

The filter section 25 is controlled by the following signals. A stepping motor is used for driving, and positioning is conducted by controlling the number of driving steps from a standard position detection sensor.

(1) On/off signal for moving and stopping the filter section 25.

(2) Regular/reverse rotation signal for instructing a direction of movement of the filter section 25.

(3) Limit of left position signal for indicating that the filter section 25 is at the left limit of position.

(4) Limit of right position signal for indicating that the filter section 25 is at the right limit of position.

The film carrier detecting mechanism 303 is provided for distinguishing a kind of said film carriers 3a–3d, by detecting whether film carrier 3 is set or not, and detecting a state whether film carrier is properly set at a predetermined position wherein the following signals are used:

(1) Carrier detecting signal which indicates that film carrier 3 is mounted in the main body of the apparatus 1.

(2) Carrier set detecting signal which indicates whether each of the film carriers 3 is set at a normal position for projection.

(3) Kind of film detecting signals 1, 2, 3, 4 for distinguishing a kind of film 11 by a kind of film carrier 3a–3d set by combination with photosensor 61.

Description will now be made on a combination of the kind of film detecting signals 1, 2, 3, 4, and a kind of film 11 which is indicated by the combination of the signal that are shown in Table 2 below.

TABLE 2

| | 35 mm Continuous Film | 35 mm Mounted Film | 6 cm Film | 4 × 5 inch Film |
|---|---|---|---|---|
| Kind of Film Detecting Signal 1 | Low | Low | High | High |
| Kind of Film Detecting Signal 2 | Low | High | Low | High |

The lamp control circuit 305 controls the quantity of light of the lamp 45, and turning on and off of the light. A DC voltage to be applied to the lamp 45 from the lamp control circuit 305 is supplied to the lamp unit 41. The following signals are used for said control:

(1) Output voltage setting signal provided for setting an impressed voltage to the lamp 45 which is given by a five bit signal.

(2) Lamp on/off signal for controlling turning on/off of the lamp 45.

(3) Abnormal state detecting signal for detecting an abnormal state of lighting and the time when the lamp is run down.

A lamp unit 41 needs to be selectively used to fit to a kind of film 11. In order to meet this requirement, the aforementioned signals of kind of lamp unit detecting signals 1, 2, and a signal by a short wire 50 provided for detecting a kind of lamp unit 41 are used.

The relations between a combination of the kind of lamp unit detecting signals 1,2 and a kind of lamp unit 41 and a condition of the attachment/detachment of the lamp unit are as shown in Table 3 below.

TABLE 3

| Kind of Unit Detecting Signal 2 | Kind of Unit Detecting Signal 1 | Judgment |
|---|---|---|
| High | High | Unit is not mounted. |
| High | Low | Unit for 35 mm film |
| Low | High | Unit for 6 cm film |
| Low | Low | Unit for 4 × 5 inch film |

Cooling fans 304a and 304b are operated in order to keep optical system and inside the apparatus under a predetermined temperature, and they are controlled by the following signals:

(1) Cooling fans 1, 2 to control turning on/off of the cooling fans 304a and 304b.

Lens driving circuit 306 is changed over according to the size of a film 11 which is used at the position of an image forming lens 15, and the position of the lens is controlled by the following signals. The lens motor 635 and photosensors SL35, SL45, for detecting the position of the lens are connected to the lens driving circuit 306 for performing said control.

A positioning is conducted by controlling the number of driving steps by a signal from the standard position detecting sensor.

(1) Driving signal provided for controlling the lens driving motor when it is driven and stopped.

(2) Regular/reverse rotation signals for instructing a driving direction of the lens driving motor.

(3) Position detecting signal which indicate that the lens is at a standard position.

Mirror driving section 308 is arranged to change the positions of the mirrors 16, 17 in order to change an image forming magnification of the optical system based on the size of a film 11. The positions of the mirrors 16, 17, are controlled by the following signals.

Photosensors SM35, SM45, for detecting positions of the mirror motor 638 and mirrors are connected with the mirror driving section 308. Positioning of the mirrors 16, 17, is conducted by controlling the number of driving steps from a respective standard position detecting sensor.

(1) Mirror driving signal is provided for driving and stopping the mirrors 16, 17.

(2) Position detecting signal which indicates that each of the mirrors 16, 17, is at a standard position.

(3) Regular/reverse rotation signal for instructing either regular or reverse rotation of the mirrors 16, 17.

With regard to an image processing circuit 307, image data is transmitted by exchanging the following unillustrated signals with a copying apparatus besides communication line:

(1) Power source on signal which indicates whether a printer section is turned on or not.

(2) Image data request signal which indicates a transmitting timing of an image signal.

(3) Effective area signal in a parallel direction which indicates an area where a printing can be performed in a parallel direction.

(4) Effective area signal in a vertical direction which indicates an area where a printing can be performed in a vertical direction.

(5) A waiting signal for printing which indicates a state that an image signal cannot be transmitted.

(6) Selector changeover signal which instructs a changeover of an image signal in the image processing circuit.

Figure 16:
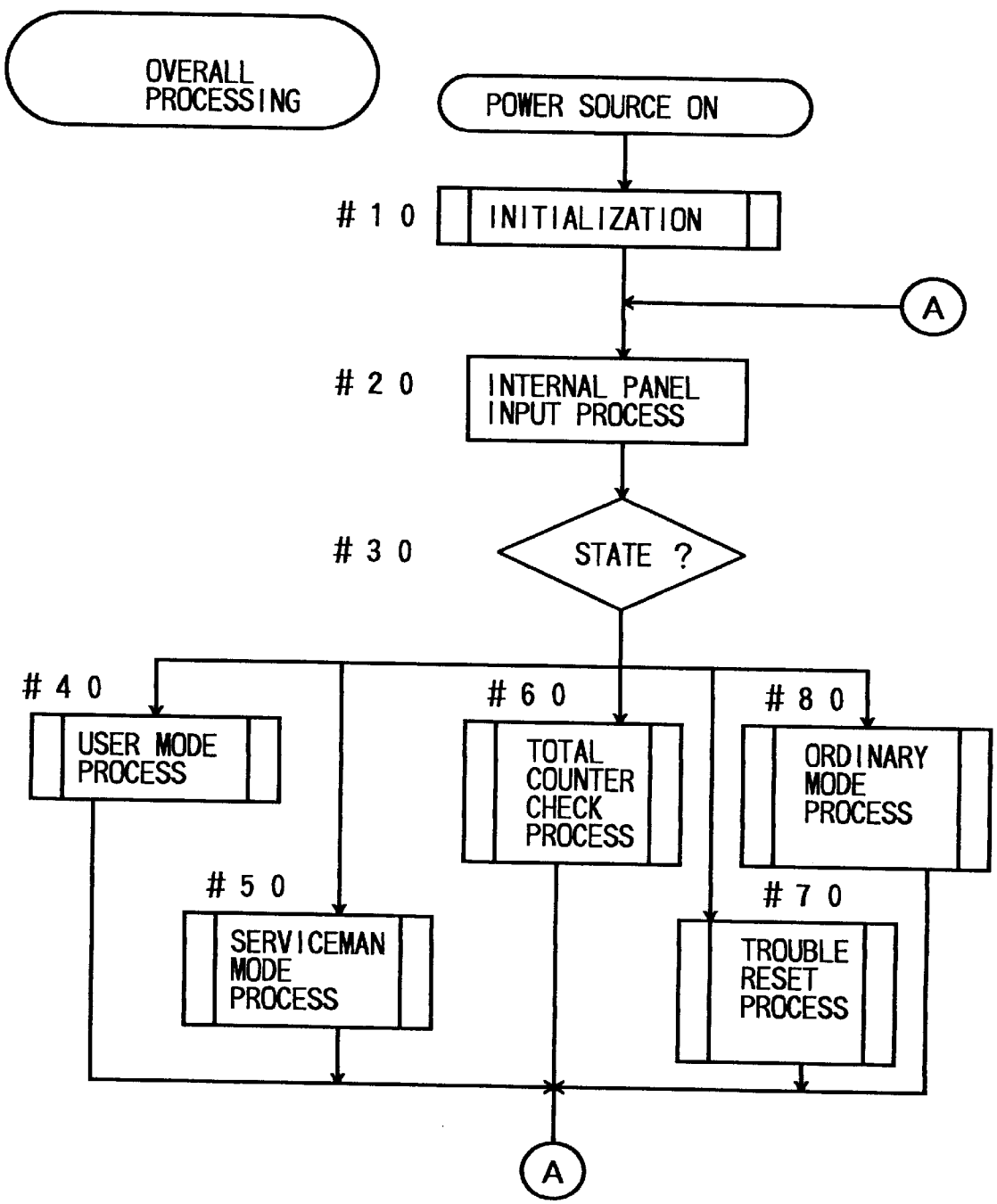
FIG. 16 is a main flowchart showing overall processing of the CPU.

FIG. 16 shows a main flow of an apparatus control.

Upon turning on a power source, a process for initialization is executed at step #10 wherein various kinds of settings such as register setting, port setting and timer setting are processed. The program then moves to step #20 for executing an input process for the internal panel. As described above, the internal panel is provided with various switches for user choice, serviceman mode, total counter check, trouble reset, initial, CPU reset, direction, and the like. Various setting and confirmation processes can be performed by operating each one of the switches. When any one of the switches is not inputted, it is considered as ordinary mode.

At step #30, a state of said switches is checked to branch to each subroutine according to a judgment made. User mode process is conducted at step #40 when the user choice switch is designated in the internal panel. At step #50, serviceman mode process is conducted when the serviceman switch is designated in the internal panel. At step #60, the total counter check process is conducted when the total check switch is designated in the internal panel. At step #70, the trouble reset process is conducted when the trouble reset switch is designated in the internal panel.

At step #80, the ordinary mode process is performed if there is no switch designation made in the internal panel. The switches in the internal panel are designated only when a special process is required. Otherwise, an ordinary mode process such as operation panel process, image reading process and copying process is conducted at step #80. The processes at steps #20, #30, #40 thorough #80 are repeatedly performed everytime the power source is turned on.

Figure 17:
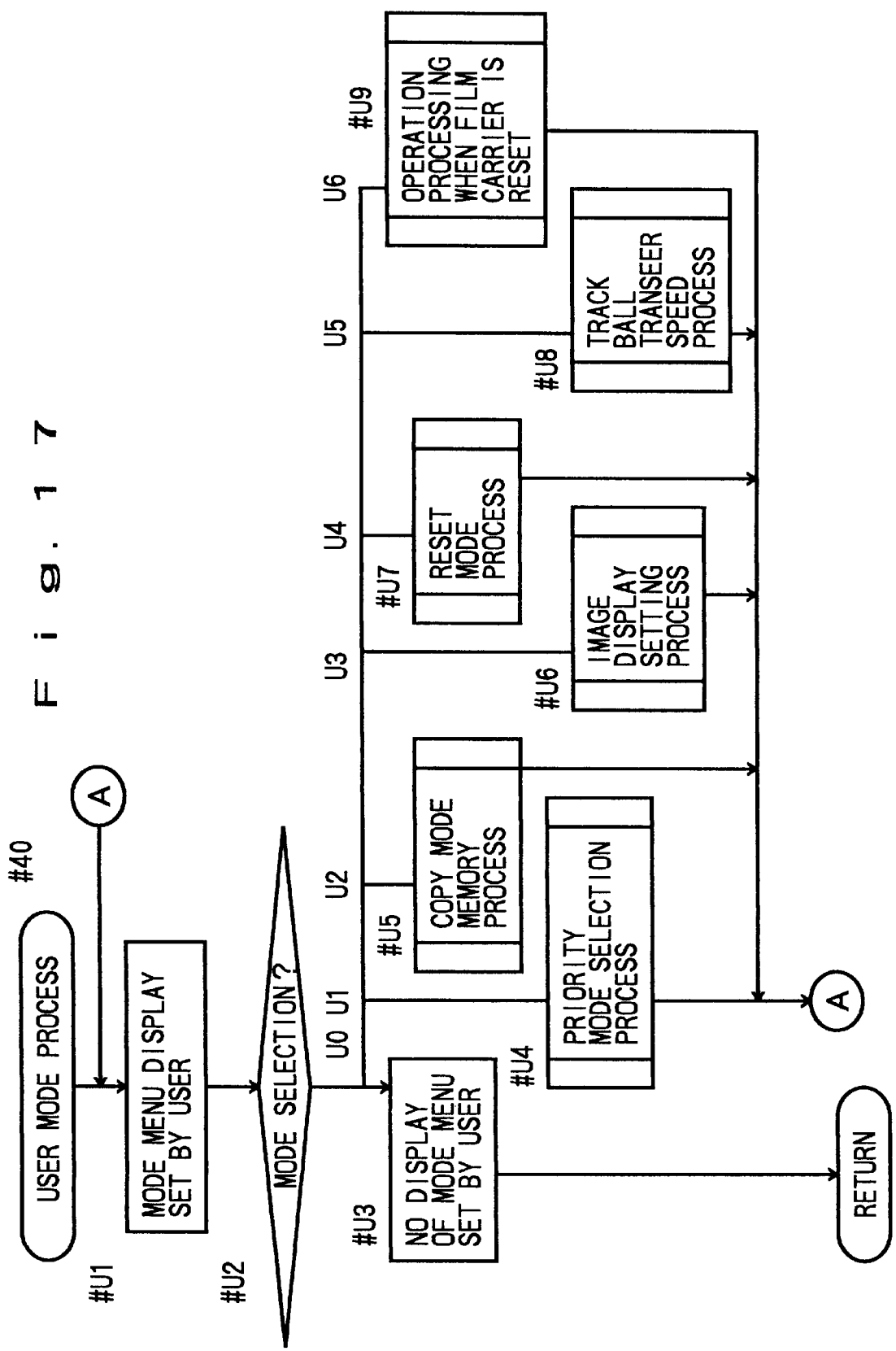
FIG. 17 is a flowchart showing a copy mode process subroutine.

In FIG. 17, a flow of the user mode process at step #40 in the FIG. 16 is shown.

Figure 18:
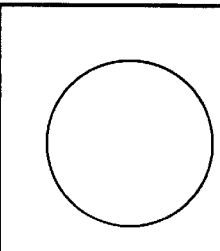
FIG. 18 is a drawing of a color CRT showing a mode setting picture under a user setting mode.

In the user mode process, a user setting mode menu is first displayed (#U1). A concrete example of the user setting mode menu is illustrated in FIG. 18. There are seven items in the menu to be chosen, and menu display and mode setting are processed by selecting each one of the items (#U2).

U1: Priority mode selection—Priority mode selection process (#U4)

U2: Copy mode memory—Copy mode memory process (#U5)

U3: Image display setting—Image display setting process (#U6)

U4: Reset mode—Reset mode process (#U7)

U5: Track ball transfer speed—Track ball transfer speed process (#U8)

U6: Operation when film carrier is reset—Operation process when film carrier is reset (#U9)

U0: Finish—User setting mode menu not displayed (#U3)

After each one of the menus of U1–U6 is finished, said processes are repeatedly performed to return to the user setting mode menu again, and with the selection of U0, the user setting mode process is finished.

Figure 19:
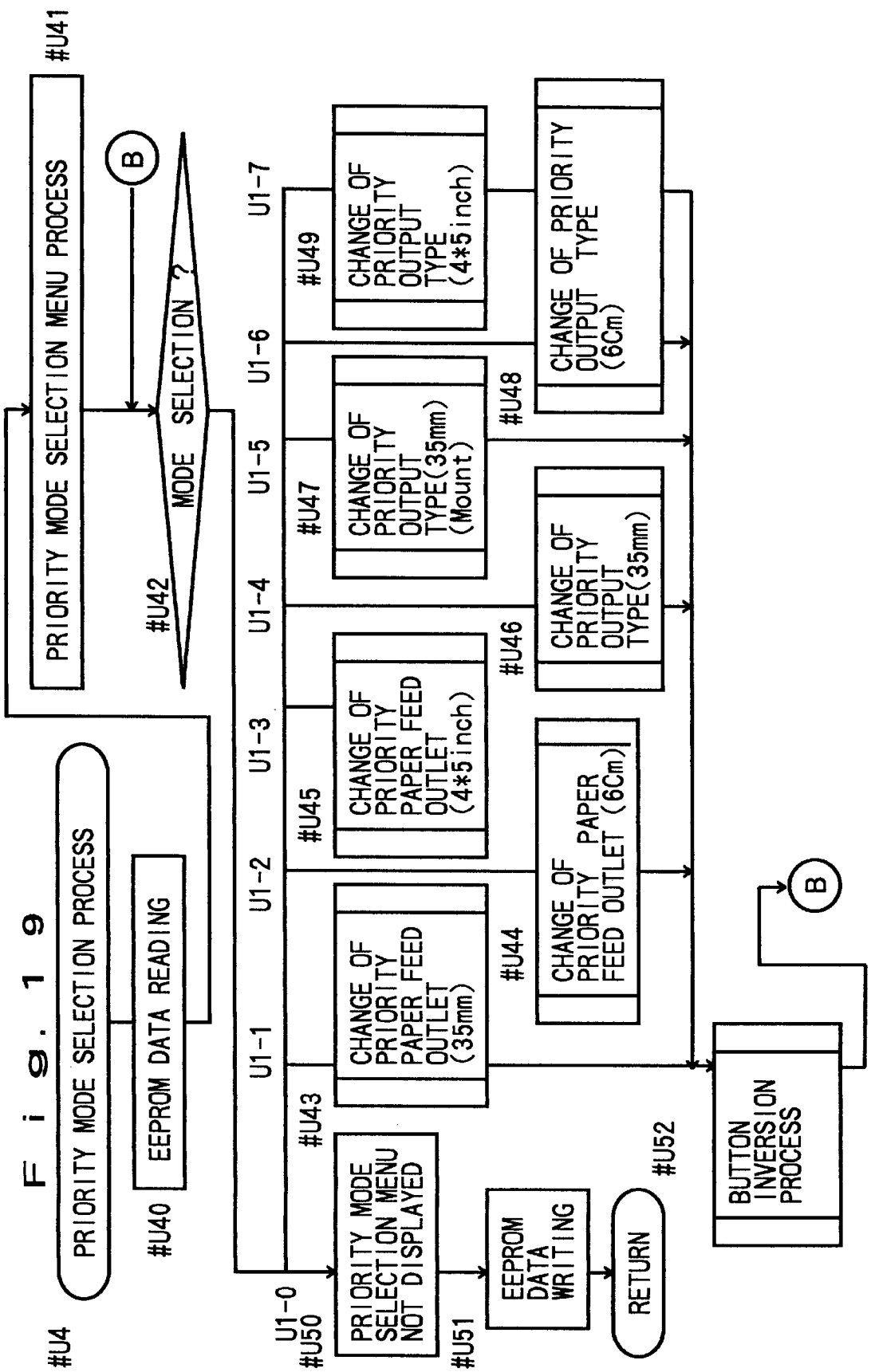
FIG. 19 is a flowchart showing a subroutine of priority mode selection process.

In FIG. 19, a flow of priority mode selection process at step #U4 in the FIG. 17 is illustrated.

Figure 20:
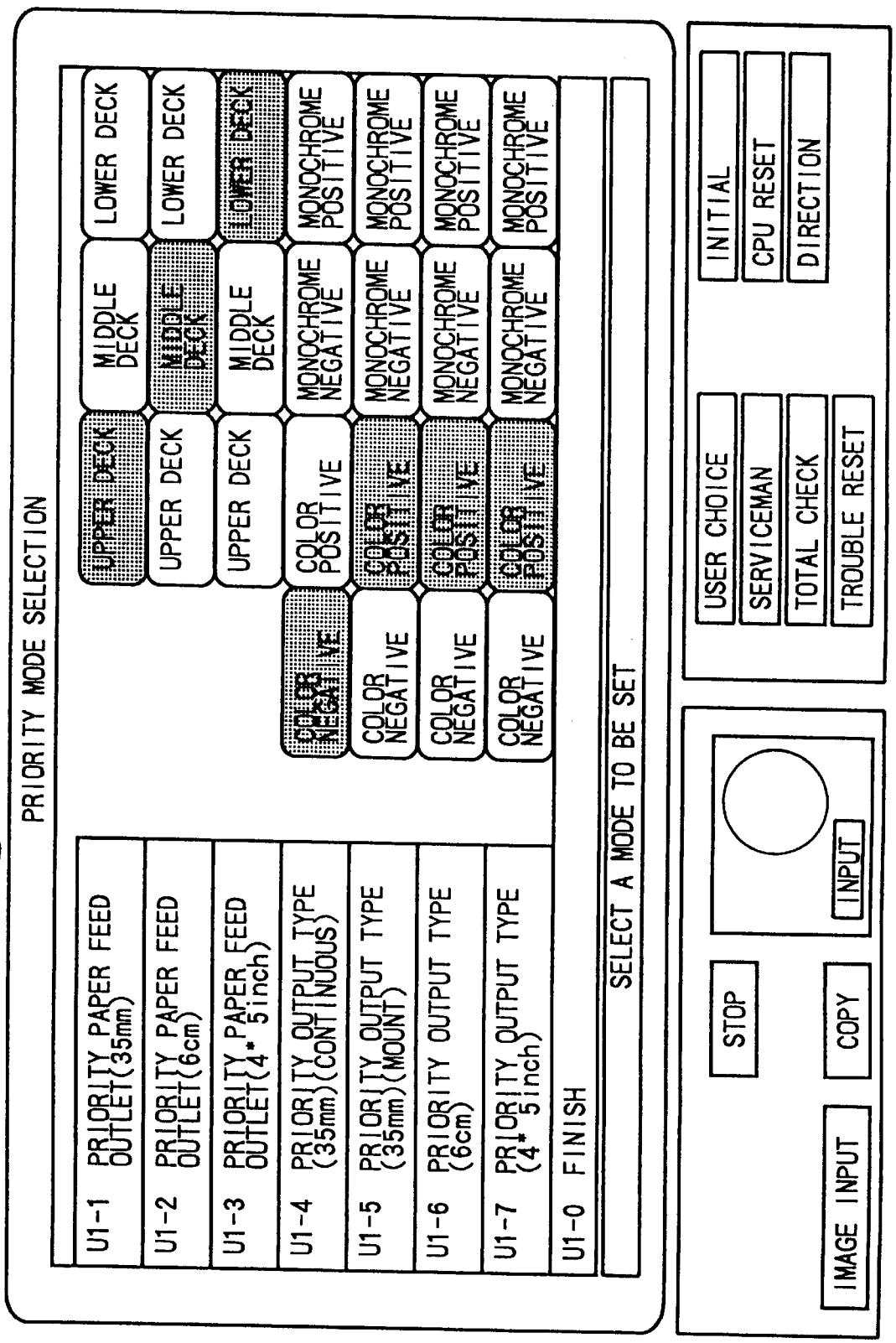
FIG. 20 is a drawing of a color CRT showing another mode setting picture under a user setting mode.

In the priority mode selection process, a necessary data for displaying a priority mode selection menu is first read from EEPROM (#U40) to display a priority mode selection menu based on the contents of the data read (#U41). A concrete example of the priority mode selection menu is illustrated in FIG. 20. Seven setting items are provided in the menu, and by selecting priority mode in each one of the items (#U42), a priority paper feed outlet and priority outlet type are set.

U1-1: Change of priority paper feed outlet (35 mm)

Priority paper feed outlet is selected from one of upper, middle, and lower stages when a film carrier for 35 mm continuous film or 35 mm mounted film is set (#U43).

U1-2: Change of priority paper feed outlet (6 cm)

Priority paper feed outlet is selected from one of upper, middle, and lower stages when a film carrier for 6 cm film is set (#U44).

U1-3: Change of priority paper feed outlet (4×5 inch)

Priority paper feed outlet is selected from one of upper, middle, and lower stages when a film carrier for 4×5 inch film is set (#U45).

U1-4: Change of priority outlet type (35 mm continuous)

Priority output type is selected from one of (color negative), (color positive), (monochrome negative) (monochrome positive) when a film carrier for 35 mm continuous film is set (#U46).

U1-5: Change of priority outlet type (35 mm mounted)

Priority output type is selected from one of (color negative), (color positive), (monochrome negative) (monochrome positive) when a film carrier for 35 mm mounted film is set (#U47).

U1-6: Change of priority outlet type (6 cm)

Priority output type is selected from one of (color negative), (color positive), (monochrome negative) (monochrome positive) when a film carrier for 6 cm film is set (#U48).

U1-7: Change of priority output type (4×5 inch)

Priority output type is selected from one of (color negative), (color positive), (monochrome negative) (monochrome positive) when a film carrier for 4×5 inch is set (#U49).

U1-0: Finish

Processing is finished by writing a data into EEPROM for not displaying priority mode (#U50) and the result of settings by the priority mode selection process (#U51).

After the end of each one of the setting processes at steps #U43–U49, a button pressing process is performed according to a change of the mode setting (#U52), and the processes are repeatedly performed to return to the priority mode selection menu again. The priority mode selection process is finished when U1-0 finish is selected.

Though description is not made herein, it is considered that priority data (data for output type, paper feed outlet, etc.) for 35 mm continuous film is stored in area A of EEPROM. Likewise, data for 35 mm mounted film is stored in area B, data for 6 cm film in area C, and data for 4×5 inch film in area D, respectively.

In FIG. 21, a flow of an ordinary mode process at step #80 in FIG. 16 is illustrated.

In the ordinary mode process, a process for checking a state of apparatus is first executed at step #N10. Since a state is "0" immediately after power is turned on, the program moves to step #20 where a relational process between the lamp unit and film carrier is executed. At step #N30, when subsequent control is permitted, the program moves to step #N40. However, if subsequent control is not permitted, the program of the present subroutine is finished.

At step #N20, a process for taking in a data for shading correction, and lamp unit and film carrier setting process are conducted. At step #N30, when subsequent control is permitted, a state renewal process is executed to finish the program of the present subroutine. At step #N10, if a state is judged as "1", an external panel input process is conducted at step #N50. In said external panel, there are provided a copy key, an image input key, a track ball input key and the like as shown in a drawing attached herewith.

The apparatus of the present embodiment is arranged to project a film image onto the CRT by reading the film an image through image reading process, and color correction and trimming processes are conducted by a copy mode setting process. Thereafter, when a copy switch is pressed, a copy output process is performed to form a processed film image on a sheet. Process branches according to an input state of the external panel.

At step #N60, when it is judged that an image input key is inputted, a subroutine for taking in an image is executed at step #N70 to finish the program of the present subroutine. If it is judged that a copy key is inputted at step #N60, a subroutine of copy output process is conducted at step #N80 to finish the program of the present subroutine. When it is judged that a or track ball, track ball input key are inputted at step #N60, a copy mode setting process is performed at step #N90 to finish the program of the present subroutine.

In FIG. 22, a relational process between the lamp unit and film carrier at step #N20 in FIG. 21 is illustrated. In this process, processes for taking in a data for shading correction, and lamp unit and film carrier setting are conducted immediately after the power source is turned on.

At step #NR10, a process for identifying the existence of a lamp unit and film carrier, and a process for identifying a kind of mounted lamp unit and film carrier are performed. More particularly, the states at each port of the parallel I/O 206 are taken into CPU200 to identify the kind of mounted lamp unit and film carrier based on the logic shown in Table 1 and Table 2. Subsequent process branches according to a state which has been detected.

At step #NR20, if it is judged that both the lamp unit and film carrier do not exist, a process of step #NR30 is performed to finish this subroutine. At step #NR20, when it is judged that there is only either one of the lamp unit or film carrier is mounted, a process of step #NR40 is executed to finish this subroutine. At step #NR20, if it is judged that both the lamp unit and film carrier are mounted, a process of step #NR50 is performed to finish this subroutine In FIG. 23, a flow of process at step #NR30 in the FIG. 22 is illustrated where both a lamp unit and film carrier do not exist. If there is no lamp unit, a data for shading correction cannot be obtained, and a warning message is displayed since image reading cannot be performed.

At step #NRN10, a display process is conducted to request for mounting a lamp unit. Then, at step #NRN20, a flag is set for prohibiting subsequent control, and the present subroutine is finished.

Figure 24:
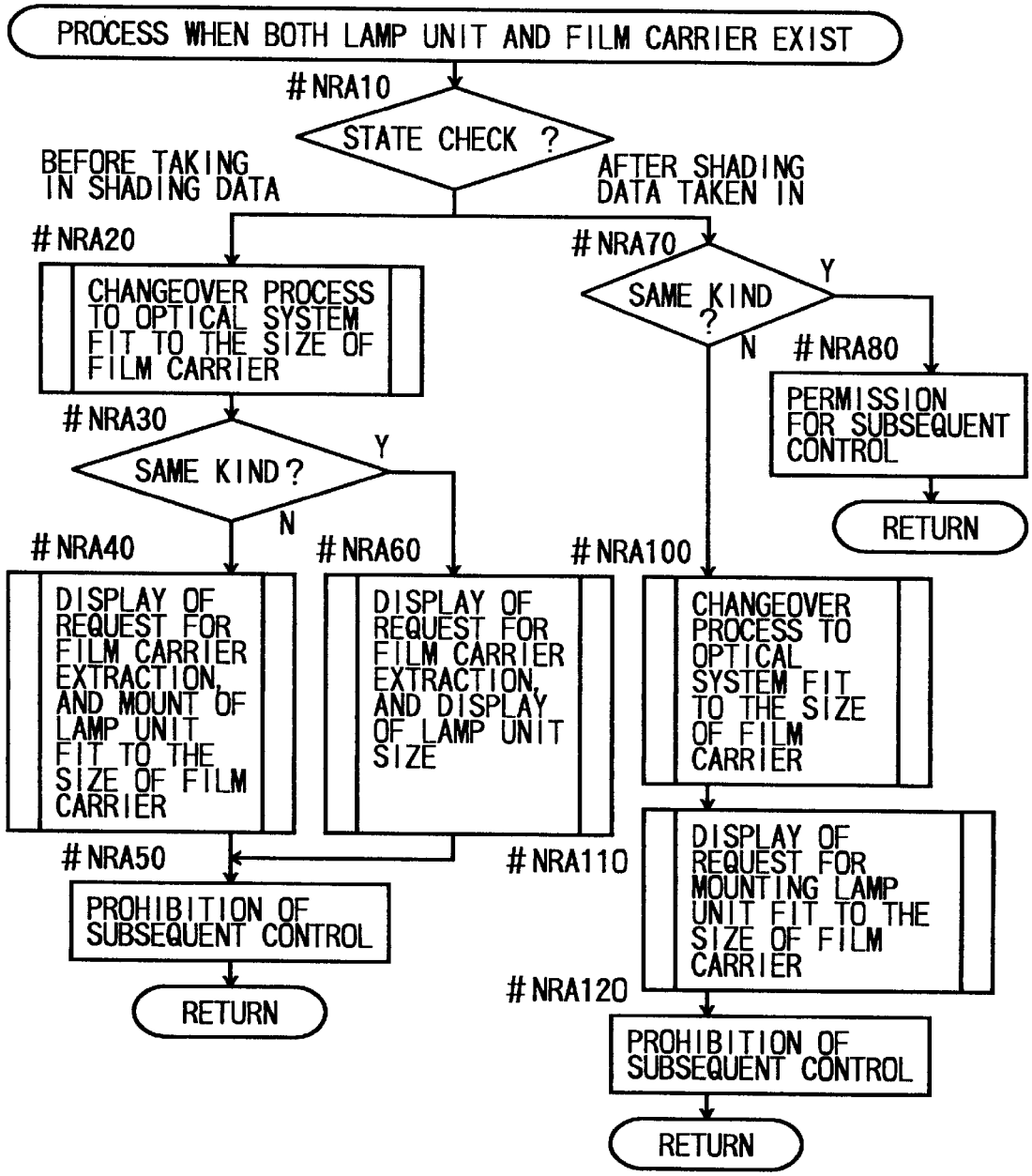
FIG. 24 is a flowchart showing a subroutine for a process when both a lamp unit and film carrier exist.

In FIG. 24, a flow of step #NR50 in the FIG. 22 is illustrated where both the lamp unit and film carrier exist. In this process, a state check is first performed at step #NRA10, and the program branches according to a state checked. At step #NRA10, if it is judged that a shading data is not taken in yet, a changeover process to an optical system which is fit to the size of the film carrier is executed at step #NRA20. After the changeover process is finished, a check is made whether the kind of lamp unit and film carrier are the same or not at step #NRA30. If it is judged that they are the same kind, a request for extracting the film carrier and a process for displaying the size of the mounted lamp unit are executed at step #NRA60 to move to step #NRA50. Thereafter, a flag is set for prohibiting subsequent control to finish the present subroutine.

If it is judged that they are not the same kind at step #NRA30, a request for extracting the film carrier and a process for displaying a request for mounting a lamp unit suited to the size of a mounted film carrier are executed at step #NRA40 to move to step #NRA50. Thereafter, a flag is set for prohibiting subsequent control to finish the present subroutine. The request for extracting a film carrier made in the preceding process is because of the reason that a data for shading correction is not taken in yet. Further, when the kind of lamp unit and film carrier is different, priority is given to the size of film carrier since a film is just required by the operator.

At step #NRA10, when it is judged that a shading data has already been taken in, a check is made whether the kind of lamp unit and film carrier are the same or not at step #NRA70. When it is judged that they are the same kind, a flag for permitting subsequent control is set at step #NRA80 since an image reading and copy output control can be performed, and the present subroutine is finished. If it is judged that they are not the same kind at step #NRA70, a process for changing over to an optical system fit to the size of film carrier and a display process are performed at step #NRA100. After the changeover process is finished, a display process to request for mounting a lamp unit fit to the size of film carrier is performed at step #NRA110. A flag is set at step #NRA120 for prohibiting subsequent control to finish the present subroutine.

Figure 25:
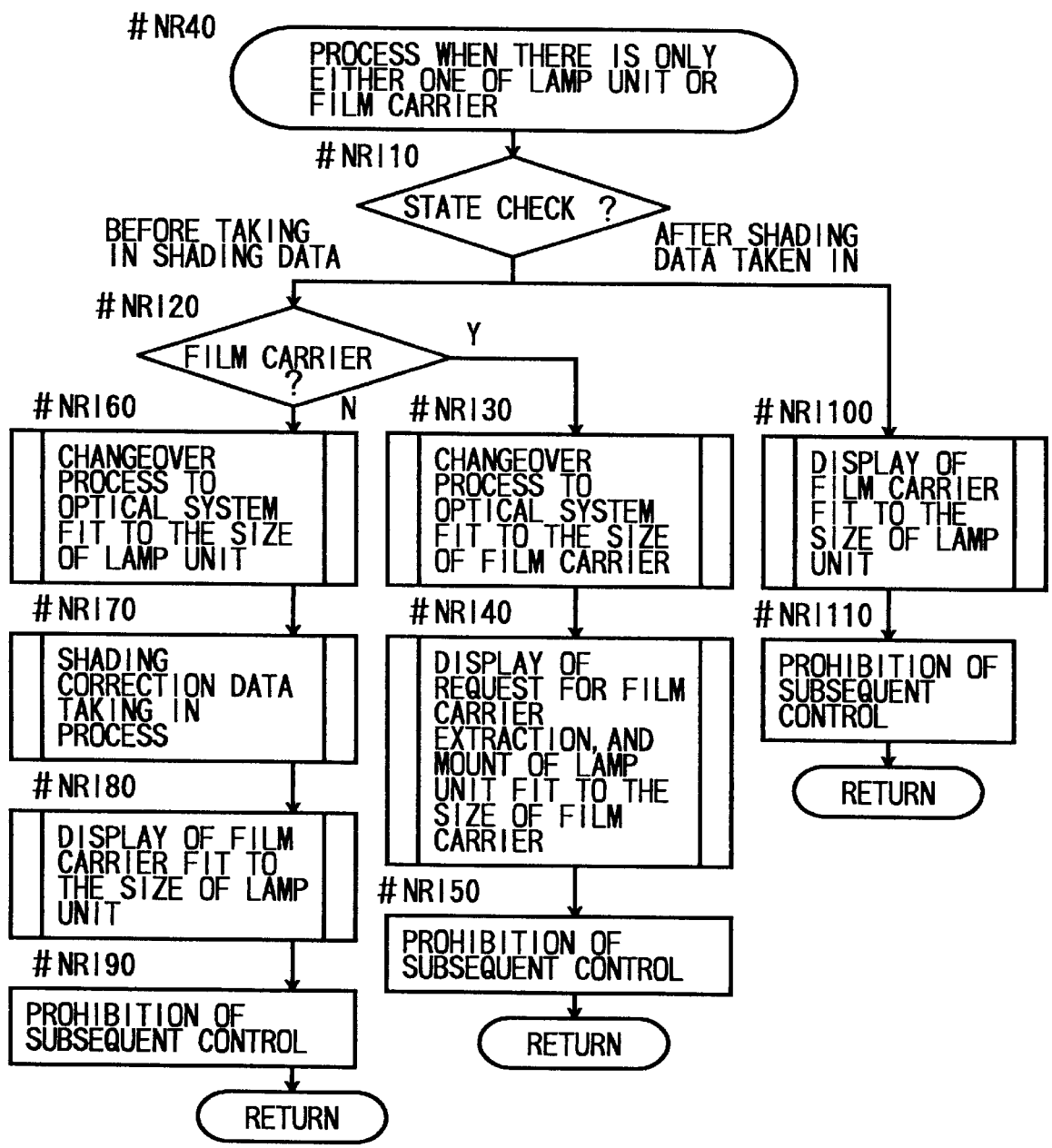
FIG. 25 is a flowchart showing a subroutine for a process when there is only either a lamp unit or a film carrier.

In FIG. 25, there is illustrated a flow of process at step #NR40 in the FIG. 22 where only either one of the lamp unit or film carrier exist.

In the process, a process for state check is first performed at step #NR110, and the process branches according to the result of the check. When a judgment is made at step #NR110 that a shading data has not been taken in yet, it is checked whether the one mounted is film carrier or not at step #NR120. When a film carrier is mounted, a changeover process is executed at step #NR130 to an optical system fit to the size of the film carrier.

At step #NR140, a process for requesting extraction of the film carrier and a process for displaying a request for mounting a lamp unit suited to the size of the mounted film carrier are conducted since shading data has to be taken in. A flag for prohibiting subsequent control is set at step #NR150 to finish the present subroutine.

When it is judged that the one mounted is a lamp unit at step #NR120, the program moves to step #NR160. At step #NR160, a process for displaying a changeover to an optical system suited to the size of the mounted lamp unit is performed, and the program moves to step #NR170 after the changeover process is completed. At step #NR170, a process for taking in a data for shading correction is executed. At step #NR180, a process for displaying a film carrier suited to the size of the mounted lamp unit is executed. Thereafter, a flag is set for prohibiting subsequent control at step #NR190 to finish the present subroutine.

At step #NR110, if it is judged that a shading data has already been taken in, a process for displaying a film carrier suited to the size of lamp unit is conducted at step #NR1100. Thereafter, a flag is set for prohibiting the subsequent control at step #NR1110 to finish the present subroutine.

Figure 26:
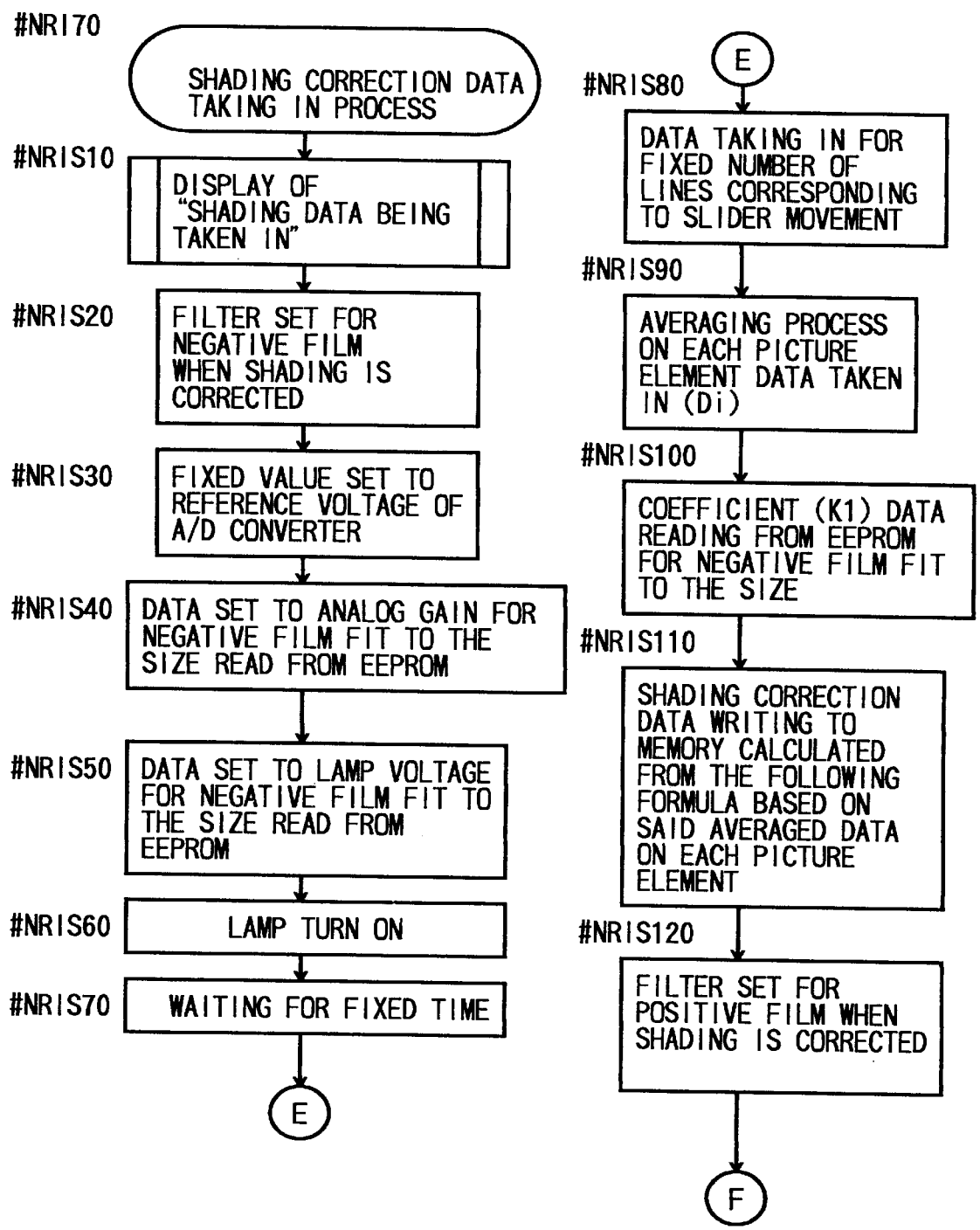
FIG. 26 is first part of a flowchart showing a subroutine for shading correction data taking in process.
Figure 27:
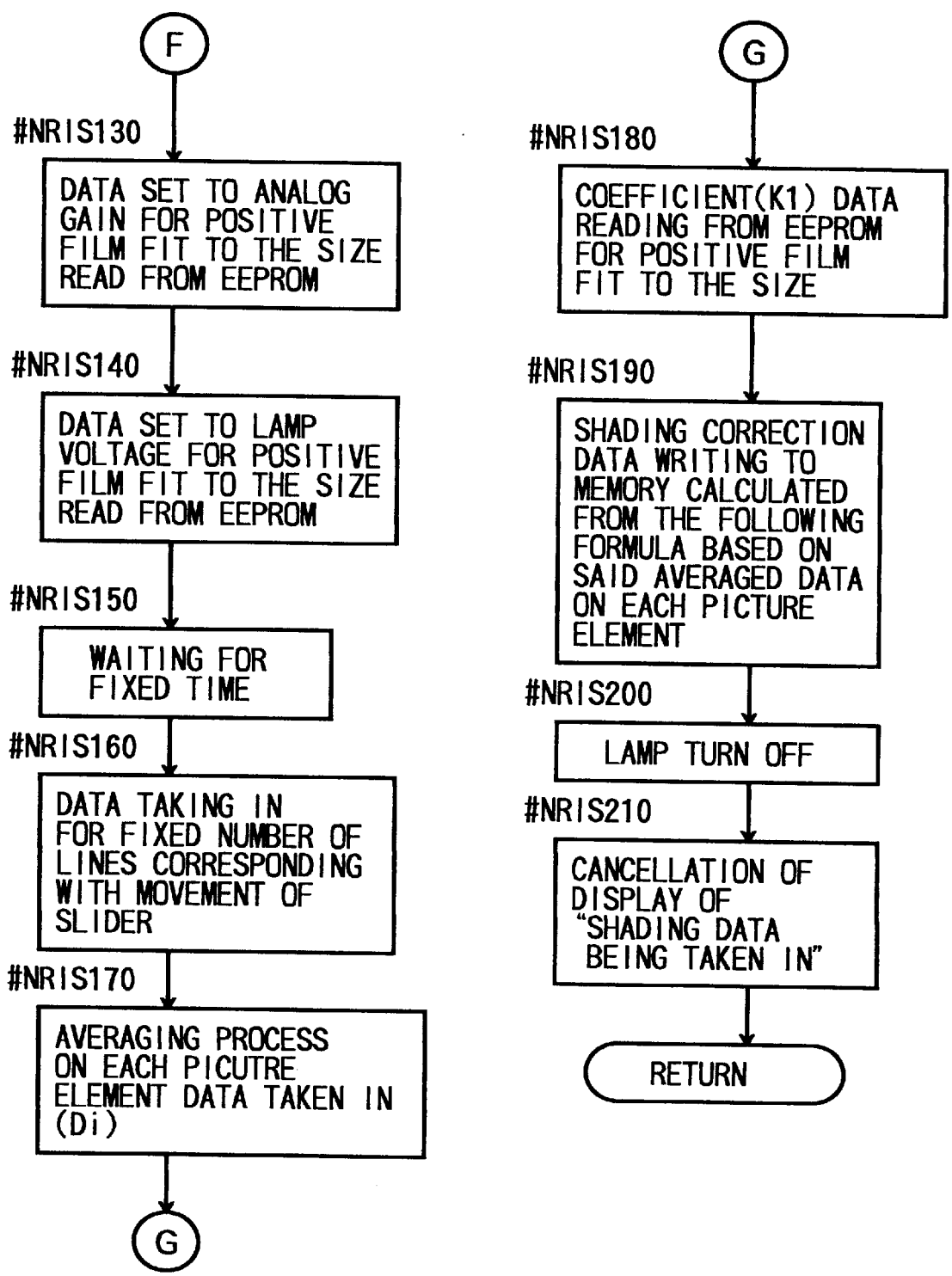
FIG. 27 is a latter part of the flowchart showing a subroutine for shading correction data taking in process.

In FIGS. 26 and 27, a flow of step #NR170 in the FIG. 25 is illustrated where a process for taking in a data for shading correction is conducted.

In the process, a data taken in for shading correction on each negative and positive film is converted to a practical data for shading correction, and the data is stored into a memory.

At step #NRIS10, a display process is performed to indicate that a shading data is being taking in. Then, at step #NRIS20, a process is performed for setting a filter to be used when a data for shading correction for negative film is taken in. After the filter is set, a process for setting a predetermined value to a reference voltage of A/D converter is performed at step #NRIS30, and then, at step #NRIS40, a gain data for a size of negative film on each R,G,B signal line is read from analog gain data stored by an RGB balance adjustment process, and the data is set. At step #NRIS50, a data stored for a size of negative film is read from a lamp voltage data stored by maximum output adjustment process, and the data is set. Thereafter, lamp is turned on at step #NRIS60. At step #NRIS70, a process is performed for waiting a predetermined time until a light amount of lamp is stabilized.

At step #NRIS80, a process for taking in a data of a predetermined number of lines is executed by moving a slider. At step #NRIS90, a process is conducted for averaging each picture element from the data of a predetermined number of lines taken in in the preceding process to prepare one line data (Di). At step #NRIS100, a data stored for a size of negative film is read from a data conversion coefficient data K1 stored under a mode for initial shading data analysis. At step #NRIS110, from a data obtained by the preceding step, a data (Ri) calculated from a formula, Ri=K1×Di, is written into memory as a shading correction data for negative film. A process for taking in a data for positive film can be accomplished by the process at steps #NRIS120–#NRIS190. Since the processes are the same as that of negative film, description will be omitted. At step #NRIS200, the lamp is turned off, and at step #NRIS210 a display of 'shading data being taken in' is canceled to finish the present subroutine.

Figure 28:
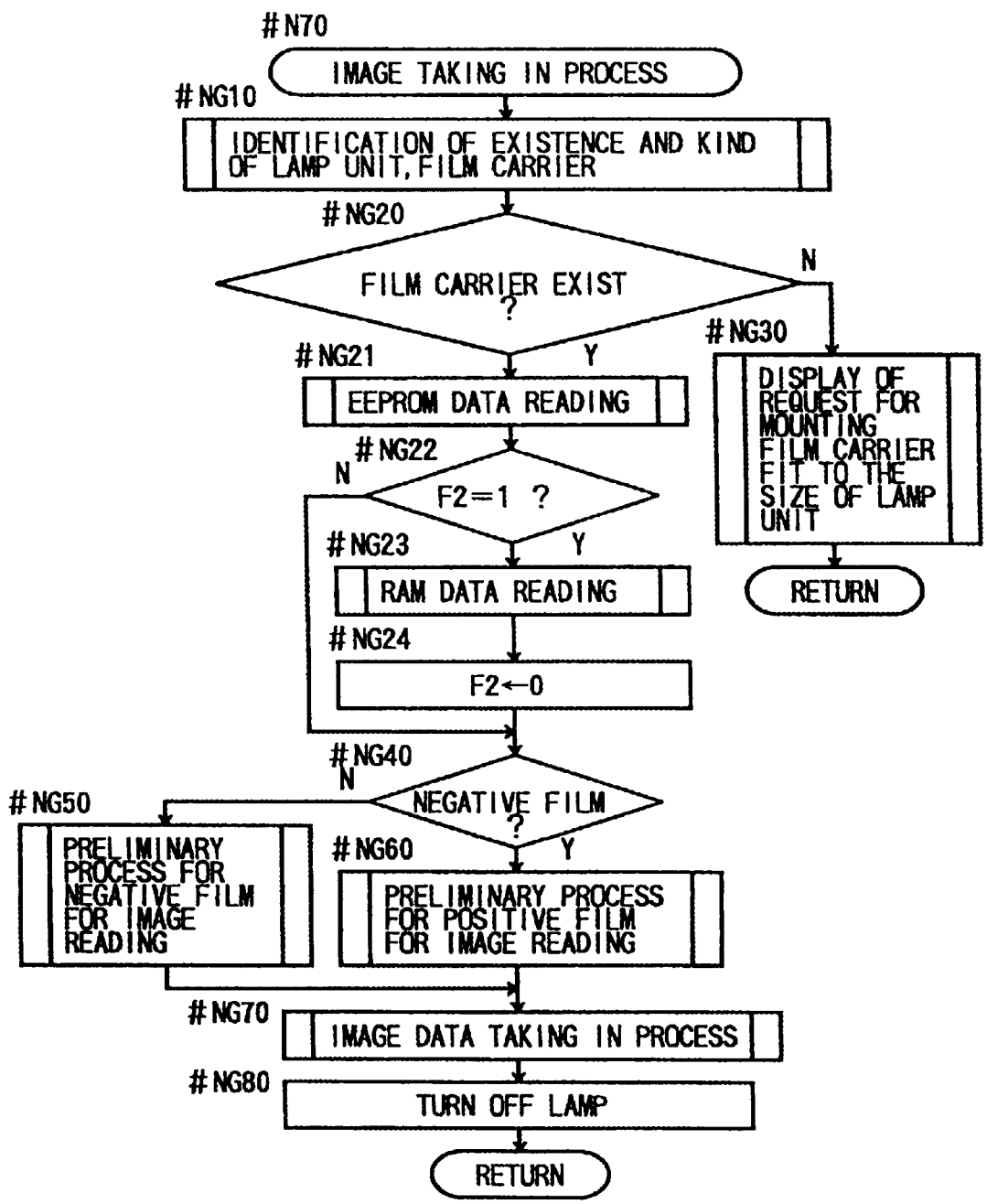
FIG. 28 is a flowchart showing a subroutine for an image reading process.

In FIG. 28, a flow at step #N70 in FIG. 21 is illustrated where a process for taking in an image is performed. In the process, a data analysis is conducted for setting an image fit to a film which is set.

At step #NG10, a process for identifying the existence of the lamp unit and film carrier and a process for identifying the kind of mounted lamp unit and film carrier are executed. This is the same process as the process performed at step #NR10 in FIG. 22. At step #NG20, it is confirmed whether film carrier is mounted or not. If film carrier is not mounted, a process for displaying a request for mounting a film carrier suited to the size of lamp unit is executed at step #NG30 to finish the present subroutine.

Figure 37:
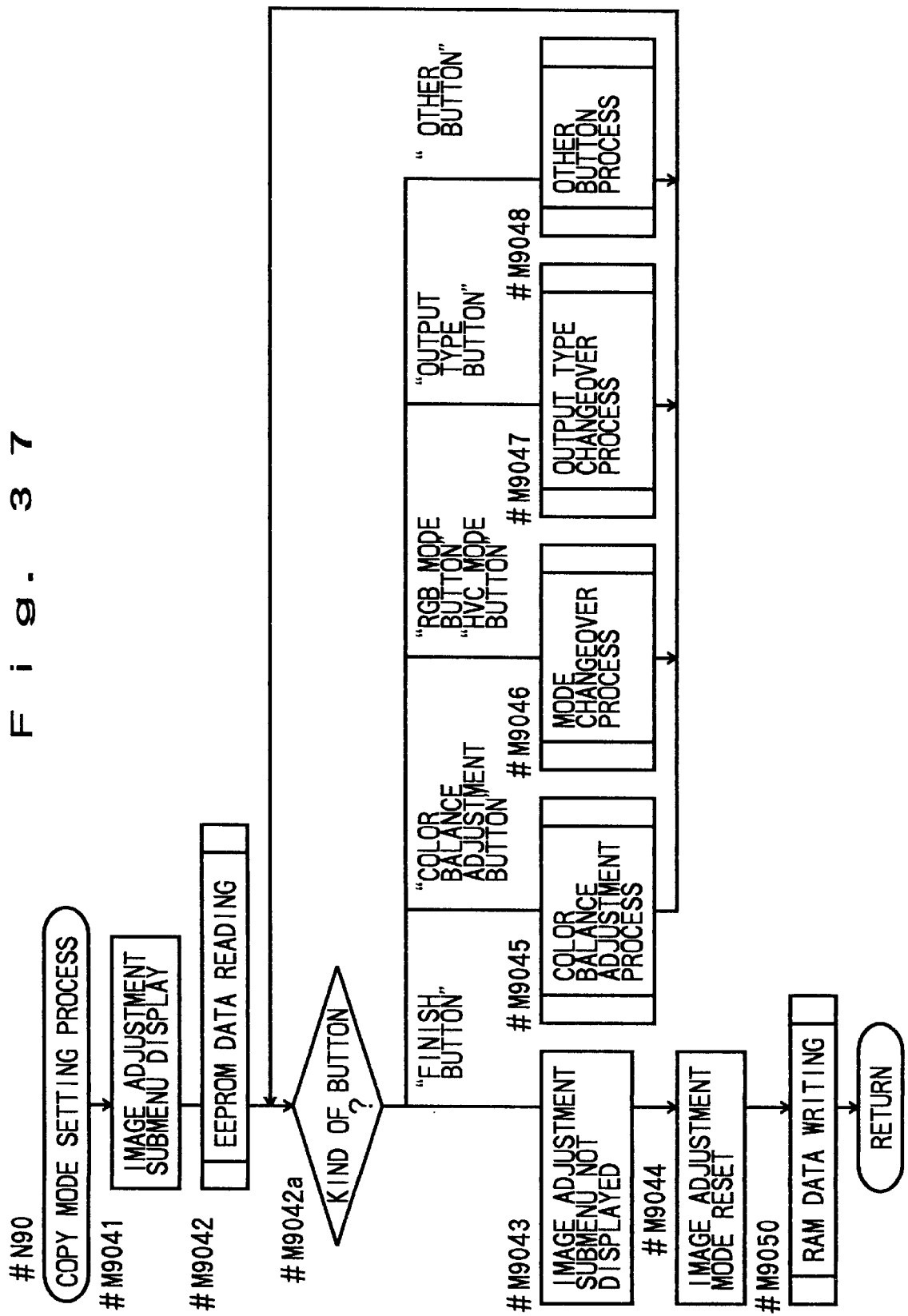
FIG. 37 is a flowchart showing a subroutine for a copy mode setting process.
Figure 39:
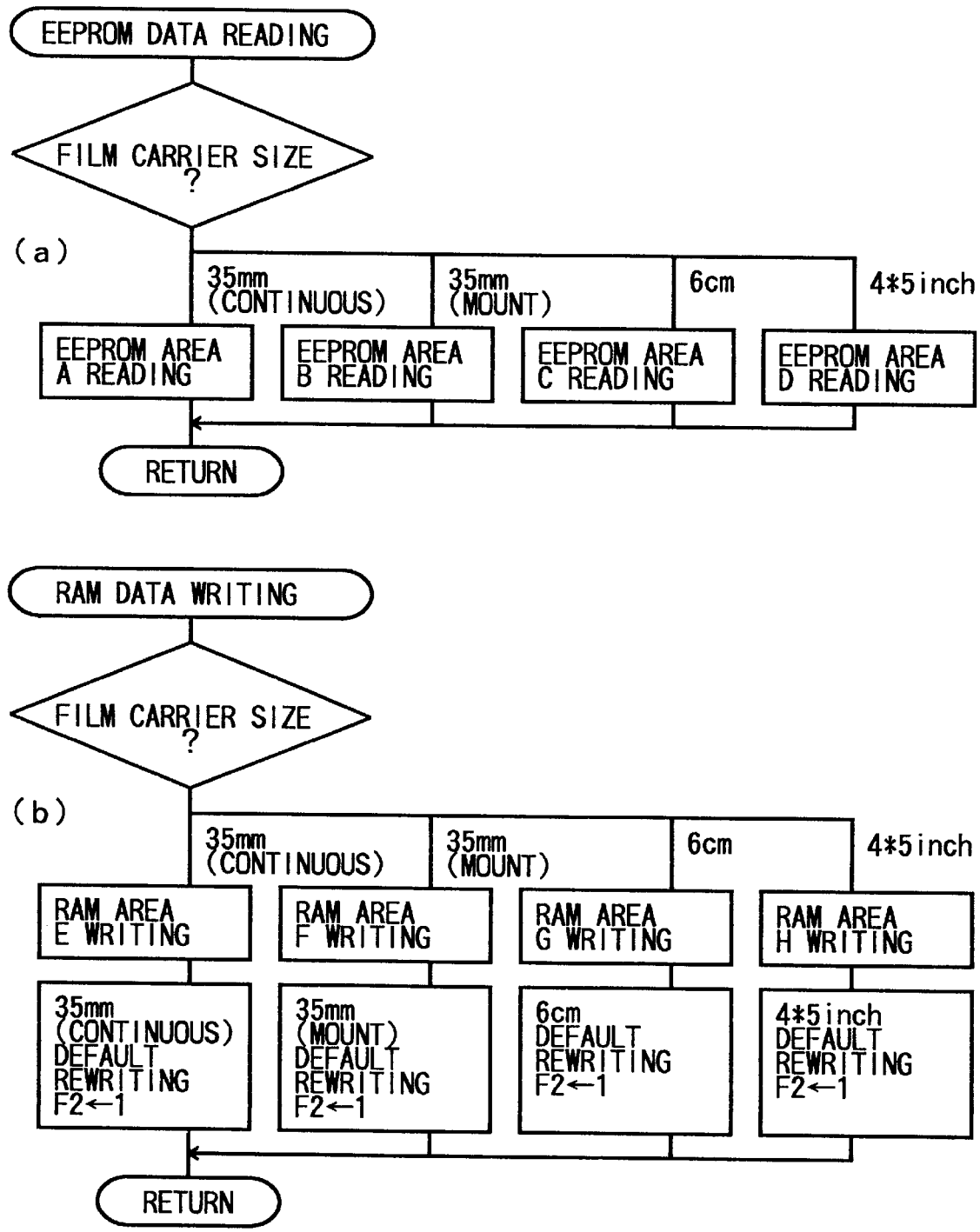
FIG. 39 is a flowchart showing each subroutine for an EEPROM data reading process and a RAM data reading process.

At step #NG21, a priority output type based on the size of a film is read from EEPROM (FIG. 39 (*a*)). At step #NG22, judgment is made on a default rewriting flag F2 which is set when output type is changed by users preference in a copy mode setting process (FIG. 37). At step #NG23, when an output type is changed in FIG. 37, information of a changed output is read from RAM area, and a flag is reset at step #NG24.

When it is found that a film carrier is mounted at step #NG20, it is checked whether a process for negative film is set or not at step #NG40. In the case of negative film, a preliminary process for negative film is performed at step #NG50, and after finishing an image taking in process at step #NG70, the lamp is turned off at step #NG80 to finish the present subroutine.

In the case of positive film by a judgment made at step #NG40, the program moves to step #NG60 to perform a preliminary process for positive film. After finishing processes at steps #NG70 and #NG80, the present subroutine is finished.

Figure 29:
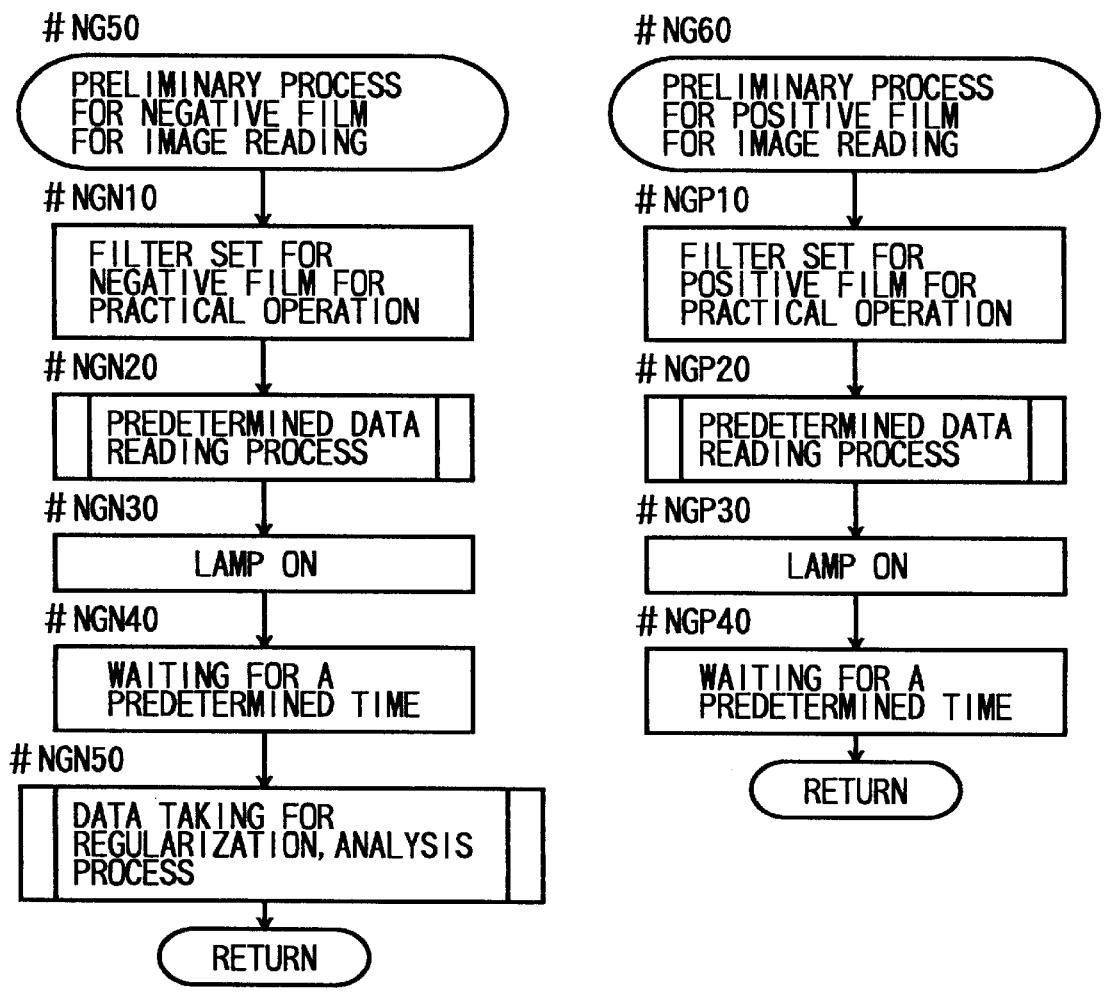
FIG. 29 is a flowchart showing each subroutine of preliminary processes for negative film and positive film for an image reading process.

In FIG. 29, flows of the processes at steps #NG50 and #NG60 in the FIG. 28 are illustrated where preliminary processes for negative film and positive film are performed. In the preliminary process for negative film, a filter for negative film to be used at a practical operation is first set at step #NGN10. After the filter is set, a process for reading a predetermined data is performed at step #NGN20. The predetermined data reading process is a process for reading a data necessary for an image processing circuit.

At step #NGN30, lamp is turned on, and after waiting for a time until the amount of lamp light is stabilized at step #NGN40, a regularization data taking in process and an analysis process are conducted at step #NGN50 to finish the present subroutine.

In a preliminary process for positive film, a filter for positive film to be used at a practical operation is first set at step #NGP10. After the filter is set, a predetermined data reading process is performed at step #NGP20. The predetermined data reading process is a process for reading a data necessary for an image processing circuit. At step #NGP30, a process for turning on a lamp is executed, and after waiting for a time until the amount of lamp light is stabilized at step #NGP40, the present subroutine is finished.

Figure 30:
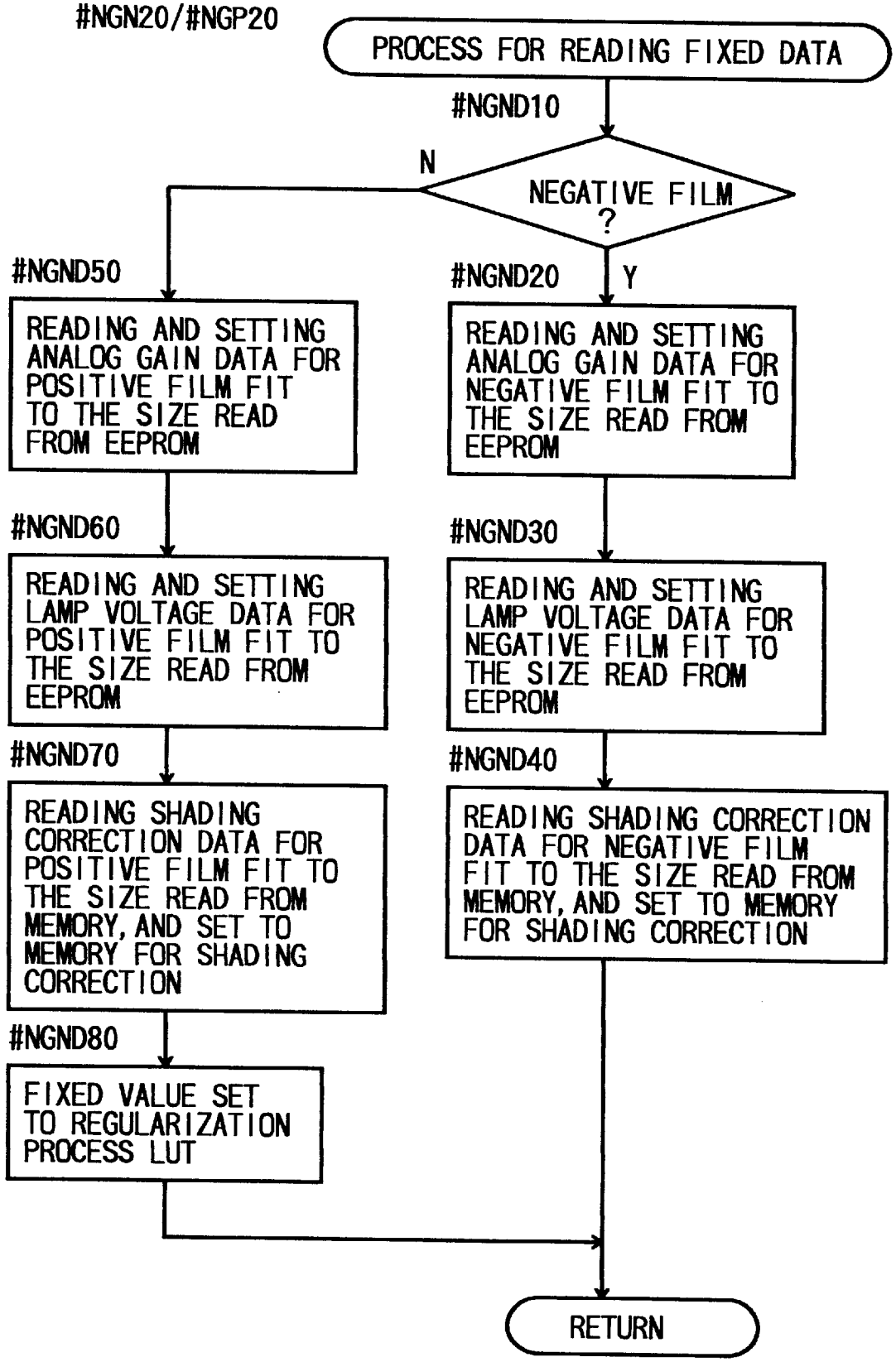
FIG. 30 is a flowchart showing a subroutine for a predetermined data reading process.

In FIG. 30, a flow of process at step #NGN20 or step #NGP20 in FIG. 29 is illustrated where a predetermined data reading process is performed. The predetermined data reading process is a process for reading a data necessary for image processing circuit.

At step #NGND10, it is first checked whether a process is for negative film or not, and when the process is for negative film, a gain data of amplifier on R,G,B signal line for a size of negative film is read from the EEPROM to execute a setting process at step #NGND20. At step #NGND30, a lamp voltage data suited to the size of negative film is read from the EEPROM to execute a setting process. At step #NGND40, a data is read for negative film among the data stored through shading correction data taking in process, and the data is set in a shading correction memory to finish the present subroutine.

If it is judged that a process is for positive film at step #NGND10, a gain data of amplifier on R,G,B signal line for a size of positive film is read from the EEPROM to execute a setting process. At step #NGND60, a positive lamp voltage data suited to the size of positive film is read from the EEPROM to execute a setting process. At step #NGND70, a data is read for positive film among the data stored through shading correction data taking in process, and the data is set in a shading correction memory. At step #NGND80, a predetermined value is set to an LUT for regularization process to finish the present subroutine.

Figure 31:
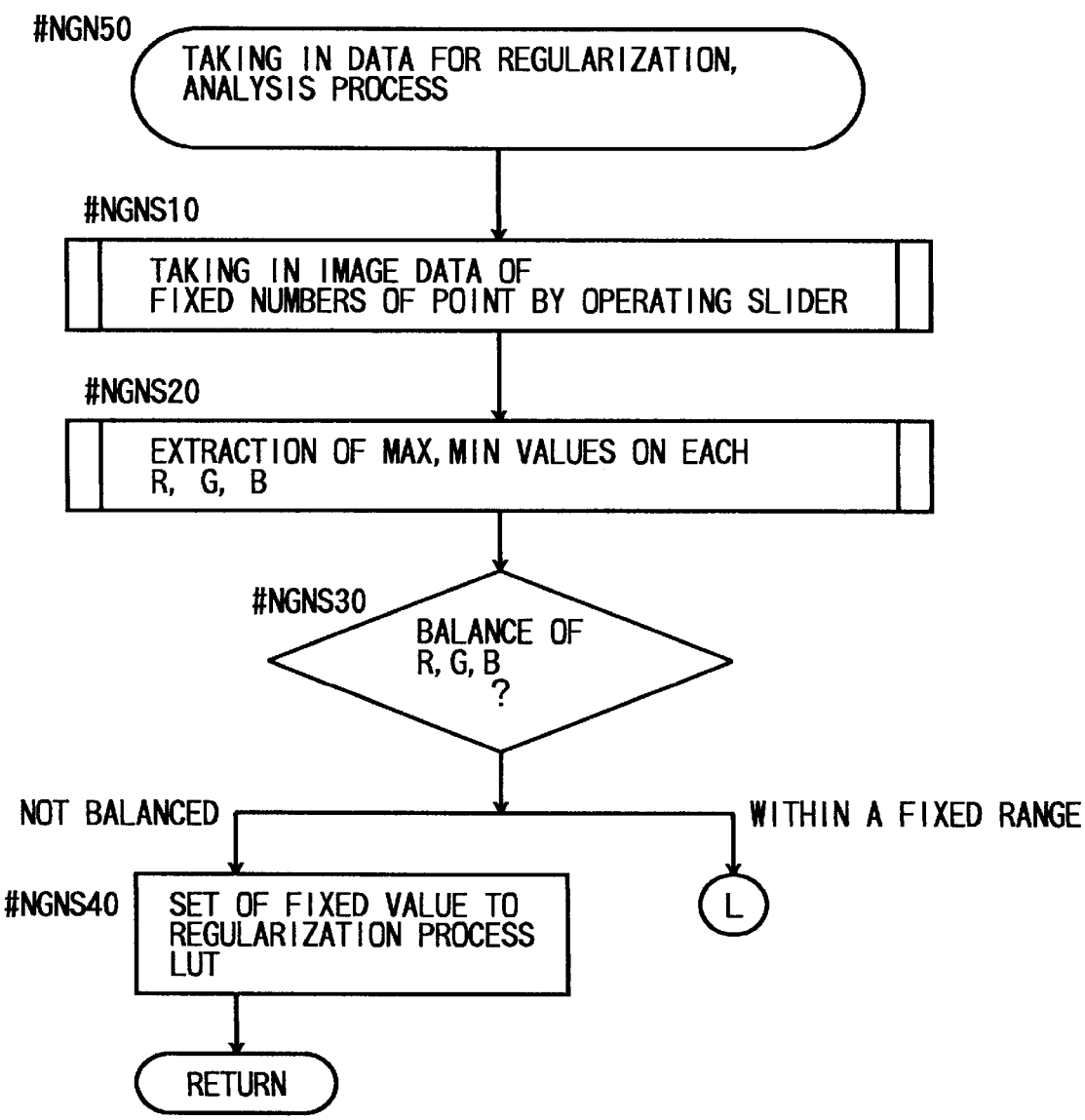
FIG. 31 is a first part of a flowchart showing a subroutine for a process of taking in data for regularization, and analysis process.

In FIGS. 31 and 32, a flow of step #NGN50 in FIG. 29 is illustrated where a process for taking in a data for regularization and an analysis process are performed. At step #NGNS10, a process for taking in an image data of a predetermined number of points is executed by moving a slider. At step #NGNS20, a process is performed for extracting the maximum and minimum value on each R,G,B data among the data previously taken in.

At step #NGNS30, a process for checking a balance of R,G,B is executed among the data previously extracted. If it is judged that the balance of R,G,B is not well balanced, a process for setting a predetermined value to an LUT for a regularization process is performed at step #NGNS40 to finish the present subroutine. When it is judged that the balance is within a predetermined range at step #NGNS30, the program moves to step #NGNS50, and a process for checking a range of deviation of the data is performed from the data previously extracted. When it is judged that a range of deviation is extremely small at step #NGNS50, a correction process at gain adjustment section is performed at step #NGNS60. This is a process for obtaining a gain value to correct a deviation of output data caused by the kind of film, exposure conditions and the like by a gain in the amplifier section. At step #NGNS70, a process for setting a predetermined value to an LUT for regularization process is executed to finish the present subroutine. When it is judged that the deviation of the data is within a predetermined range at step #NGNS50, a gain adjustment section correcting process is executed at step #NGNS80, and at step #NGNS90, an LUT correction process for regularization process is performed to finish the present subroutine. The LUT correction process for regularization process is a process for correcting a range of deviation of the output data to a predetermined level.

In FIGS. 33 and 34, a flow of process at step #NGNS60 or step #NGNS80 in the FIG. 32, and a flow of process at step #NGNS90 in the FIG. 32 are illustrated where a gain adjustment section correcting process and an LUT correction process for regularization process are performed respectively.

In a gain adjustment section correcting process shown in the FIG. 33, at step #NGNSG10, an RG value calculated based on a formula: RG=(Standard MAX/R MAX)×(present Gain), is first set as a gain value of amplifier on R signal line from MAX value of R data, standard data and gain value of amplifier on R signal line which is set at a reading process all of which are extracted by MAX, MIN extraction process on R,G,B data. At steps #NGNSG20 and #NGNSG30, gain values of C signal line and B signal line are determined and set respectively.

In an LUT correction process for regularization process in FIG. 34, a value of Cl is obtained at step #NGNSS10 based on a formula of:

Cl=R MIN×Standard MAX/R MAX, wherein MIN value of R data extracted by MAX, MIN extraction process on R,G,B data is corrected by said gain correcting process. At step #NGNSS20, a process for writing input and output data into LUT is executed wherein the data is calculated by a formula shown in the flowchart. At steps #NGNSS30 and #NGNSS40, C signal line is processed, and at steps #NGNSS50 and #NGNSS60, B signal line is processed respectively.

In FIG. 35, a flow of step #N80 in the FIG. 21 is illustrated where a copy output process is performed. At step #NS10, a process for identifying the existence of the lamp unit and film carrier, and a process for identifying a kind of mounted lamp unit and film carrier are performed. At step #NS20, a checking process is performed whether film carrier is mounted or not. If film carrier is not mounted, a process for displaying a request for mounting a film carrier suited to the size of a mounted lamp unit is conducted at step #NS30 to finish the present subroutine. When it is judged that a film carrier is mounted at step #NS20, a process is performed for checking whether the kind of lamp unit and film carrier are different or not at step #NS40. If it is judged that they are different at step #NS40, a process is performed for displaying a request for mounting a lamp unit suited to the size of a mounted film carrier to finish the present subroutine. When it is judged that they are the same kind at step #NS40, a state checking process is performed at step #NS60.

At step #NS60, when it is judged that an image reading process had already been performed, the program moves to step #NS100, and a scan reading process corresponding to a copy mode set by a copy mode setting process is performed to finish the present subroutine. If it is judged that an image reading process has not been performed yet at step #NS60, a process is performed for checking whether negative film is set or not at step #NS70. At step #NS62, a priority output type based on the size of a film is read from the EEPROM (FIG. 39 (a)). At step #NS64, judgment is made on a default rewriting flag F2 which is set when output type is changed by users preference in a copy mode setting process (FIG. 37). At step #NS66, when an output type is changed in the FIG. 37, information of a changed output is read from RAM area, and a flag is reset at step #NS68. When it is judged that a process for negative film is set at step #NS70, a preliminary process for negative film is performed for a copy output process at step #NS80, and after finishing a process at step #NS100, the present subroutine is finished. If it is judged that a process for positive film is set at step #NS70, a preliminary process for positive film is performed for a copy output process at step #NS90, and after finishing a process at step #NS100, the present subroutine is finished.

Figure 36:
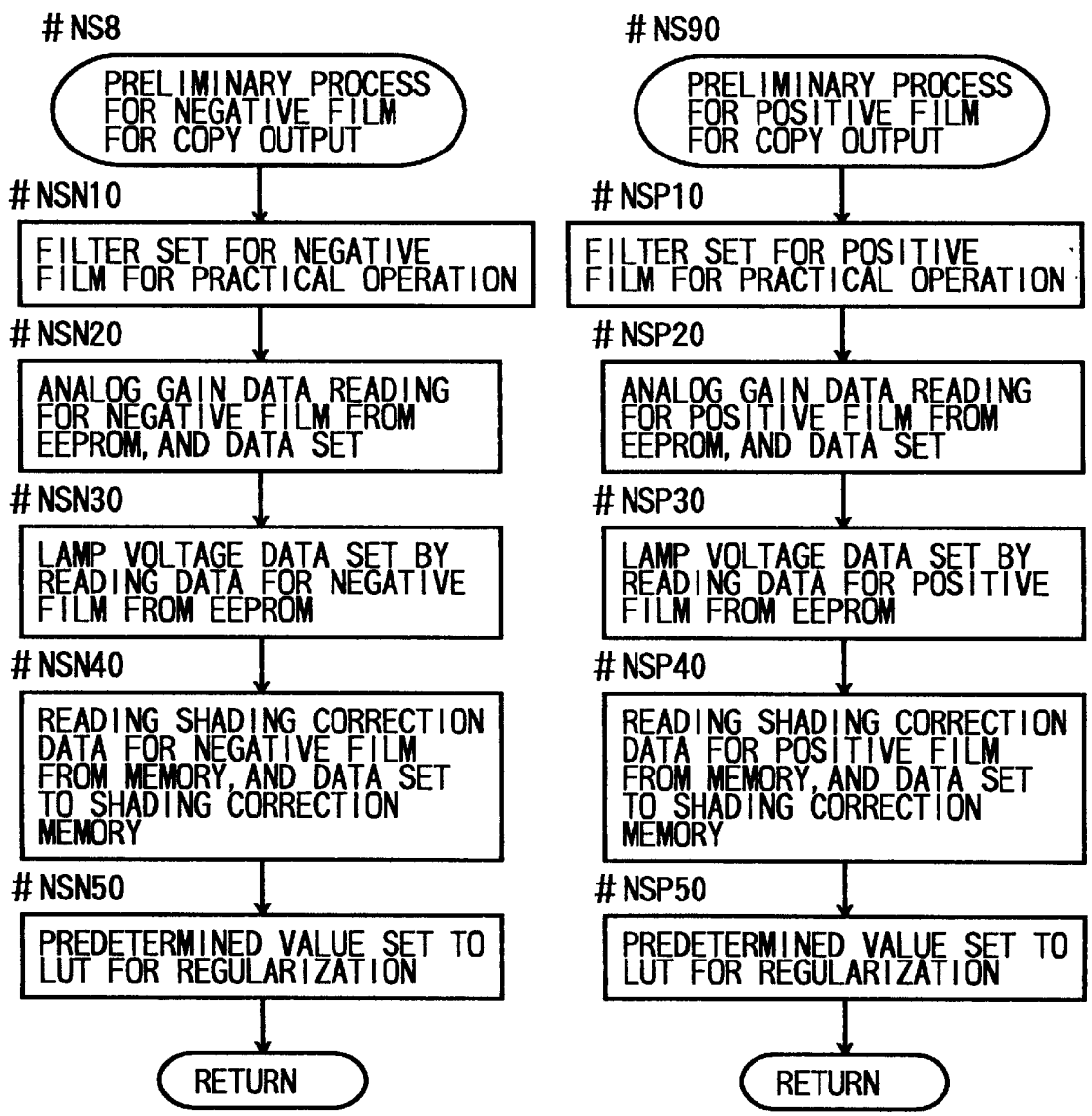
FIG. 36 is a flowchart showing each subroutine for copy output process negative pretreatment and copy output process positive pretreatment.

In FIG. 36, a flow of preliminary process for negative film for copy output process at step #NS80, and a flow of preliminary process for positive film for copy output process at step #NS90 in the FIG. 35 are illustrated respectively.

The preliminary process for the copy output process is a process for reading a data necessary for image processing circuit. In the preliminary process for negative film for the copy output process, a process for setting a filter to be used for negative film in a practical operation is performed at step #NSN10. At step #NSN20, a gain data of amplifier on R,G,B signal line for a size of negative film is read from the EEPROM to execute a setting process. At step #NSN30, a lamp voltage data for a size of negative film is read from the EEPROM to perform a setting process. At step #NSN40, a data for negative film is read from the data stored by a shading correction data taking in process, and the data is set into a memory for shading correction. At step #NSN50, a predetermined value is set to an LUT for regularization correction to finish the present subroutine. For a preliminary process for positive film to be performed for a copy output process, processes at steps #NSP10–#NSP50 are performed. The process is the same as that of the process for a preliminary process for negative film, and therefore, description will be omitted.

Figure 38:
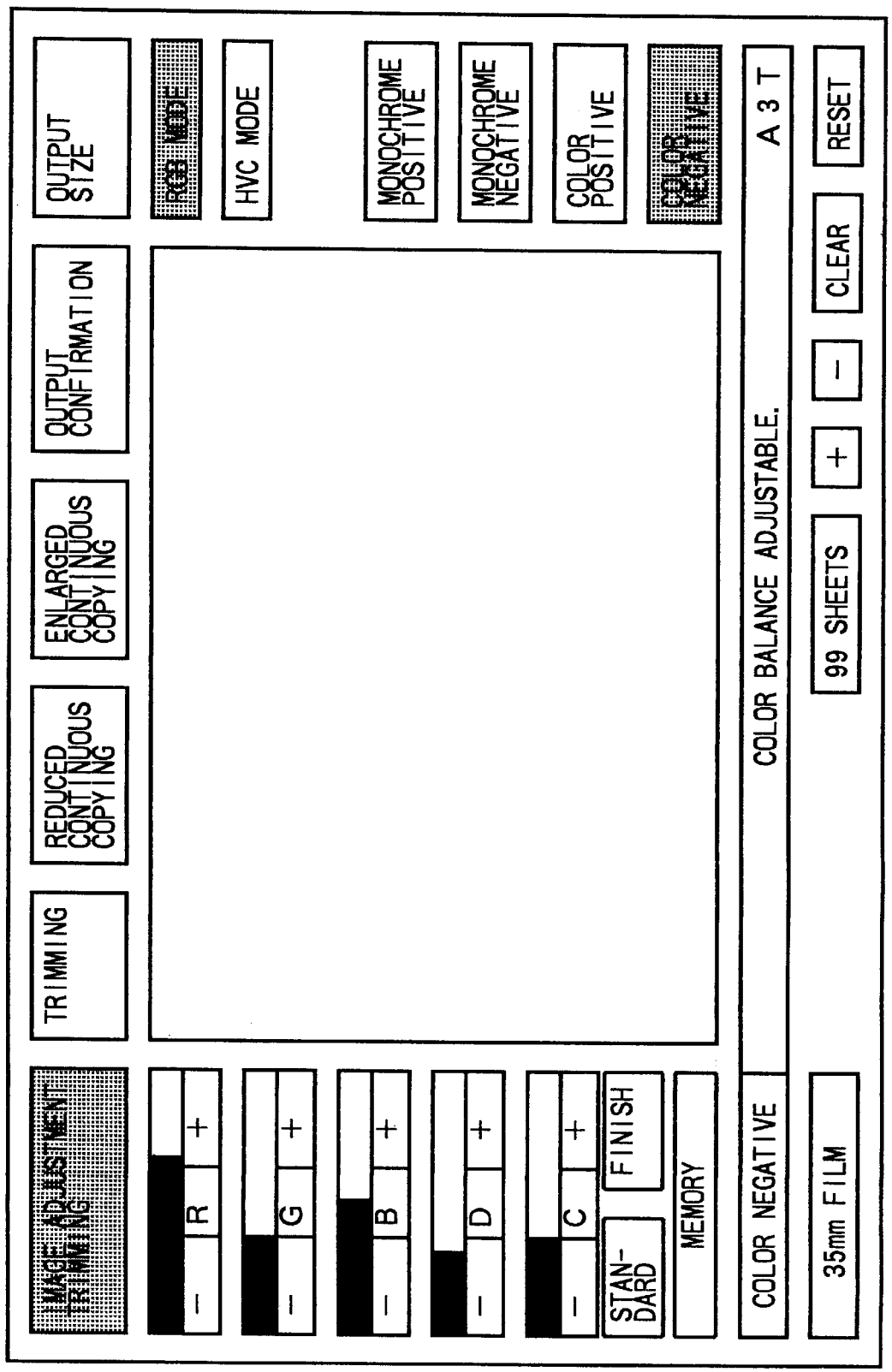
FIG. 38 is a drawing of a monitor display section showing concrete examples of an image adjustment submenu.

In FIG. 37, a subroutine is illustrated for a copy mode setting process at step #N90 in the FIG. 21. When an image adjustment button is pressed, an image adjustment submenu (FIG. 38) is displayed for performing an image adjustment (#M9041). An initial value which corresponds to the size of a film carrier presently mounted is read from the EEPROM set in FIG. 19 (#M9042) (FIG. 39 (a)). Then, it is checked which button in the submenu is selected at step #M9042a to perform a process corresponding to each button.

Finish button: Display of image adjustment menu is discontinued (#M9043), and an image adjustment mode is reset (#M9044), and then, RAM data writing is processed at step #M9045 (FIG. 39 (b)).

Color balance adjustment button: A color balance adjustment process is performed (#M9045).

RGB mode button: RGB mode button and HVC mode button are changed over to each other depending on how color balance adjustment is made, i.e., either by RGB mode or HVC mode (#M9046).

Output type button: Type of image output (kind of film) is set (#M9047). (Default is set as priority output type.)

Other buttons: Process other than the process executed by said buttons are performed (#M9048).

'Default rewriting F2' of each size which is changed in the FIG. 39 is recorded in RAM. Accordingly, when power source is turned off, it is reset to "0". At this stage, the data in RAM such as output type and paper feed outlet are cleared with turn off of the power source.

Figure 46:
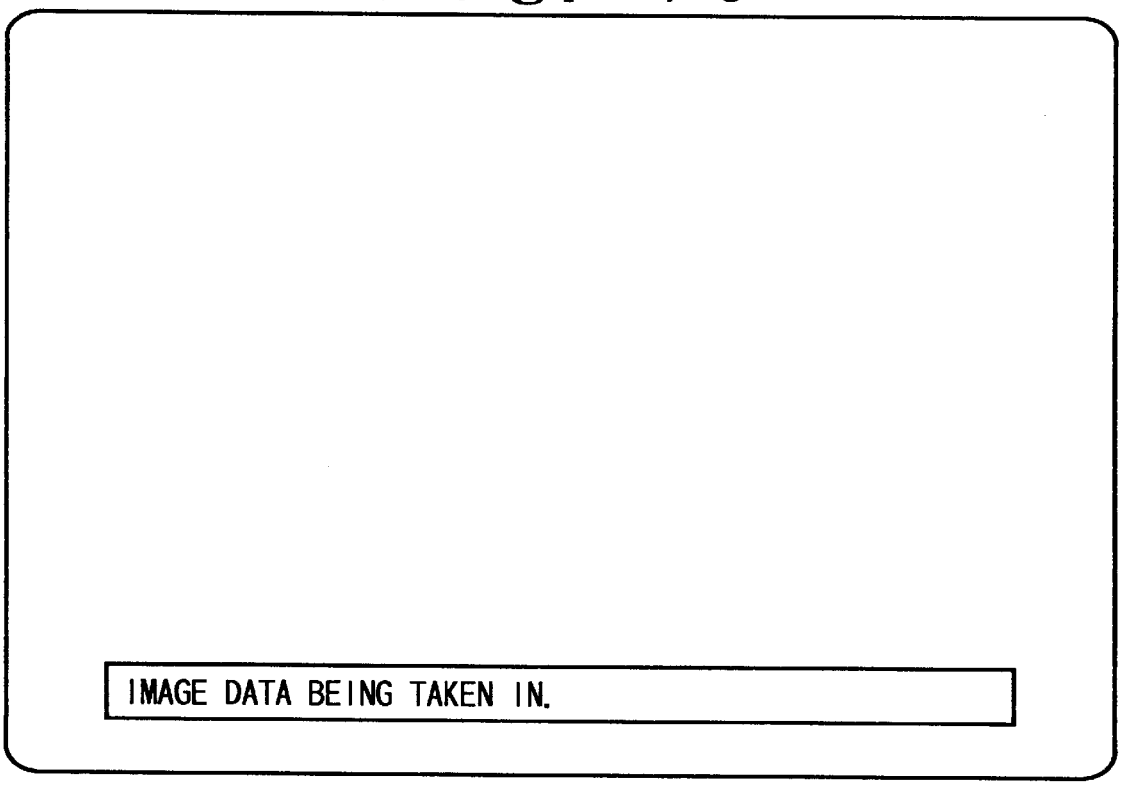
FIG. 46 is a drawing of a monitor display section showing a concrete example of indication prior to an image reading process.
Figure 47:
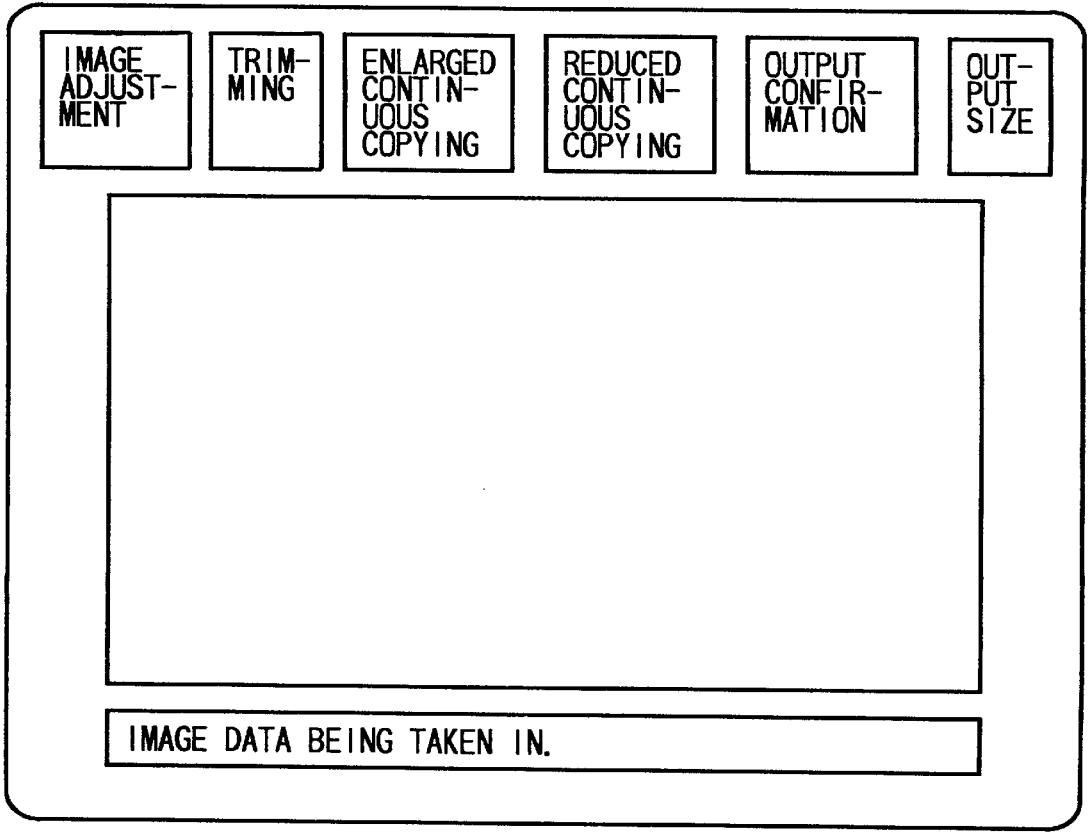
FIG. 47 is a drawing of a monitor display section showing a concrete example of indication prior to an image reading process.

FIGS. 40 through 47 show various examples of indications on the monitor display section 71 under an ordinary mode in an image reading process. FIG. 40 shows a state where lamp unit is not mounted when the power source is turned on. FIG. 41 shows a state when an optical system is being changed over. FIG. 42 shows a state where both the lamp unit and film carrier are set when power source is turned on, however, they are different in kind. For example, 35 mm film is used in this case. FIG. 43 shows a state where both the lamp unit and film carrier do not exist when power source is turned on. 35 mm film is used in this case, for example. FIG. 44 shows an example of indication of request for mounting a lamp unit fit to the size of film carrier. In this case, 6 cm film is used, for example. FIG. 45 shows an example of indication that shading correction data is being taken in, and FIGS. 46, 47 show examples of indications that image data is being taken in.

Figure 48:
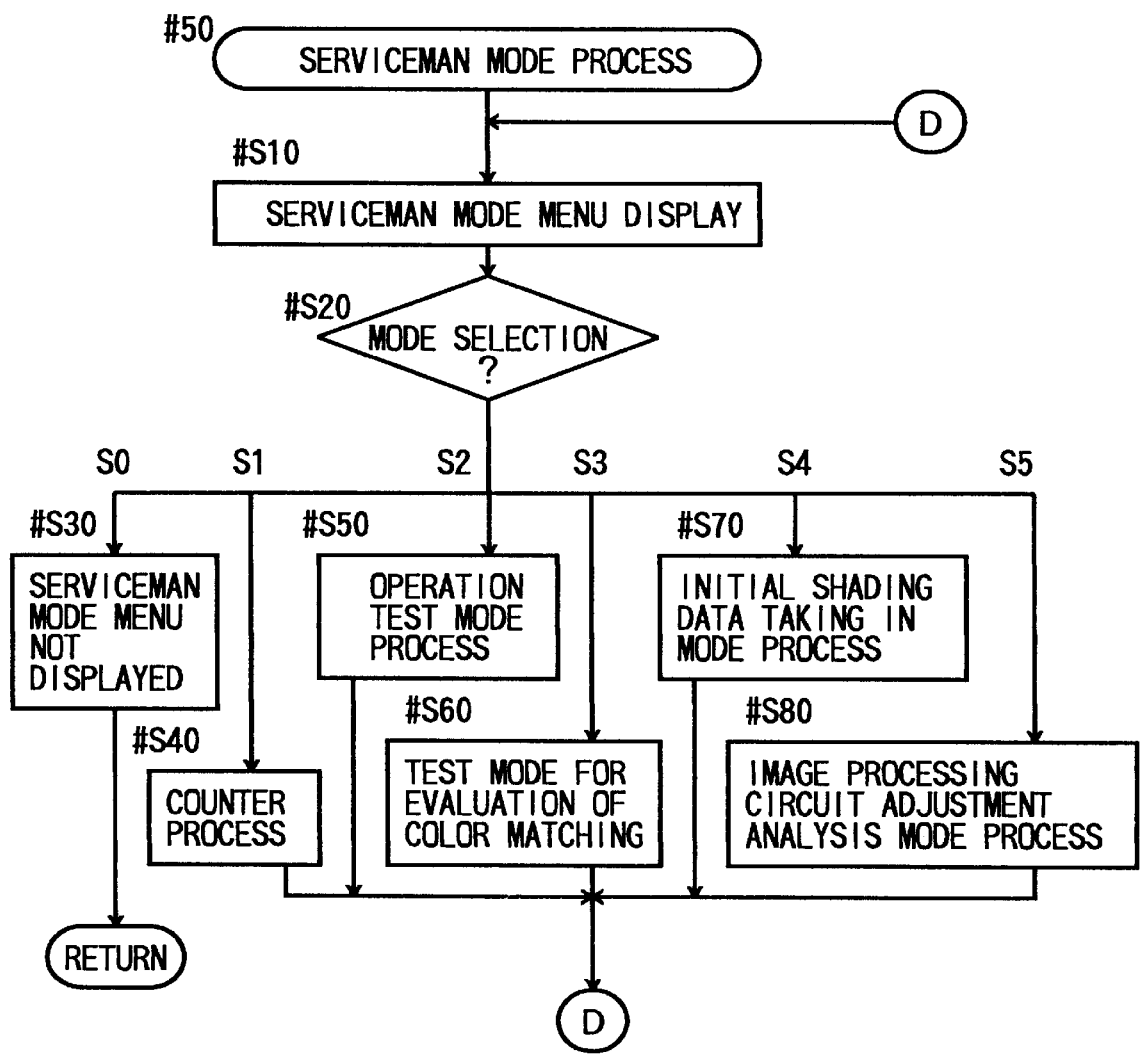
FIG. 48 is a flowchart showing a subroutine for a serviceman mode process.

FIGS. 48 shows a flowchart of a subroutine in the FIG. 16 for serviceman mode process. In the serviceman mode process, various reading conditions corresponding to the size of a film and difference in negative and positive films to be used for reading an image under an ordinary mode are preliminarily detected and set at an initial adjustment stage, and in a practical image reading process, various adjustment data are read from memory means corresponding to the kind of an actual original being used for image reading so that image reading can be properly performed.

In the serviceman mode process, serviceman mode menu is indicated as shown at step #S10 in the FIG. 48, and through step #S20, the program branches to each subroutine corresponding to each mode selected S0–S5. When finish mode S0 is selected, a process for discontinuing the display of serviceman mode menu is performed at step #S30 to finish the present subroutine.

When counter mode S1 is selected in the serviceman mode menu, a subroutine for counter process is executed at step #S40, and then, the program returns to step #S10. The counter process is utilized when serviceman checks counter values such as the number of operations, the number of copy sheets and the number of maintenance counts. When an operation state mode S2 is selected in the serviceman mode menu, a subroutine for an operation state mode process is executed at step #S50, and then, the program returns to step #S10. In the operation state mode process, operation test for the elements being used in the mechanism is conducted. When a color matching evaluation test mode S3 is selected in the serviceman mode menu, a subroutine for a color matching evaluation test mode process is executed at step #S60, and then, the program returns to step #S10. In the color matching evaluation mode, color matching evaluation process for monitor output, copy output and data reading is performed.

When initial shading data analysis mode is selected, an initial shading data taking in mode process is performed at step #S70, and then, the program returns to step #S10. In the initial shading data taking in mode process, a process for calculating a coefficient is performing for preparing a shading data. When image processing circuit adjustment analysis mode S5 is selected in the serviceman mode menu, a subroutine for image processing circuit adjustment analysis mode process is performed at step #S80, and then, the program returns to step #S10. In the process, adjustment of the maximum output of color CCD sensor 112, and RGB data balance adjustment are processed.

Figure 50:
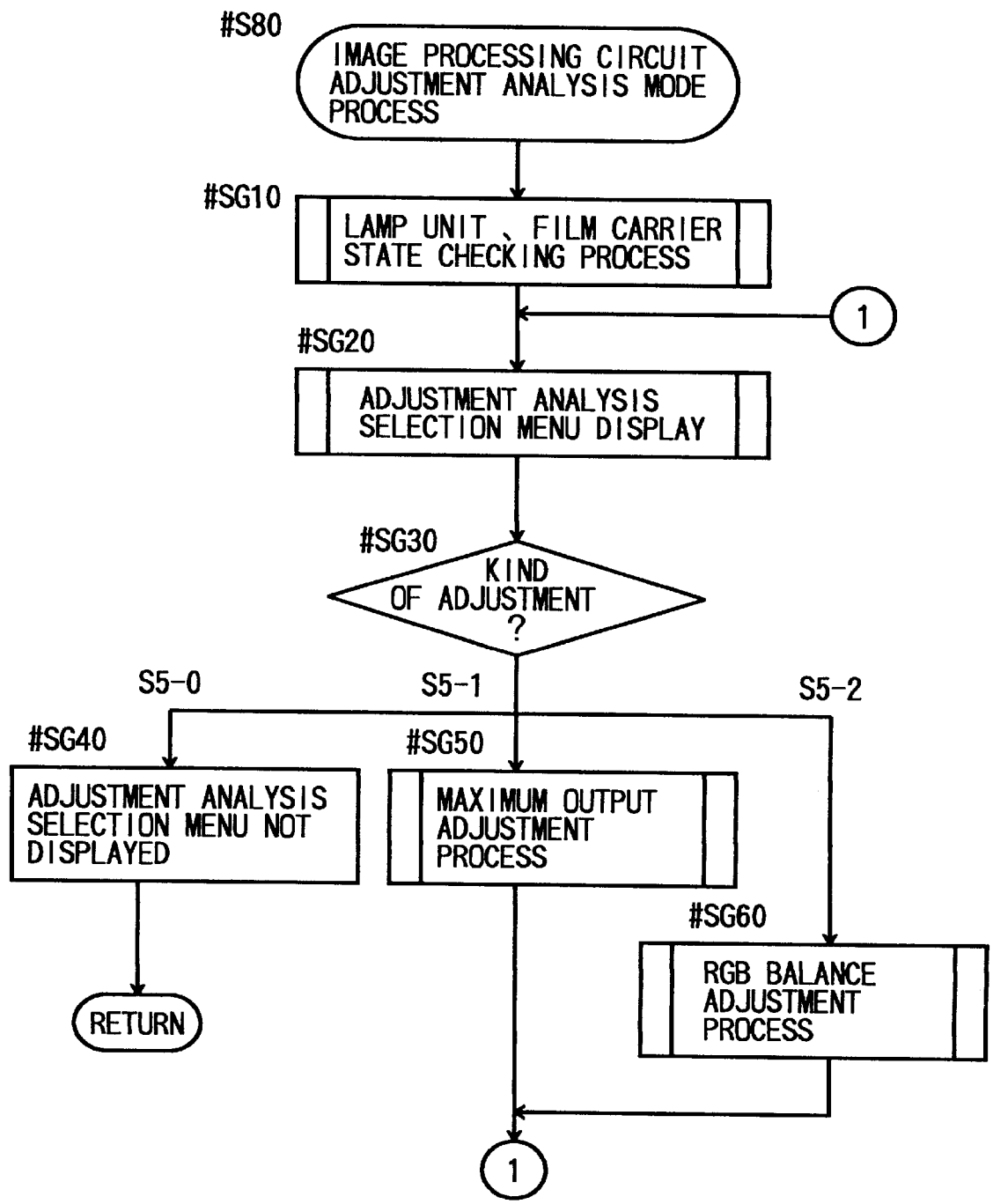
FIG. 50 is a flowchart showing a subroutine for an image processing circuit adjustment analysis mode process.

FIG. 50 shows a flowchart of a subroutine at step #S80 in FIG. 48 for image processing circuit adjustment and analysis mode process. This is a mode which is utilized when adjustment is initially made, and particularly related to image processing circuit. In this adjustment mode process, a film carrier provided with a lamp unit and a film for evaluation is operated by operator. Since this mode process is automatically performed, a complicated adjustment operation is largely simplified compared with a conventional apparatus wherein an operator had to make fine adjustment by connecting a measuring device.

In the image processing circuit adjustment analysis mode process, a subroutine of lamp unit, film carrier state checking process is first performed at step #SG10. In this process, it is checked whether the lamp unit and film carrier are mounted or not, and at the same time, the kind of lamp unit and film carrier are also checked. After finishing the process at step #SG10, through a judgment which is made at step #SG30, the program branches into each process corresponding to each selection mode of S5-0–S5-2. When finish mode S5-0 is selected in the adjustment analysis selection menu, a process for discontinuing the display of adjustment analysis selection menu is performed to finish the present subroutine.

When maximum output adjustment mode S5-1 is selected in the adjustment analysis selection menu, a subroutine of maximum output adjustment process is executed at step #SG50, and then, the program returns to step #SG20. In this process, adjustment of lamp voltage for making the maximum output value of the color CCD sensor 112 to a predetermined level is processed. When RGB balance adjustment mode S5-2 is selected in the adjustment analysis selection menu, a subroutine of RGB balance adjustment process is performed at step #SG60, and then, the program returns to step #SG20. In this process, analog gain is adjusted to properly arrange the balance of RGB data of analog voltage data to be inputted into an A/D converter.

Figure 51:
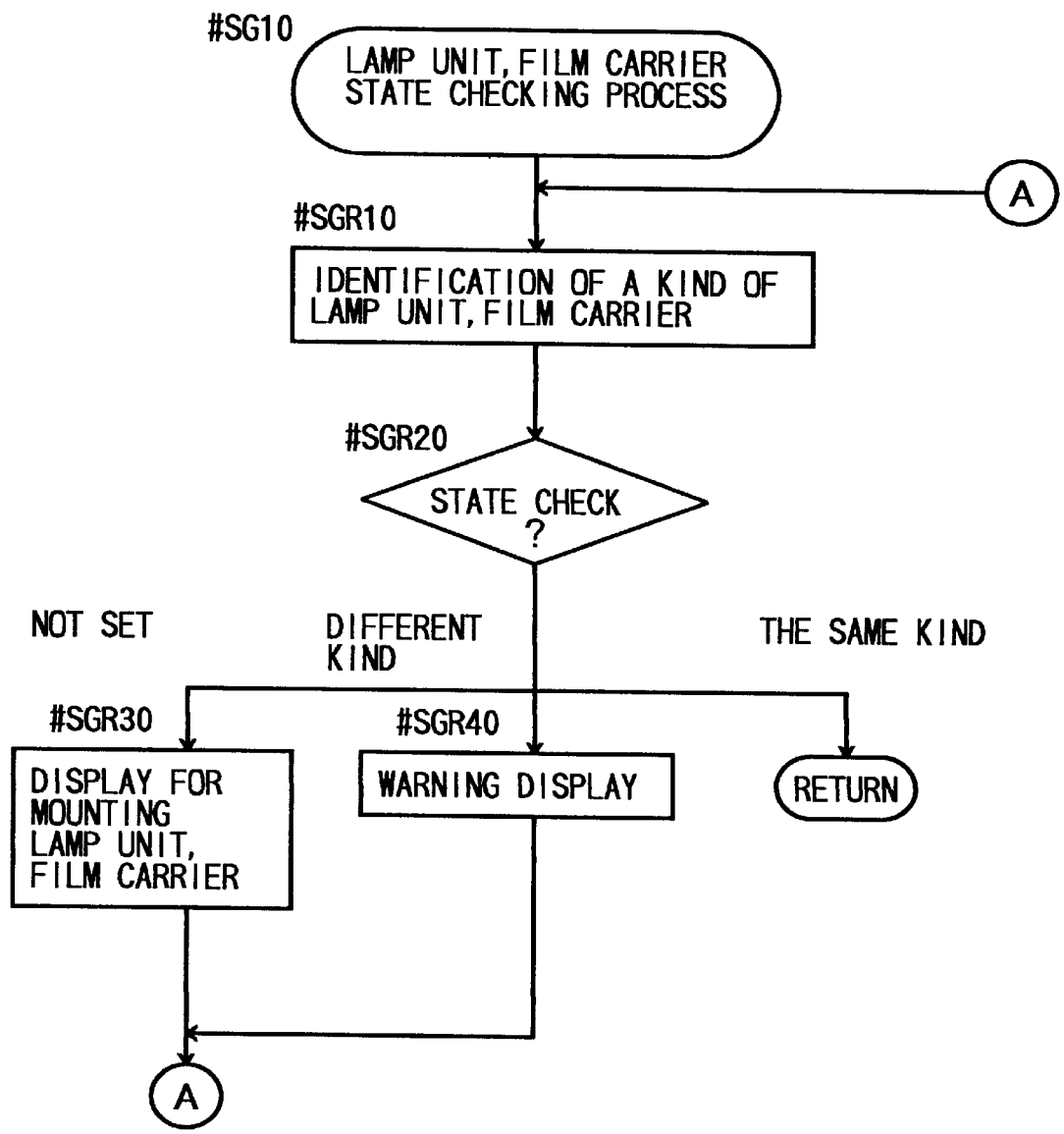
FIG. 51 is a flowchart showing a subroutine for a process of checking a state of a lamp unit and film carrier.

FIG. 51 shows a flowchart of a subroutine at step #SG10 in FIG. 50 where the lamp unit, and film carrier state checking process is performed. In the checking process, identification of a kind of lamp unit and film carrier is processed at step #SGR10, and the program branches through a state checking process at step #SGR20. When either a lamp unit or film carrier is not set, a process of display for mounting either a lamp unit or film carrier is performed at step #SGR30, and the program returns to step #SGR10. In this process, an operator is informed of an abnormal state. When judgment is made that the kind of lamp unit and film carrier is different at step #SGR20, a warning process is performed at step #SGR40, and the program returns to step #SGR10. Since a normal data can not be obtained when they are different in kind, it is necessary to have the operator mount a right kind of lamp unit or film carrier. When it is judged that the lamp unit and film carrier are the same kind at step #SGR20, the present subroutine is finished since it is under normal condition.

Figure 52:
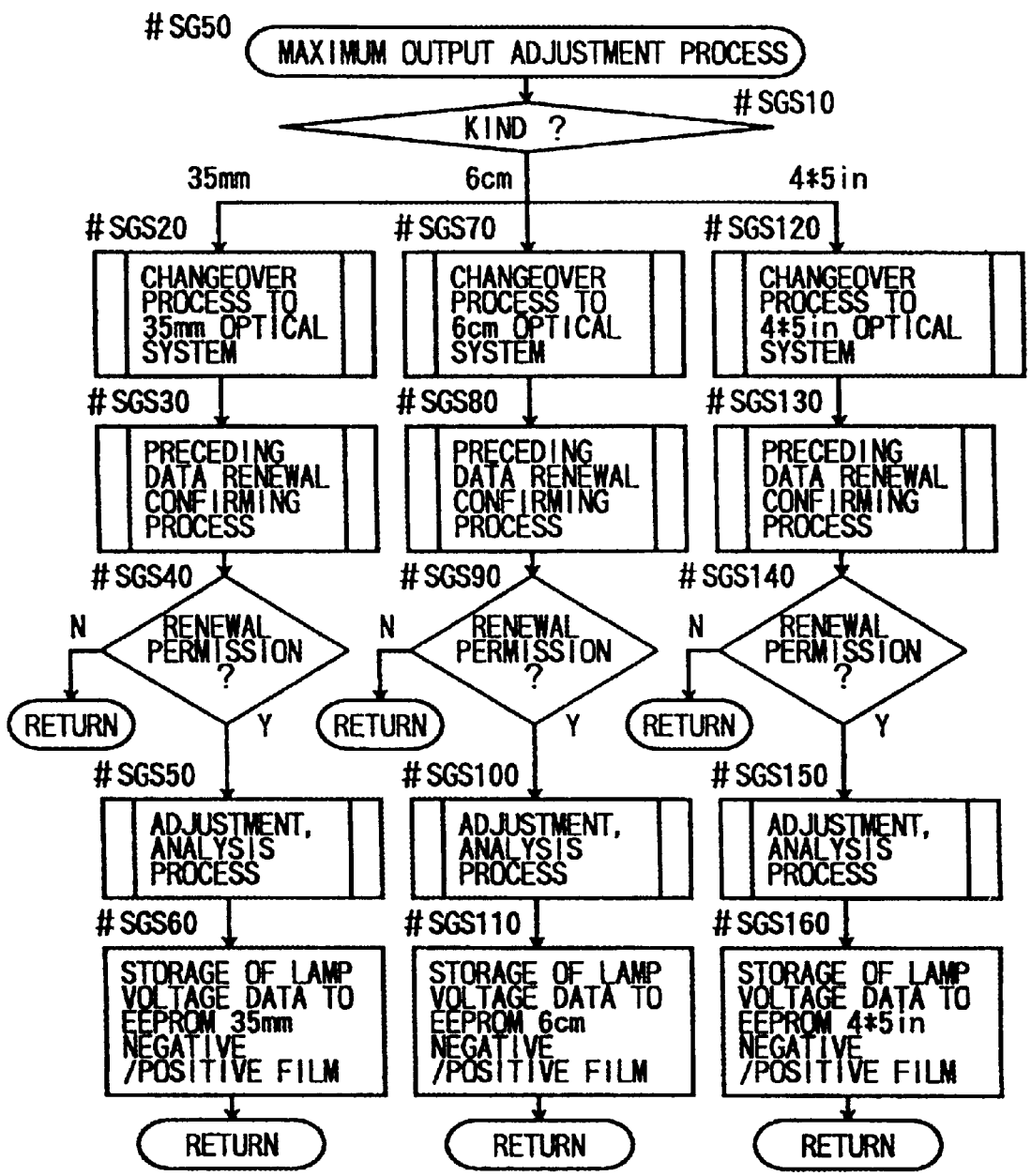
FIG. 52 is a flowchart showing a subroutine for a maximum output adjustment process.

FIG. 52 shows a flowchart of a subroutine at step #SG50 in FIG. 50 for a maximum output adjustment process. In the maximum output adjustment process, a judgment is first made on a kind of mounted film carrier at step #SGS10, and the program branches corresponding to a kind of film carrier.

When a film carrier detected at step #SGS10 is for 35 mm film, a process for changing over to an optical system for 35 mm film is performed at step #SGS20 to finish the present subroutine. At step #SGS30, a preceding data renewal confirmation process is performed, and if renewal is not permitted, the present subroutine is finished. When renewal is permitted, a process at step #SGS50 is performed. The permission or non permission process is performed by the operator. At the process of step #SGS50, an adjustment, and analysis process subroutine is performed. Then, at step #SGS60, a data determined at the step #SGS50 is stored into the EEPROM. The data is stored in the EEPROM since it has to be securely stored under a nonvolatile state even when the power source is turned off.

When a film carrier is judged for 6 cm film at step #SGS10, processes at steps #SGS70–#SGS110 are performed. When a film carrier is judged for 4×5 inch film at step #SGS10, processes at steps #SGS120–#SGS160 are performed. Since the contents of the processes are the same as that of 35 mm film, a detailed description will be omitted.

Figure 53:
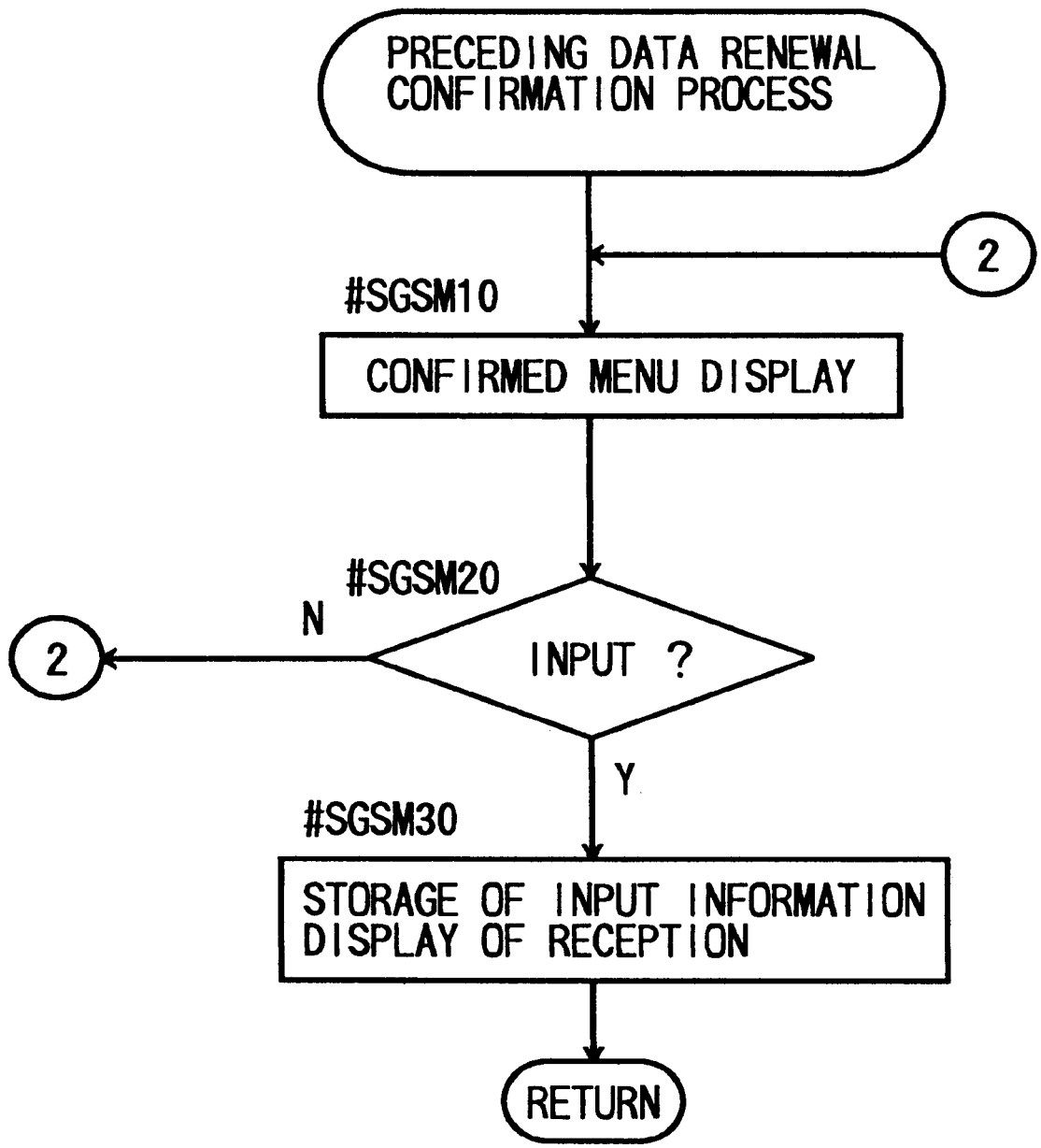
FIG. 53 is a flowchart showing a subroutine for a preceding data renewal confirmation process.

FIG. 53 shows a flowchart of a subroutine at steps #SGS30, #SGS80 and #SGS130 in FIG. 52 for a preceding data renewal confirmation process. In this process, it is arranged to confirm a data before the data is renewed in order to prevent important data from being carelessly damaged by the operator. In the preceding data renewal confirmation process, a process for displaying a confirmed menu is first performed at step #SGSM10. At this stage, it is selected whether a data is to be erased or the mode is to be canceled (release of data erasing process) by the operator, and the program moves to step #SGSM30 with a judgment made at step #SGSM20. At step #SGSM30, storage of input information and reception display processes are performed to finish the present subroutine.

Figure 49:
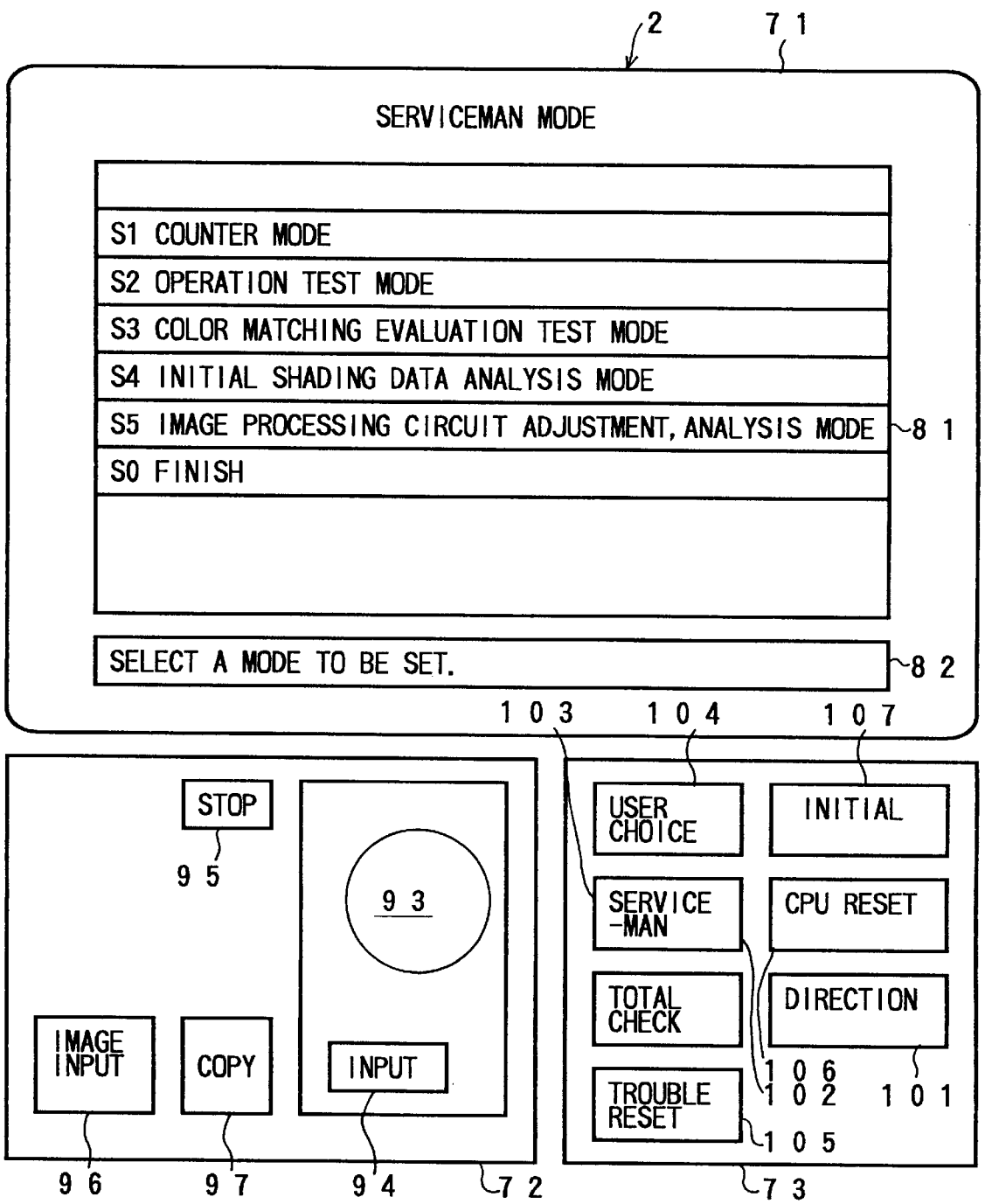
FIG. 49 is a drawing showing a picture at an initial stage under a serviceman mode.
Figure 54:
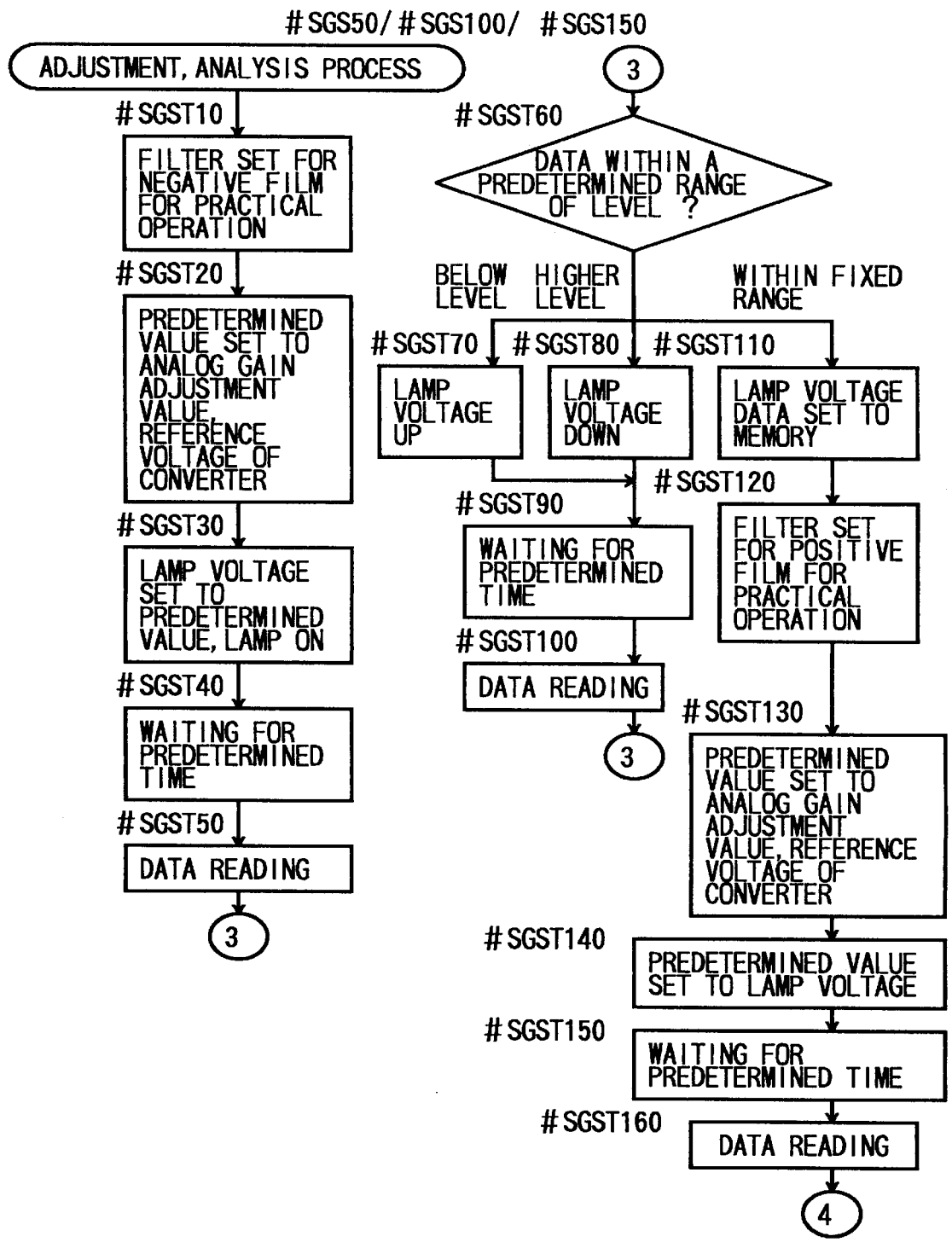
FIG. 54 is a first part of a flowchart showing a subroutine for adjustment and analysis process.
Figure 55:
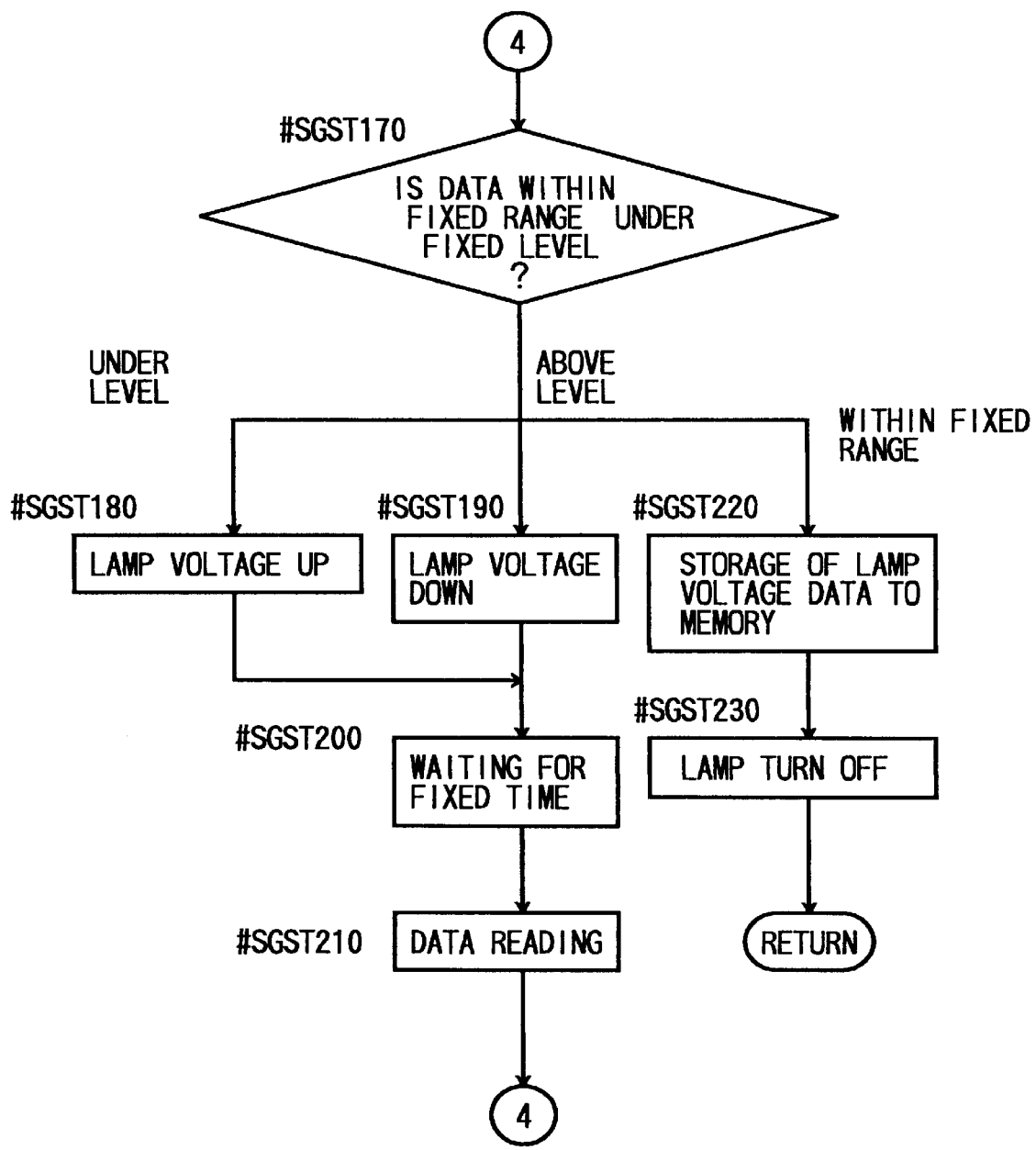
FIG. 55 is a latter part of the flowchart showing a subroutine for adjustment and analysis process.

FIGS. 54 and 55 show flowcharts of subroutines at steps #SGS50, #SGS100 and #SGS150 in FIG. 49 for an adjustment, analysis process where processes for determining lamp voltages of negative film and positive film are performed. When this process is executed, a film for evaluation, for instance, a film which has photographed a Macbeth color checker, is utilized. Adjustment is made by utilizing ND section of the film. In the adjustment, analysis process, a process for setting a filter to be used for negative film at a practical operation is performed at step #SGST10. The practical operation means the cases when copy is output and an image is output to a color CRT.

When a filter is set, a process for setting a predetermined value to the image processing circuit is performed at step #SGST20. More particularly, it is a gain value of an amplifier and a reference voltage value of A/D converter provided on R,G,B signal line. Under a state that those values are set at predetermined values, a lamp voltage is adjusted to cause an output of color CCD sensor to become a predetermined level.

At step #SGST30, a process for setting a lamp voltage to a predetermined value is performed to turn on a lamp. At step #SGST40, a process is performed for waiting a time until the light amount of the lamp is stabilized, and a data is taken in at step #SGST50. At step #SGST60, it is checked whether the maximum level in the R,G,B data taken in is within a predetermined range or not. When it is judged that the level is under the predetermined level at step #SGST60, the lamp voltage is raised at step #SGST70, and after waiting for a predetermined time at step #SGST90, a data is taken in again at step #SGST100, and the program returns to step #SGST60. If it is judged that the level is above a predetermined level at step #SGST60, the lamp voltage is lowered at step #SGST80, and after waiting for a predetermined time at step #SGST90, a data is taken in again at step #SGST100, and the program returns to step #SGST60. When it is judged that the level is within a predetermined range at step #SGST60, the lamp voltage data is stored in a memory at step #SGST110, and the program moves to a process for taking in a data for positive film.

The process for taking in a data for positive film can be accomplished by processes at steps #SGST120–#SGST230. The contents of the process is the same as that of negative film, and therefore, detailed description will be omitted. After turning off the lamp at step #SGST230, the present subroutine is finished. By executing the above-described processes, each lamp voltage is determined to make an output of color CCD sensor for negative and positive films to equal to a predetermined level, and they are stored into respective memories.

Figure 56:
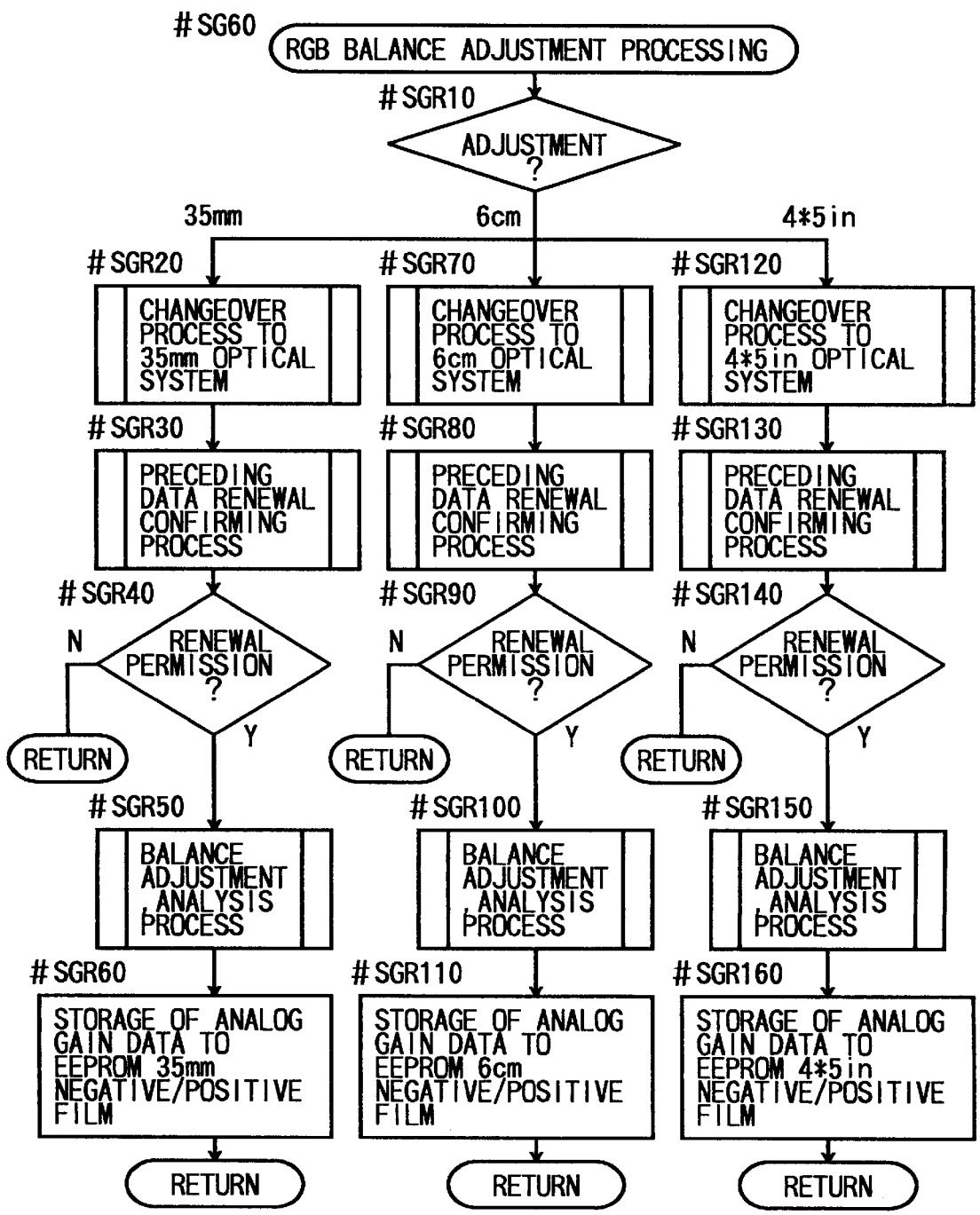
FIG. 56 is a flowchart showing a subroutine for an RGB balance adjustment process.

FIG. 56 shows a flowchart of a subroutine at step #SG60 in FIG. 50 where RGB balance adjustment process is performed. In the RGB balance adjustment process, a kind of unit being mounted is judged at step #SGR10, and the program branches correspond to the kind of unit mounted.

When it is judged that a unit is for 35 mm film at step #SGR10, a process for changing over to an optical system for 35 mm film is performed at step #SGR20. After finishing the changeover process, a preceding data renewal confirmation process is executed at step #SGR30, and if the renewal is not permitted, the present subroutine is finished. When the renewal is permitted, a process at step #SGR50 is executed. The selection for permission or non-permission is conducted by the operator.

At step #SGR50, a balance adjustment and analysis process subroutine is executed. Then, at step #SGR60, a process for storing a data determined at said step #SGR50 into the EEPROM is performed. More particularly, gain data of the amplifier provided on each signal line of R,G,B for reading 35 mm negative and positive films are stored. The data is stored into the EEPROM since it is necessary to secure the data under nonvolatile state even if power source is turned off.

If it is judged that a unit is for 6 cm film at step #SGR10, processes at steps #SGR70–#SGR110 are executed. When it is judged that a unit is for 4×5 inch film at step #SGR10, processes at steps #SGR120–#SGR160 are performed. The contents of the processes are the same as that of 35 mm, and therefore, a detailed description will be omitted.

Figure 57:
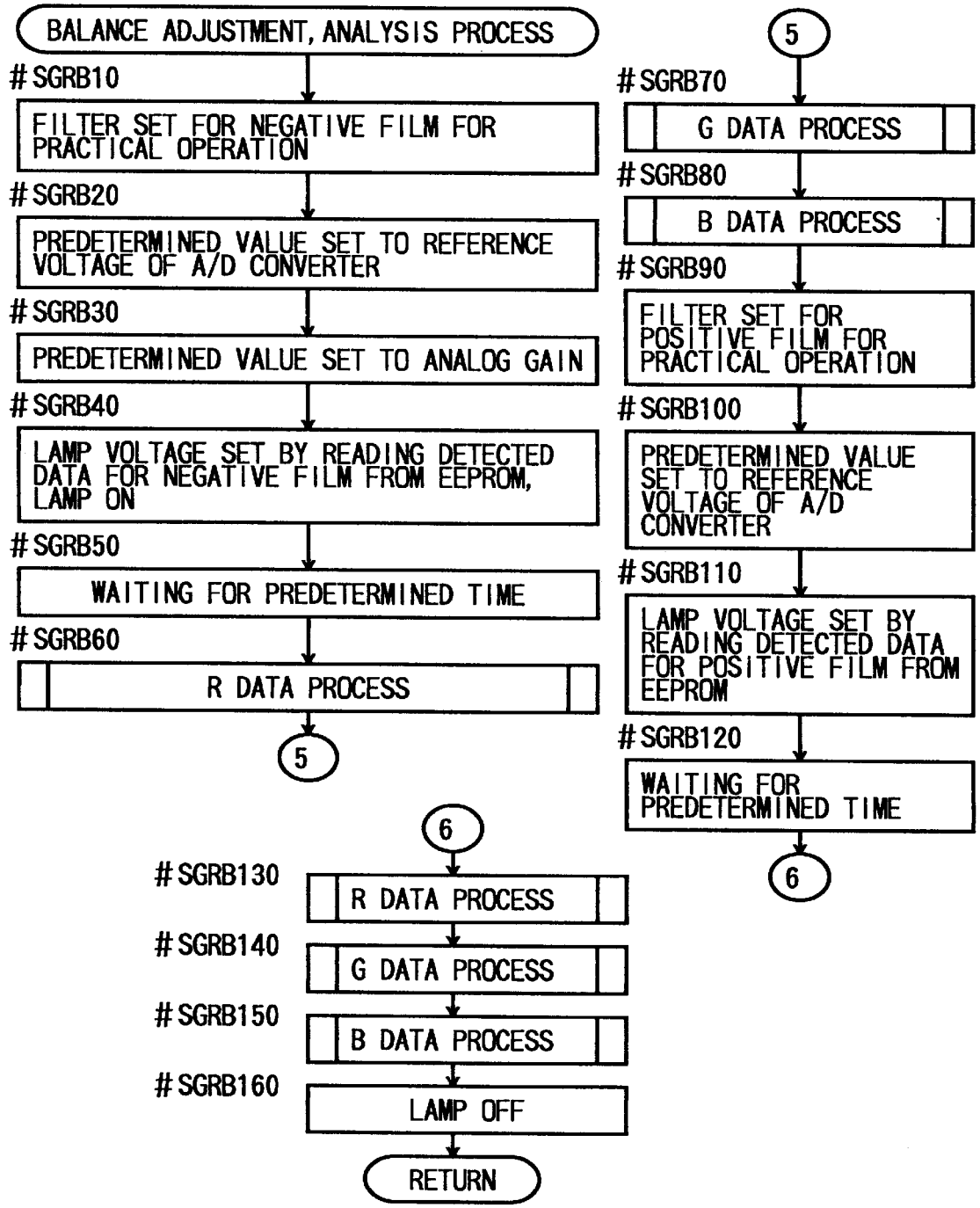
FIG. 57 is a flowchart showing a subroutine for balance adjustment and analysis process.

FIG. 57 shows a flowchart of subroutines at steps #SGR50, #SGR100 and #SGR150 in FIG. 56 for balance adjustment and analysis process wherein processes are executed for determining amplifier gains provided on each R,G,B signal line for negative and positive films. In executing the processes, a film for evaluation, for example, a film which has a photographed Macbeth color checker, is utilized. Adjustment is made by utilizing ND section of the film.

In the balance adjustment and analysis process, a process for setting a filter for negative film which is used at a practical operation is first performed. The practical operation means the cases when copy is output and when an image is output to a color CRT. When a filter is set, a process for setting a predetermined value to reference voltage of A/D converter is performed at step #SGRB20, and then, a process for setting predetermined values to each gain of amplifier provided on each R,G,B signal line is executed at step #SGRB30.

At step #SGRB40, a data stored for negative film is read, through an EEPROM, from a lamp voltage stored by a maximum output adjustment process. Processes for setting a data and turning on a lamp are performed. At step #SGRB50, a process is performed for waiting a time until the amount of lamp light is stabilized, and a subroutine for processing an R data is executed at step #SGRB60. G data process subroutine at step #SGRB70, and B data process subroutine at step #SGRB80 are performed, respectively, and gain values of amplifier provided on each R,G,B signal line are determined to store them into memories. Thereafter, a process for taking in a data for positive film is performed.

A data taking in process for positive film can be accomplished by processes at steps #SGRB90–#SGRB160. The contents of processes are the same as that of negative film, and therefore, detailed description will be omitted. After a lamp is turned off at step #SGRB160, the present subroutine is finished. By executing the aforementioned processes, up gains for arranging balance of signal level on each R,G,B signal line for negative and positive films are determined to be stored into memories.

Figure 58:
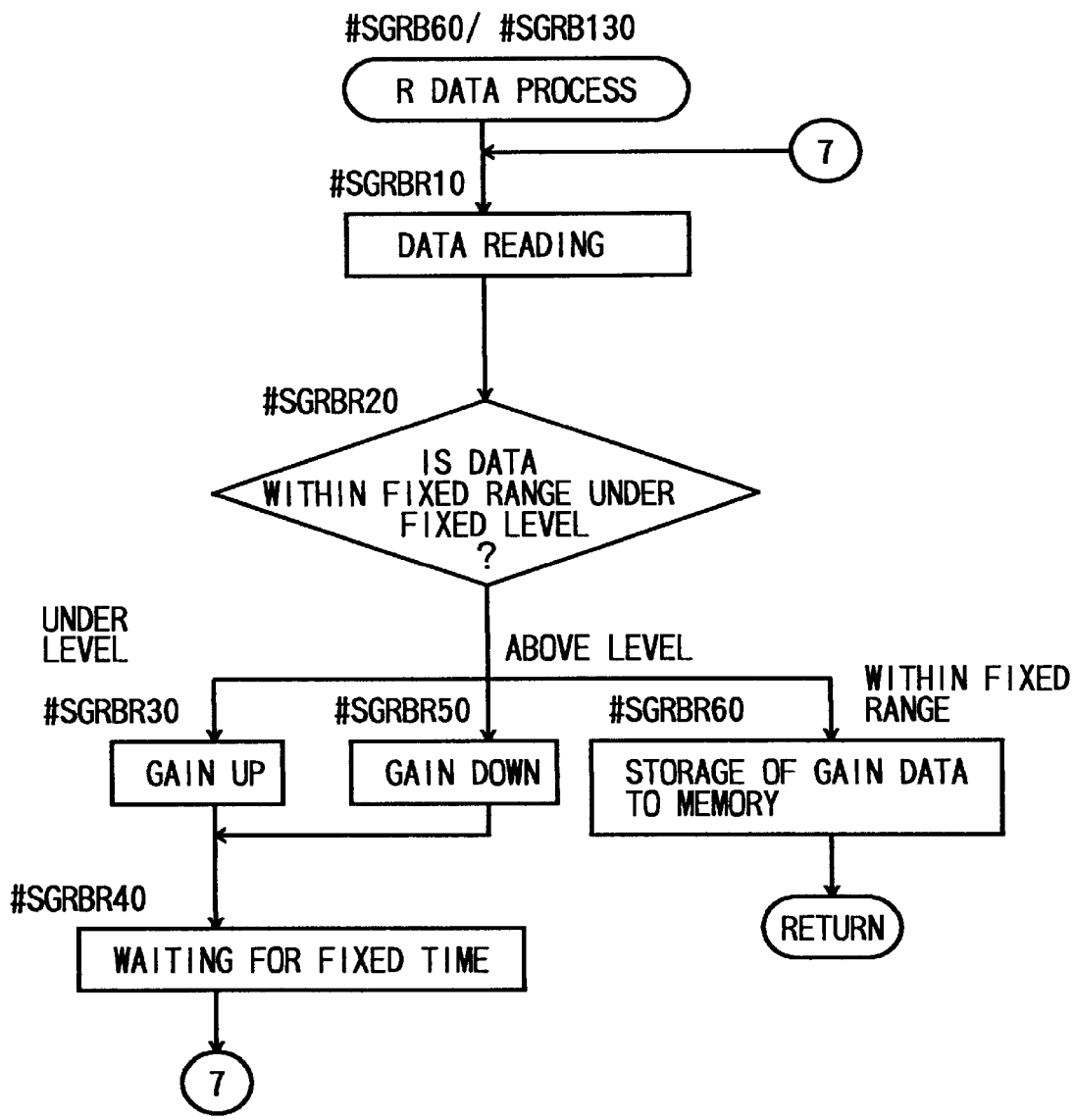
FIG. 58 is a flowchart showing a subroutine for an R data process.

FIG. 58 shows a flowchart of an R data process subroutine at steps #SGRB60 and #SGRB130 in the FIG. 57. In the R data process, a data taking in process is first performed at step #SGRBR10, and it is judged whether the data is at a predetermined level within a predetermined range at step #SGRBR20. If it is judged that the level is below a predetermined level at step #SGRBR20, a process for raising a gain of amplifier is performed at step #SGRBR30, and after waiting for a predetermined time at step #SGRBR40, the program returns to step #SGRBR10.

If it is judged that the level is above a predetermined level at step #SGRBR20, a process for lowering a gain of amplifier is performed at step #SGRBR50, and after waiting for a predetermined time at step #SGRBR40, the program returns to step #SGRBR10. When it is judged that the level is within a predetermined range, the gain data at this stage is stored into memory to finish the present subroutine. In the above description, an R data process subroutine is described, however, since each of G data and B data process subroutines are the same as that of said R data process, detailed description will be omitted.

FIG. 59 shows a flowchart of a subroutine at step #S70 in FIG. 48 for initial shading data taking in mode process. This mode is used at a time of initialization for reading a data conversion coefficient when shading correction data is prepared. In this mode, each kind of lamp units is operated by operator.

In the initial shading data taking in mode process, a process 2 for checking the states of lamp unit and film carrier is first executed at step #SS10. In this subroutine, it is checked whether lamp unit and film carrier are mounted or not, and if an abnormal state is found, a warning is displayed. In a shading data taking in mode menu display process at step #SS20, a process for displaying a menu is performed, and the program branches corresponding to a selection made.

If it is judged at step #SS30 that finish mode S4-0 is selected, a process for not displaying an initial shading data taking in mode menu is executed to finish the present subroutine. When it is judged at step #SS30 that data taking in analysis mode S4-1 is selected, a process for data taking in analysis subroutine is performed at step #SS50, and the program returns to step #SS20. In a process at step #SS50, the aforementioned shading correction data conversion coefficient is determined.

FIG. 60 shows a flowchart of subroutine at step #SS10 in FIG. 59 for a lamp unit, film carrier checking process 2 wherein the existence, and kind of lamp unit and film carrier are first identified at step #SSR10. The program branches according to a judgment made at step #SSR20.

If it is judged at step #SSR20 that there is no lamp unit mounted, a process of display for mounting a lamp unit is performed at step #SSR30 to notify that lamp unit is not mounted, and then, the program returns to step #SSR10.

When it is judged at step #SSR20 that a film carrier is mounted, a process of display for extracting a film carrier is performed at step #SSR40 to request extraction of a film carrier, and then, the program returns to step #SSR10. This is because an abnormal data might be taken in if a film carrier is mounted when shading data is taken in. If it is judged at step #SSR20 that a lamp unit is mounted, but a film carrier is not mounted, it means that shading data can be taken in, and therefore, the present subroutine is finished.

Figure 61:
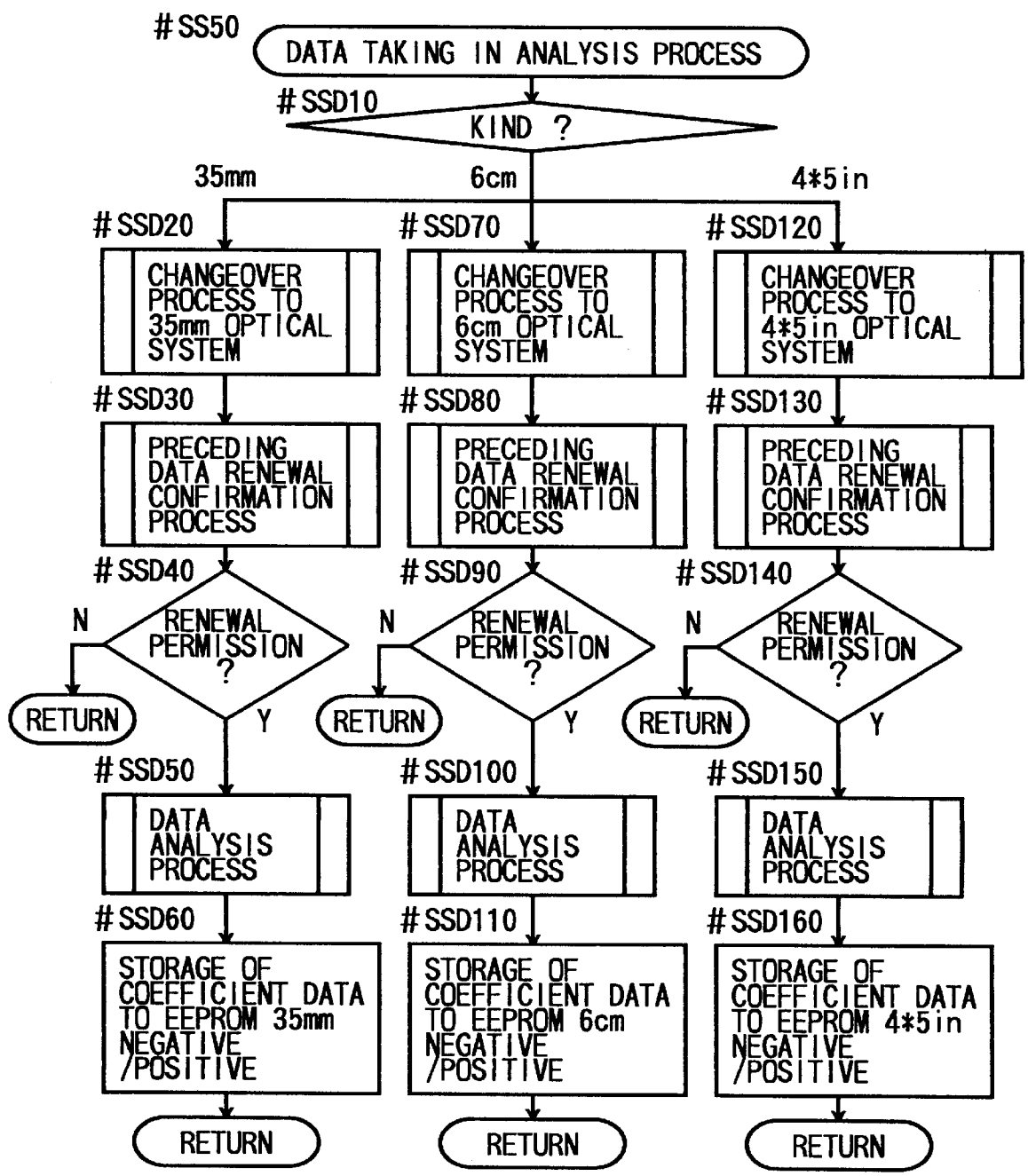
FIG. 61 is a flowchart showing a subroutine for a data taking in analysis process.

FIG. 61 shows a flowchart of subroutine at step #SS50 in FIG. 50 for a data taking in analysis process. In the data taking in analysis process, a kind of mounted film carrier is first identified at step #SSD10, and the program branches corresponding to a kind of mounted film carrier identified.

When it is judged at step #SSD10 that a mounted film carrier is for 35 mm film, a process for changing over to an optical system provided for 35 mm film is executed. After finishing this process, a preceding data renewal confirmation process is performed at step #SSD30. In the case when a renewal is not permitted, the present subroutine is finished. When a renewal is permitted, a changeover process is performed by the operator in order to prevent a careless data elimination by erroneous handling.

At step #SSD50, a data analysis process subroutine is executed. Then, a data determined by the process at step #SSD50 is stored into the EEPROM at step #SSD60. More particularly, a coefficient data for converting the shading correction data taken in for 35 mm negative and positive films into practical shading correction data is stored. Said data is stored in the EEPROM since it is necessary to secure the data under a nonvolatile condition even if the power source is turned off. Upon completion of the process at step #SSD60, the present subroutine is finished.

If it is judged at step #SSD10 that a mounted film carrier is for 6 cm film, processes at steps #SSD70–#SSD110 are performed. If it is judged at step #SSD10 that a mounted film carrier is for 4×5 inch film, processes at steps #SSD120–#SSD160 are performed. The contents of these processes are the same as that of the process for 35 mm, and therefore, a detailed description will be omitted.

Figure 62:
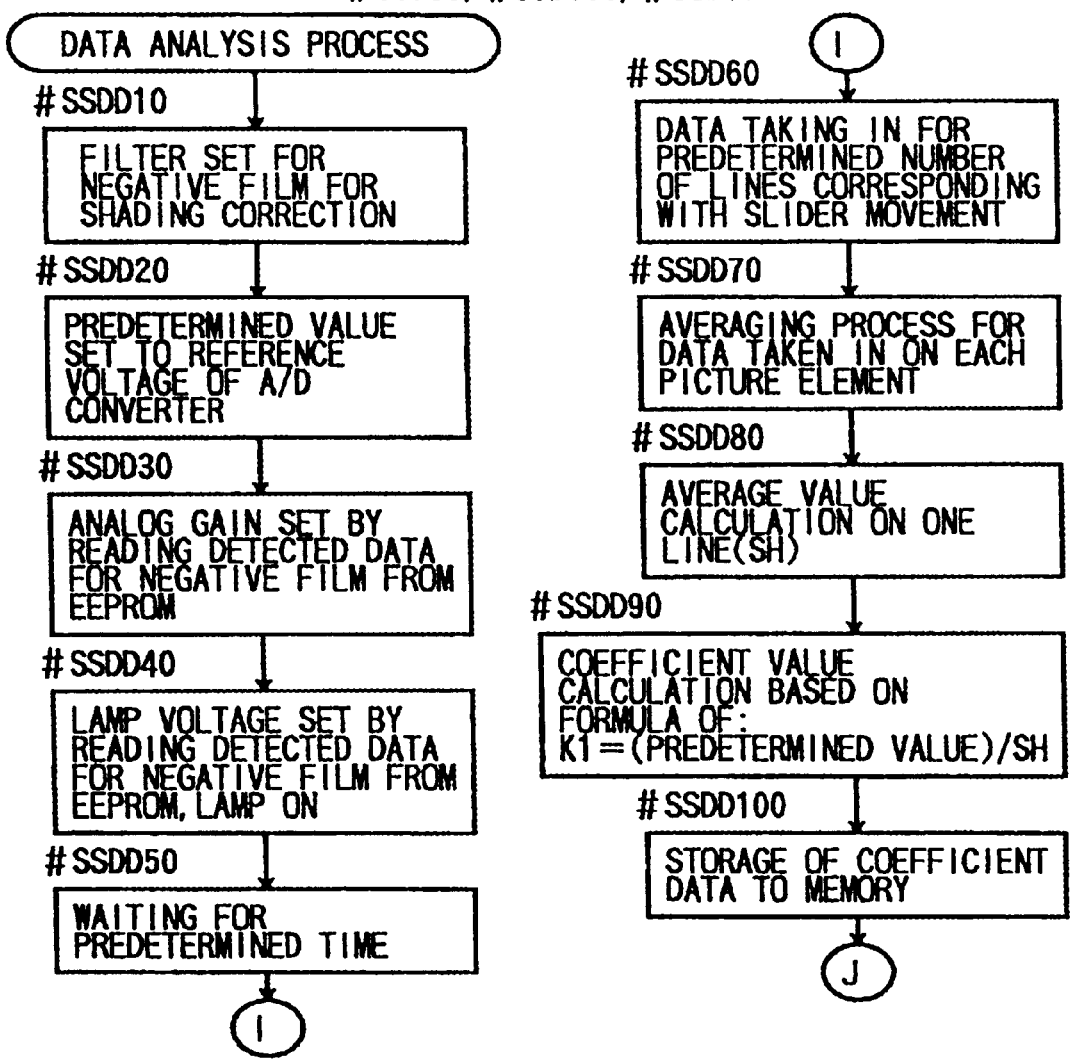
FIG. 62 is a first part of a flowchart showing a subroutine for a data analysis process.
Figure 63:
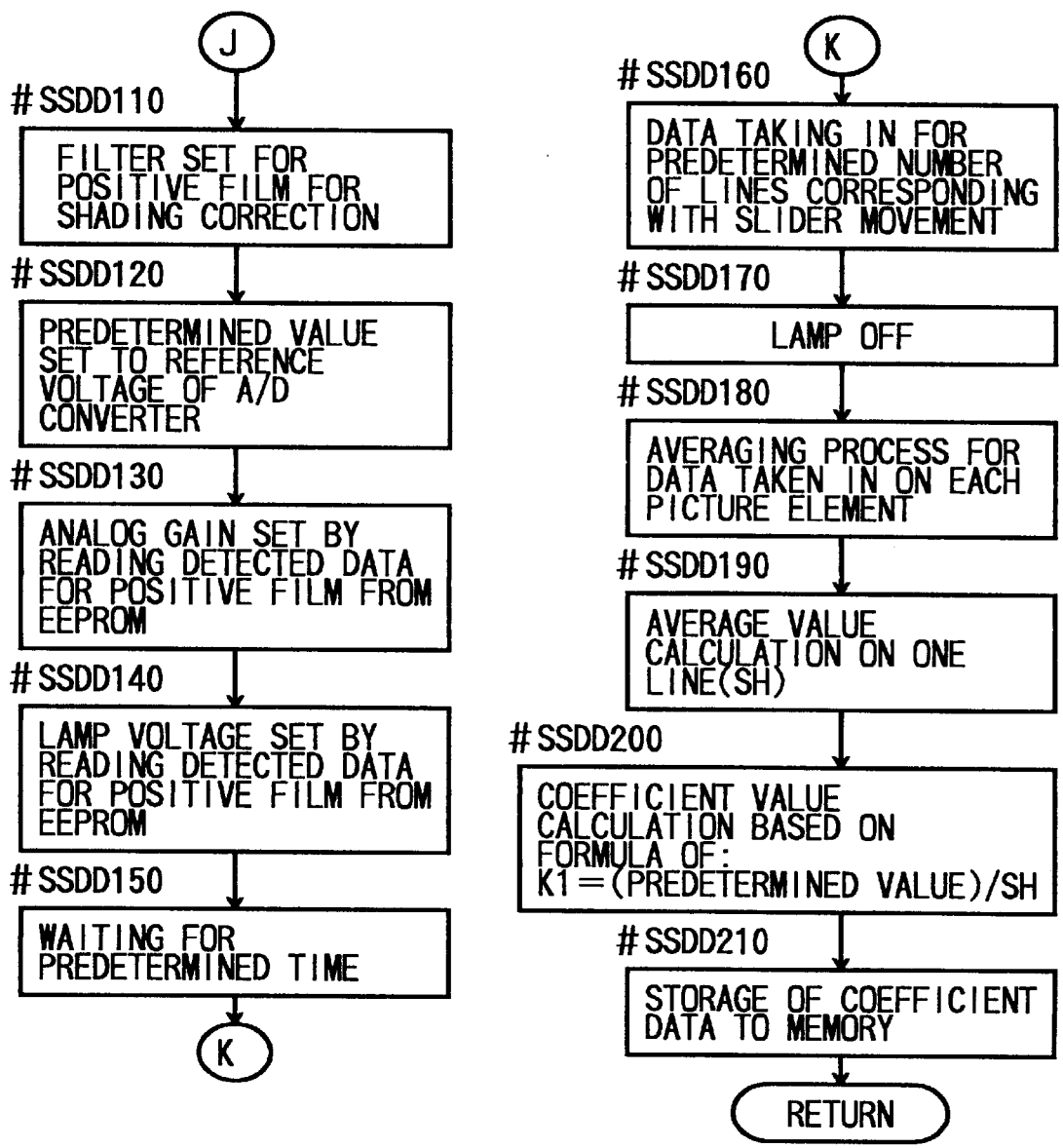
FIG. 63 is a latter part of the flowchart showing a subroutine for a data analysis process.

FIGS. 62 and 63 show a flowchart of a subroutine at steps #SSD50, #SSD100 and #SSD150 in FIG. 61 for data analysis process. In the data analysis process, coefficient for converting shading correction data taken in for negative and positive films into practical shading correction data is calculated from a data read to store into memories. More particularly, a process for setting a filter to be used when a negative film shading correction data is read is first performed at step #SSDD10. After the filter is set, a process for setting a predetermined value to a reference voltage of A/D converter is performed at step #SSDD20.

Then, at step #SSDD30, gain data for each R,G,B signal line for a size of negative film is read from analog gain data stored in the EEPROM through RGB balance adjustment process, and the data is set. A data stored for the size of negative film is read from a lamp voltage data stored in the EEPROM by maximum output adjustment process, and the data is set at step #SSDD40. Thereafter, a process for turning on a lamp is performed. At step #SSDD50, a process is performed for waiting a time until the light amount of lamp is stabilized, and then, a process for taking in a data for a predetermined line is executed by performing a scanning operation at step #SSDD60. Then, at step #SSDD70, a process for averaging a data of each picture element is performed from the data taken in on a predetermined number of lines to prepare a data on one line. At step #SSDD90, a data conversion coefficient Kl is calculated from said data based on a formula of: $K=(predetermined\ value) \times SH$, and the coefficient calculated is stored into memory at step #SSDD100. Data taking in process for positive film can be accomplished through processes at steps #SSDD110–#SSDD210. The contents of said process is the same as that of the process for negative film, and therefore, detailed description will be omitted. At step #SSDD210, a coefficient for positive film is stored into memory to finish the present subroutine.

FIGS. 64 through 75 show concrete examples of each indication on the monitor display section 71 under serviceman mode besides the example shown in FIG. 49.

Figure 72:
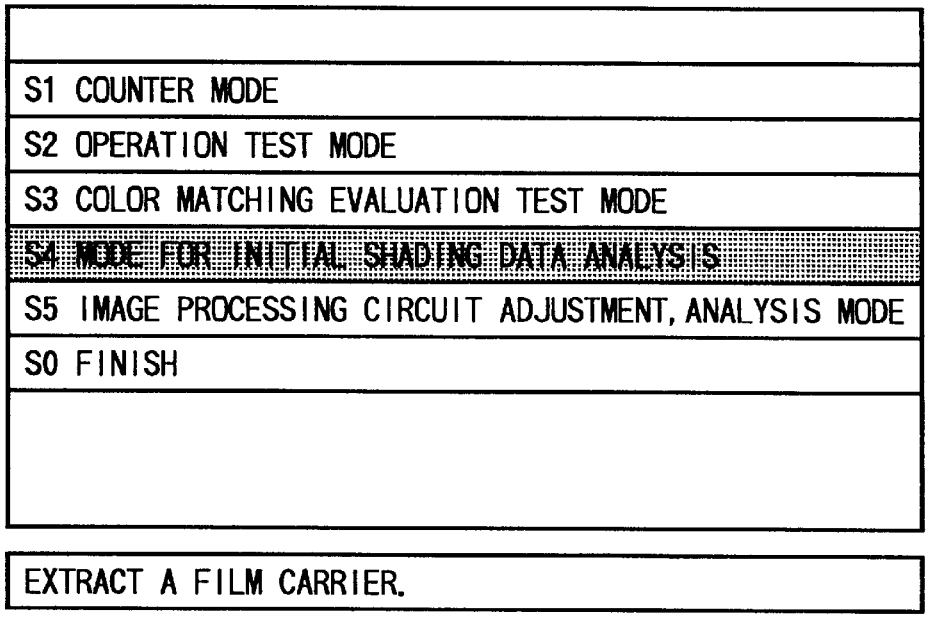
FIG. 72 is an another example of indication on a monitor display section under a serviceman mode.
Figure 73:
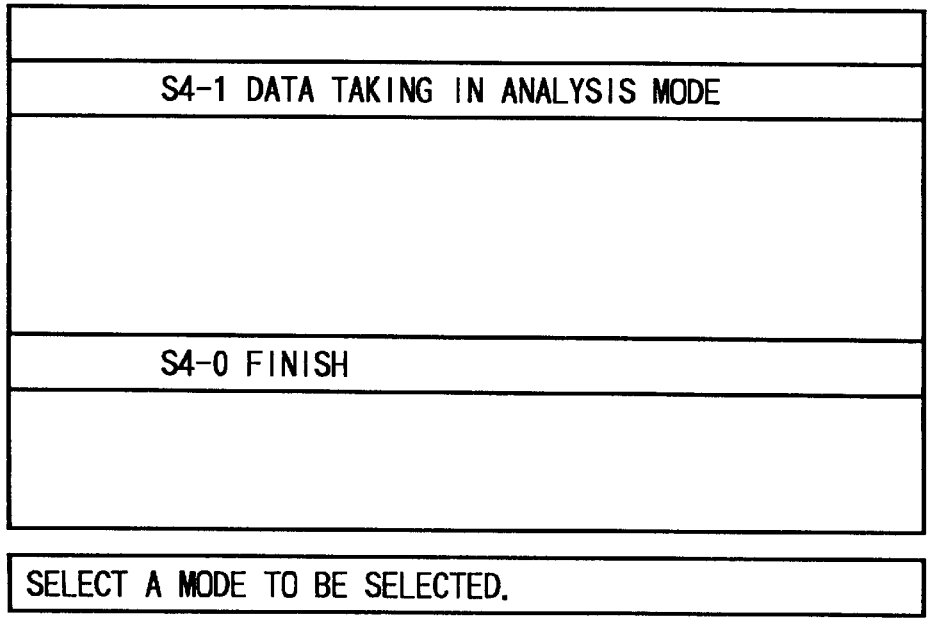
FIG. 73 is an another example of indication on a monitor display section under a serviceman mode.
Figure 74:
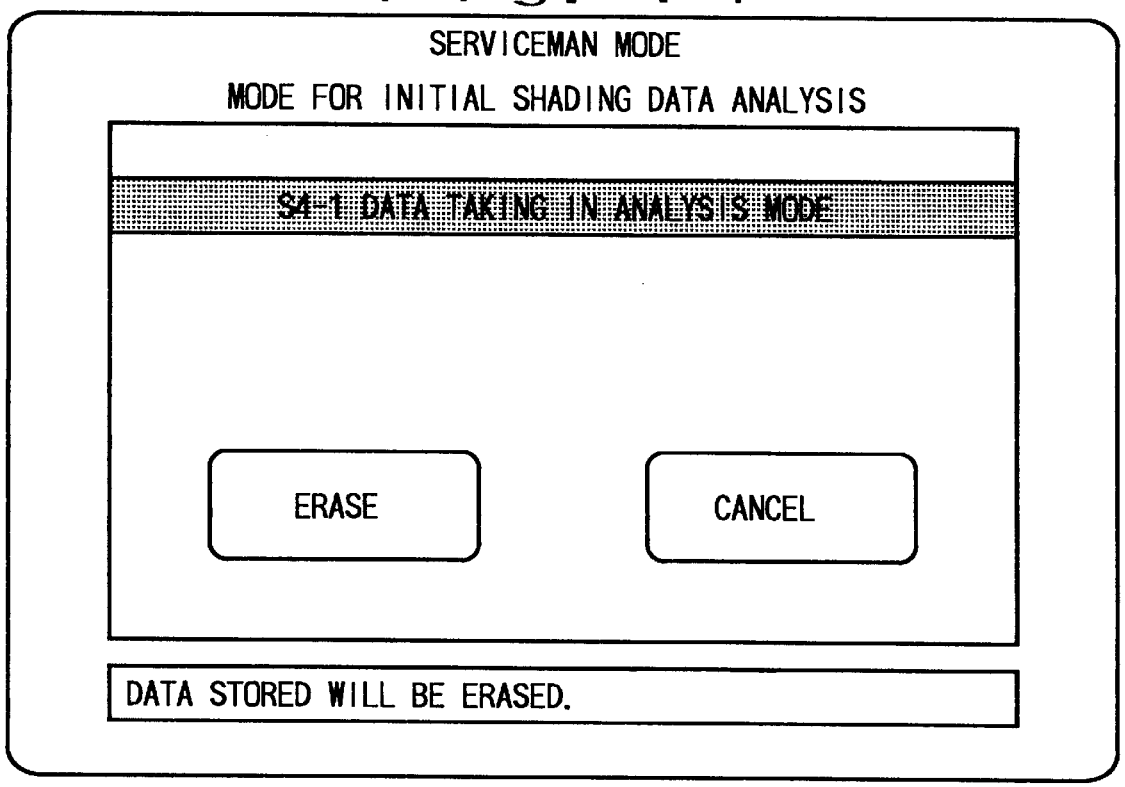
FIG. 74 is an another example of indication on a monitor display section under a serviceman mode.
Figure 75:
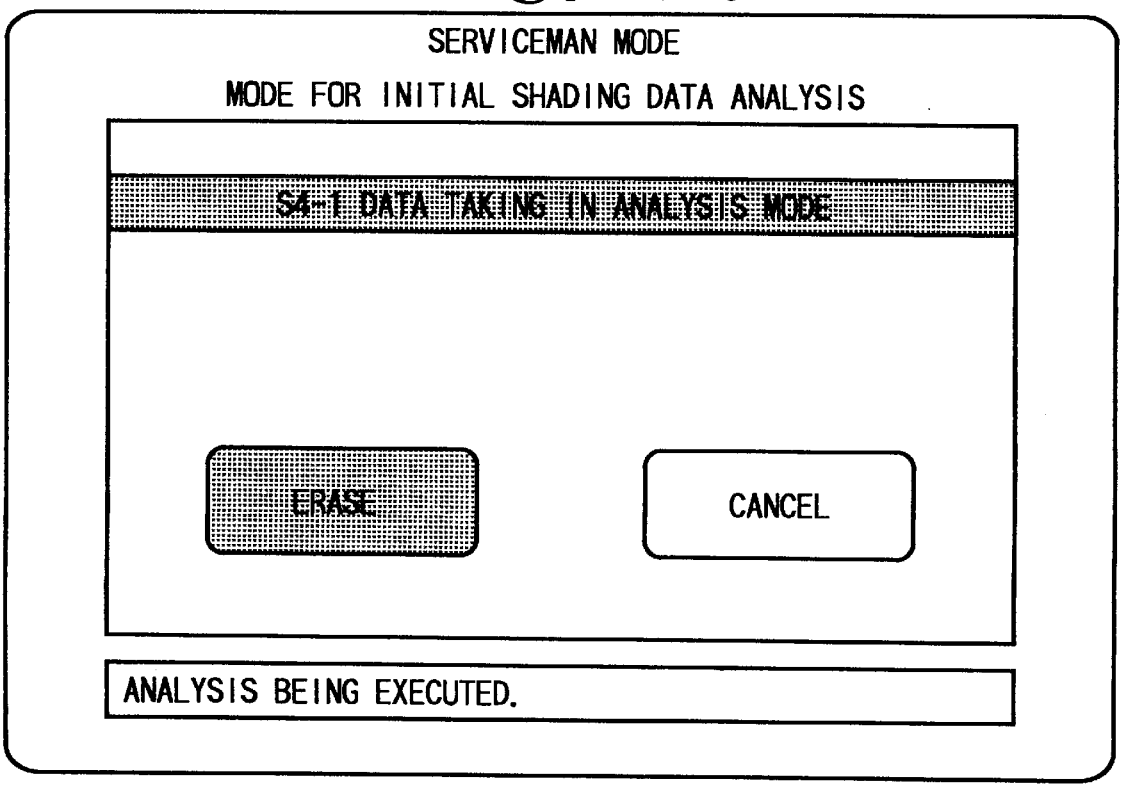
FIG. 75 is an another example of indication on a monitor display section under a serviceman mode.

FIG. 64 is a picture showing when the lamp unit and film carrier are not mounted, FIG. 65 is a picture showing when the lamp unit and film carrier differ in kind, FIG. 66 is a picture for an image processing circuit adjustment and analysis mode, FIG. 67 is a picture showing a menu display for confirmation when a maximum output adjustment mode is set, FIG. 68 is a picture for adjustment and analysis reception, FIG. 69 is a picture showing a menu display for confirmation when RGB balance adjustment mode is set, FIG. 70 is a picture showing adjustment and analysis reception, FIG. 71 is a picture showing a case when the lamp unit is not mounted under initial shading data analysis mode, FIG. 72 is a picture showing a case when the film carrier is mounted under the initial shading data analysis mode, FIG. 73 is a picture showing the initial shading data analysis mode, FIG. 74 is a picture showing a menu display for confirmation when data taking in analysis mode is set under initial shading data analysis mode, and FIG. 75 is a picture showing analysis reception when data taking in analysis mode is set under initial shading data analysis mode.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus which is capable of reading an image of different size of films, comprising:

means for irradiating light onto a film;

means for changing photoelectricity which is output corresponding to a change in an amount of light;

scanning means for scanning the light of an image from a film and the photoelectricity changing means relative to one another;

optical means having a projection lens and a plurality of mirrors for leading the light from a film to the photoelectricity changing means;

detecting means for detecting the size of a film; and means for moving at least one mirror of the plurality of mirrors, which constitutes the optical means, corresponding to the size of a film detected by the detecting means, whereby the width of an image which is formed on the photoelectricity changing means is always maintained constant irrespective of the difference in size of a film.

2. An image reading apparatus as claimed in claim 1, wherein the means for moving the at least one mirror moves other mirrors relative to an optical path simultaneously with moving the at least one mirror.

3. An image reading apparatus as claimed in claim 1, further comprising means for moving the projection lens relative to an optical path corresponding to the size of a film detected by the detecting means.

4. An image reading apparatus as claimed in claim 1, wherein the scanning means includes means for changing a velocity of the scanning of the light of an image and the photoelectricity changing means relative to one another corresponding to the size of a film detected by the detecting means.

5. An image reading apparatus which is capable of reading an image of film in different sizes, comprising:

storing means for collectively storing data which show characteristics of a film corresponding to each film size;

inputting means for changing a relationship between said data which show film characteristics and a sensed size of a film;

reading means for reading an image of a film; and sensing means to sense a film size based on a presentation of such film for reading, wherein the reading means is adapted to read an image of a film corresponding to a sensed size of such film and corresponding characteristic data from the storing means.

6. An image reading apparatus as claimed in claim 5, wherein the image reading means includes a photoelectricity changing means which outputs a signal corresponding to a change in the amount of light and an optical means for forming light of an image from a film on the photoelectricity changing means.

7. An image reading apparatus of claim 5 wherein said detecting means for detecting the size of a film includes a film carrier for each size of film, the film carrier for each size of film having a projection window sized for the particular size of film.

8. An image reading apparatus of claim 7 wherein each film carrier has an indication thereon of the size of film held by the film carrier.

9. An image reading apparatus of claim 8 wherein the indication is the presence or absence of holes in the film carrier.

10. An image reading apparatus of claim 8 wherein the detecting means for detecting the size of a film further includes at least one photosensor, the photosensor reading the indication on the film carrier of the size of film held in the film carrier.

11. An image reading apparatus of claim 7, wherein the film carrier has an indicator that indicates a proper setting of the film carrier within the image reading apparatus.

12. An image reading apparatus which is capable of reading an image of film in different sizes, comprising:

storing means for storing data which show characteristics of a film corresponding to each size of film;

inputting means for changing a relationship between said data which show film characteristics and the size of a film;

detecting means for detecting the size of a film; and reading means for reading an image of film corresponding to the size of a film detected by the detecting means based on a corresponding characteristic data, wherein the image reading means further includes an image processing means for performing an image reading operation based on characteristic data, which covers at least one of the data of: lamp voltage, gain value of amplifier in an image processing circuit, conversion coefficient for shading correction, and a shading correction data.

13. An image reading apparatus which is capable of reading an image of film in different sizes, comprising:

storing means for storing data which show characteristics of a film corresponding to each size of films;

inputting means for changing a relationship between said data which show film characteristics and the size of a film;

detecting means for detecting the size of a film;

reading means for reading an image of film corresponding to the size of a film detected by the detecting means based on corresponding characteristic data; and means for discriminating between negative film and positive film, wherein the reading means reads an image of film according to characteristic data which corresponds to the difference between negative film and positive film.

14. An image reading apparatus which is capable of reading an image from a plurality of film types, such film types differing in physical attributes, comprising:

means for modifying a prescribed reading condition to facilitate a subsequent reading of a film image;

storing means for storing a modified reading condition, wherein the storing means can collectively store a modified reading condition corresponding to each film type;

detecting means for automatically detecting a film type; and reading means for reading a film image, wherein the reading means is adapted to read an image of a film corresponding to a film type detected by the detecting means and an appropriate reading condition (s) corresponding to a detected film type.

15. An image reading apparatus as claimed in claim 14, wherein said adjusting means is adapted to modify a reading condition by reading a predetermined image.

16. An image reading apparatus as claimed in claim 14, wherein one film type of the plurality of film types differs from another film type of the plurality of film types by a film size.

17. An image reading apparatus which is capable of reading an image of different size of films, comprising:

means for adjusting reading conditions when an image of film is read;

storing means for storing an adjusted reading condition corresponding to each kind of film;

detecting means for detecting a kind of film;

reading means for reading an image of film corresponding to a kind of film detected by the detecting means with corresponding reading conditions; and lamp units for irradiating light onto a film wherein a plurality of the lamp units are provided corresponding to the size of a film, and said storing means includes nonvolatile memories provided in each one of the lamp units.

* * * * *

UNITED STATES PATENT AND TRADEMARK OFFICE
CERTIFICATE OF CORRECTION

PATENT NO. : 6,215,563 B1
DATED : April 10, 2001
INVENTOR(S) : Takashi Onishi et al.

Figure 15D:
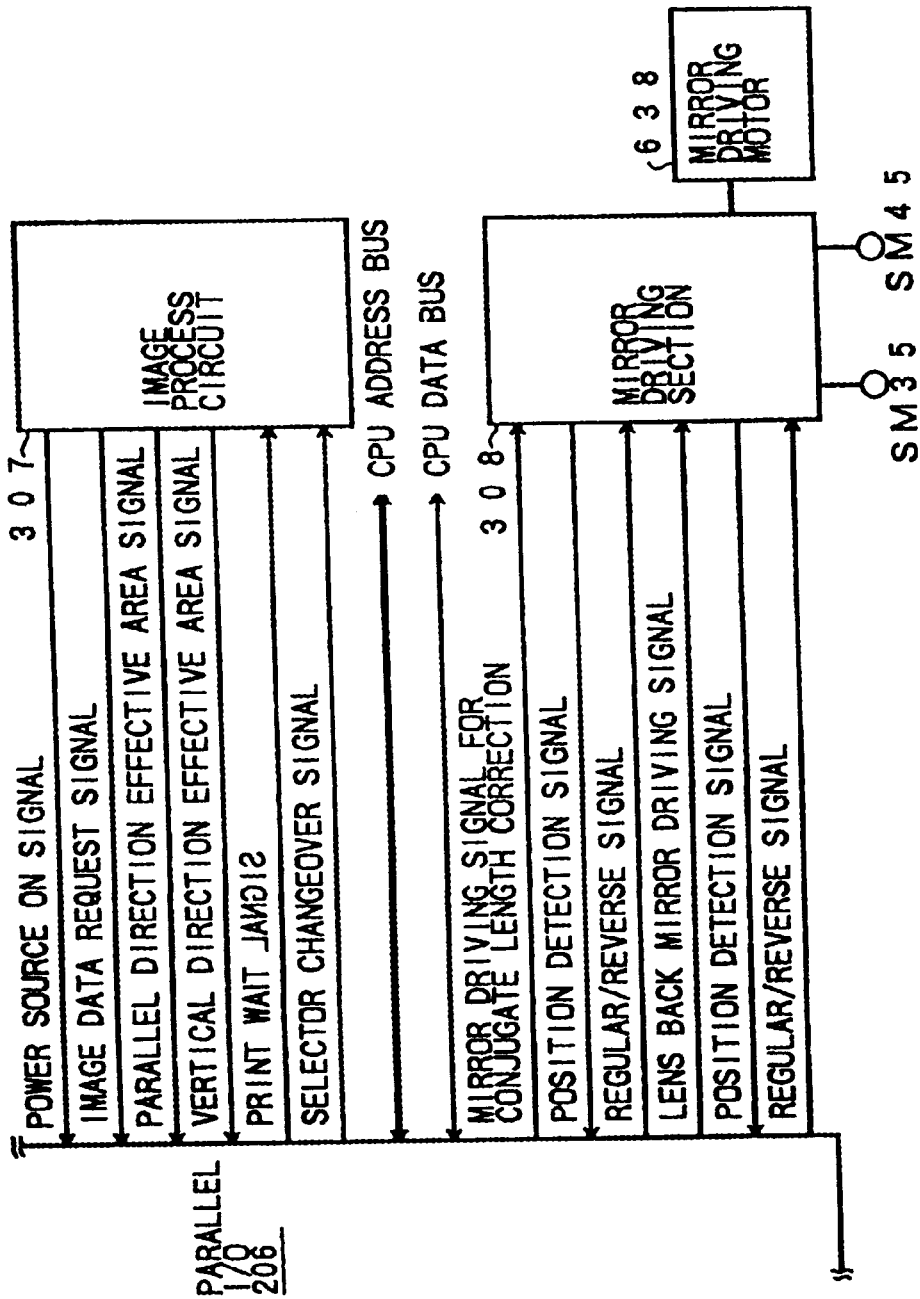
FIG. 15D is a block diagram showing another lower half part of parallel I/O and circuits connected.

It is certified that error appears in the above-identified patent and that said Letters Patent is hereby corrected as shown below:

Drawings,
Sheet 16, delete Fig. 15D in its entirety and insert the following therefor:

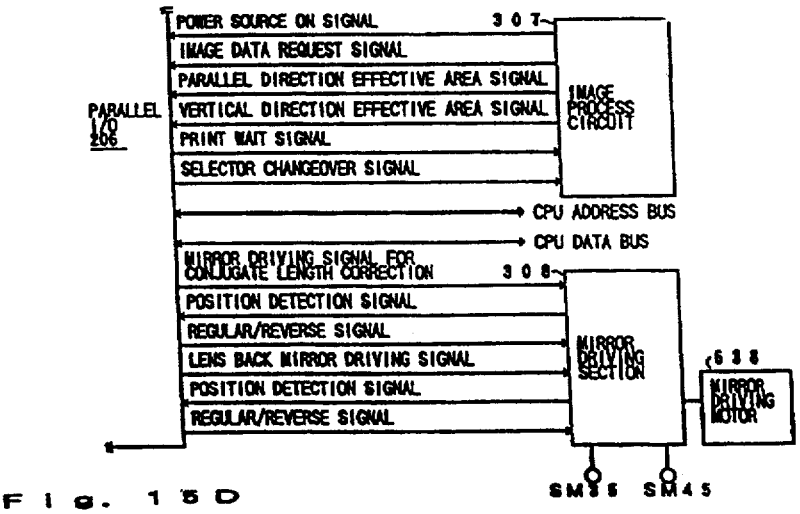

Column 29,
Line 50, after "based on", delete "a".
Line 55, after "of", insert -- an --.
Line 56, after "and", delete "a".

UNITED STATES PATENT AND TRADEMARK OFFICE
CERTIFICATE OF CORRECTION

PATENT NO. : 6,215,563 B1
DATED : April 10, 2001
INVENTOR(S) : Takashi Onishi et al.

It is certified that error appears in the above-identified patent and that said Letters Patent is hereby corrected as shown below:

Column 30,
Line 2, delete "films;", and insert -- film; --.

Signed and Sealed this

Twenty-seventh Day of November, 2001

Attest:

*Nicholas P. Godici*

NICHOLAS P. GODICI
*Attesting Officer*     *Acting Director of the United States Patent and Trademark Office*